United States Patent
Liang

(10) Patent No.: US 11,295,752 B2
(45) Date of Patent: Apr. 5, 2022

(54) METHOD AND DEVICE OF SUSTAINABLY UPDATING COEFFICIENT VECTOR OF FINITE IMPULSE RESPONSE FILTER

(71) Applicant: CHINA ACADEMY OF TELECOMMUNICATIONS TECHNOLOGY, Beijing (CN)

(72) Inventor: Min Liang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 2 days.

(21) Appl. No.: 16/645,356

(22) PCT Filed: Aug. 21, 2018

(86) PCT No.: PCT/CN2018/101491
§ 371 (c)(1),
(2) Date: Mar. 6, 2020

(87) PCT Pub. No.: WO2019/047710
PCT Pub. Date: Mar. 14, 2019

(65) Prior Publication Data
US 2021/0035593 A1  Feb. 4, 2021

(30) Foreign Application Priority Data
Sep. 7, 2017 (CN) .......................... 201710800778.4

(51) Int. Cl.
*G10L 21/0208* (2013.01)
*G10L 21/0232* (2013.01)
(Continued)

(52) U.S. Cl.
CPC ...... *G10L 21/0208* (2013.01); *G10L 21/0232* (2013.01); *H04M 9/082* (2013.01); *G10L 2021/02082* (2013.01)

(58) Field of Classification Search
CPC ............ G10L 21/0208; G10L 21/0232; G10L 21/0224; G10L 2021/02082;
(Continued)

(56) References Cited

U.S. PATENT DOCUMENTS 5,661,813 A * 8/1997 Shimauchi ............ H04M 9/082
381/66
2011/0044448 A1 2/2011 Chen et al.
(Continued)

FOREIGN PATENT DOCUMENTS

CN   104616658 A   5/2015
CN   104883462 A   9/2015
(Continued)

OTHER PUBLICATIONS

Ni et al "Variable Regularisation Parameter Sign Subband Adaptive Filter", Electronics Letters, vol. 46, No. 24, (Year: Nov. 25, 2010).*
(Continued)

*Primary Examiner* — Leshui Zhang
(74) *Attorney, Agent, or Firm* — Flener IP & Business Law; Zareefa B. Flener

(57) ABSTRACT

A method and a device of sustainably updating a coefficient vector of a finite impulse response FIRfilter. The method includes obtaining (21) a time-varying regularization factor used for iteratively updating the coefficient vector of the FIR filter in a case that the coefficient vector of the FIR filter is used for processing a preset signal; updating (22) the coefficient vector of the FIR filter according to the time-varying regularization factor.

15 Claims, 4 Drawing Sheets

(51) Int. Cl.
*G10L 21/0224* (2013.01)
*H04M 9/08* (2006.01)
*H04R 3/02* (2006.01)
*H04R 27/00* (2006.01)

(58) Field of Classification Search
CPC . G10L 2021/02166; G10L 2021/02165; G10L 21/0216; G10L 19/012; G10L 19/00; G10L 15/20; G10L 21/02–0388; H04M 9/082; H04M 9/08; H04M 3/002; H04M 3/568; H04M 1/72591; H04R 2227/009; H04R 3/02; H04R 27/00; H04R 3/002; H04R 3/005; H04R 2499/11; H04R 2499/13; H04R 2499/15; H04R 2430/03; H04R 1/1083; H04R 1/1091; H04R 1/406; H04R 2227/005; H04B 3/23; H04B 3/20; H04B 3/234; H04B 3/235; G10K 11/16; G10K 11/175; G10K 2210/505; G10K 2210/1081; G10K 11/002; G10K 11/346; G10K 11/178–17885; G10K 2210/30; G10K 2210/3012–30232; G10K 2210/3025; G10K 2210/3026; G10K 2210/3028; G10K 2210/30281; G10K 2210/3035; G10K 2210/30351; G10K 2210/506; H03G 3/20; H03G 5/165; H03G 9/025; H03F 2200/03

USPC ......... 704/226, 227, 228, E19.014, E21.002, 704/E21.004, E21.007; 381/17, 18, 19, 381/20, 21, 300, 301, 302, 303, 307, 119, 381/66, 27, 71.1–71.6, 71.9, 71.11, 71.12, 381/26, 318, 86, 92, 94.1, 93, 95, 96, 381/122, 123; 700/94; 379/406.01–406.16; 455/569.1, 570

See application file for complete search history.

(56) References Cited

U.S. PATENT DOCUMENTS

| | | | |
|---|---|---|---|
| 2011/0106542 A1 | 5/2011 | Bayer et al. | |
| 2011/0243428 A1 | 10/2011 | Das Gupta et al. | |
| 2011/0249184 A1 | 10/2011 | Elsherif et al. | |
| 2013/0156210 A1 | 6/2013 | Shaw | |
| 2014/0064476 A1* | 3/2014 | Mani ..................... | H04M 9/082 379/406.08 |
| 2016/0050491 A1 | 2/2016 | Ahgren et al. | |
| 2016/0212373 A1 | 7/2016 | Aharon et al. | |

FOREIGN PATENT DOCUMENTS

| | | |
|---|---|---|
| CN | 105070295 A | 11/2015 |
| CN | 106161823 A | 11/2016 |
| CN | 106448695 A | 2/2017 |
| CN | 107483761 A | 12/2017 |
| CN | 107749304 A | 3/2018 |
| EP | 2738762 A1 | 6/2014 |
| JP | 2009284465 A | 12/2009 |
| TW | 201614983 A | 4/2014 |
| TW | I445404 B | 7/2014 |
| TW | I459374 B | 11/2014 |
| TW | 201637447 A | 10/2016 |

OTHER PUBLICATIONS

Jingen et al "Two Variants of the Sign Subband Adaptive Filter with Improved Convergence Rate", Signal Processing, Edit 96, pp. 325-331, (Year: 2014).*

Praveen et al., "A frequency-domain adaptive filter (FDAF) prediction error method and ARLS for speech echo cancellation," 2nd International Conference on Applied and Theoretical Computing and Communication Technology (iCATccT), Jul. 21, 2016, p. 182-187, Bangalore, India.

First Office Action, Application 2017108007784.4, dated Oct. 18, 2017, The State Intellectual Property Office of People's Republic of China, China.

Qi Xiaohui, Research on Subband Adaptive Filter and Its Implementation, A Dissertation Submitted to PLA Information Engineering University for the Degree of Master of Engineering, Jun. 1, 2015, China.

Patent Cooperation Treaty, Notification of Transmittal of Translation of the International Preliminary Report on Patentability, PCT/CN2018/101491, dated Mar. 19, 2020, Applicant: China Academy of Telecommunications Technology.

* cited by examiner

Obtaining a time-varying regularization factor used for iteratively updating a coefficient vector of a FIR filter in a case that the coefficient vector of the FIR filter is used for processing a preset signal — 21

Updating the coefficient vector of the FIR filter according to the time-varying regularization factor — 22

METHOD AND DEVICE OF SUSTAINABLY UPDATING COEFFICIENT VECTOR OF FINITE IMPULSE RESPONSE FILTER

CROSS-REFERENCE TO RELATED APPLICATION

This application is the U.S. national phase of PCT Application No. PCT/CN2018/101491 filed on Aug. 21, 2018, which claims priority to a Chinese Patent Application No. 201710800778.4 filed in China on Sep. 7, 2017, the disclosures of which are incorporated herein by reference in their entireties.

TECHNICAL FIELD

The present disclosure relates to the field of a signal processing technique, and more particularly, relates to a method of sustainably updating a coefficient vector of a finite impulse response filter and a device of sustainably updating a coefficient vector of a finite impulse response filter.

BACKGROUND

An Acoustic Echo Canceller (AEC) is a key component in a full-duplex voice communication system, and a primary function of the AEC is to remove an echo signal of a far-end signal coupled by a speaker (horn) into a microphone. In the AEC, a path of an echo is adaptively modelled by learning with a finite impulse response (FIR) linear filter, and an effective estimation value of the echo is synthesized therefrom. The estimate which is then subtracted from a received signal of the microphone, thereby completing a task of cancelling the echo. In presence of a near-end speech signal, since the near-end speech signal is not statistically correlated with the far-end speech signal, the near-end speech signal behaves like a burst of noise, a result of which is that a coefficient update of this filter will deviate from a true value corresponding to an actual path of the echo and thus diverge. This correspondingly increases an amount of residual echo and deteriorates performance of the AEC. In view of this, it is firstly necessary to use a "double talk" detector (DTD) to timely and accurately detect whether a near-end speech signal (i.e., a "double talk" case) is contained in a signal received by the microphone. In a case where there is no near-end speech signal (i.e., a "single talk" case) in the signal received by the microphone, an adaptive learning process of linear filter coefficients continues; in a case where the signal received by the microphone contains a near-end speech signal (i.e., the "double talk" case), the adaptive learning process of the linear filter coefficients must be stopped to avoid a divergence phenomenon caused by continuous learning of the filter coefficients in this case. However, a processing delay of DTD and a possible misjudgment in the DTD will seriously affect an adaptive learning behavior of an AEC filter and further affect the performance of the AEC. Therefore, a number of adaptive variable step-size learning techniques are proposed to update iteratively coefficients of FIR filters.

A disadvantage of adaptive variable step-size learning techniques is that they are sensitive to parameter initialization. In addition, this technique is not suitable for dealing with "double talk" situations where there is near-end (non-stationary) spoken speech in an echo cancellation application. Other schemes in the related art, such as a Generalized Normalized Gradient Descent (GNGD) algorithm, also do not work well in the "double talk" case with the near-end (non-stationary) spoken speech.

SUMMARY

Some embodiments of the present disclosure provide a method and a device of sustainably updating a coefficient vector of a Finite Impulse Response (FIR) filter, so as to solve a problem that an adaptive learning mode of a relevant FIR filter cannot guarantee performance stability of the FIR filter and further affects signal processing reliability.

In a first aspect, some embodiments of the present disclosure provide a sustainable adaptive updating method of a coefficient vector of a Finite Impulse Response (FIR) filter. The method includes obtaining a time-varying regularization factor used for iteratively updating the coefficient vector of the FIR filter in a case that the coefficient vector of the FIR filter is used for processing a preset signal; updating the coefficient vector of the FIR filter according to the time-varying regularization factor.

Optionally, the preset signal includes one of combined pairs of following: a far-end reference speech signal inputted in an Acoustic Echo Canceller (AEC) and a near-end speech signal received by a microphone; a noise reference signal and a system input signal in an adaptive noise cancellation system; an interference reference signal and a system input signal in an adaptive interference cancellation system; and an excitation input signal and an unknown system output signal to be identified in adaptive system identification.

Optionally, the preset signal includes a far-end reference speech signal inputted in an Acoustic Echo Canceller (AEC) and a near-end speech signal received by a microphone; obtaining the time-varying regularization factor used for iteratively updating the coefficient vector of the FIR filter in a case that the coefficient vector of the FIR filter is used for processing the preset signal, includes: obtaining a power of a signal received by a microphone and an effective estimation value of a coupling factor; according to the power of the signal received by the microphone and the effective estimation value of the coupling factor, obtaining the time-varying regularization factor used for iteratively updating the coefficient vector of the FIR filter in a case that the coefficient vector of the FIR filter is used for processing the preset signal.

Optionally, a manner of obtaining the power of the signal received by the microphone is: according to an Equation:

$$\hat{\sigma}_y^2(t) = \begin{cases} \alpha_a \cdot \hat{\sigma}_y^2(t-1) + (1-\alpha_a) \cdot |y(t)|^2, & \text{if } |y(t)|^2 > \hat{\sigma}_y^2(t-1) \\ \alpha_d \cdot \hat{\sigma}_y^2(t-1) + (1-\alpha_d) \cdot |y(t)|^2, & \text{if } |y(t)|^2 > \hat{\sigma}_y^2(t-1) \end{cases},$$

obtaining the power of the signal received by the microphone; wherein $\hat{\sigma}_y^2(t)$ is the power of the signal received by the microphone; $y(t)$ is the signal received by the microphone; $\alpha_a$ and $\alpha_d$ are preset recursive constant quantities, and $0 \leq \alpha_a < \alpha_d < 1$; $t$ is a digital-signal time index number.

Optionally, a manner of obtaining the effective estimation value of the coupling factor is: obtaining a biased estimation value of the coupling factor according to a cross-correlation method; obtaining a correction factor used for compensating for the biased estimation value of the coupling factor; obtaining the effective estimation value of the coupling factor according to the biased estimation value of the coupling factor and the correction factor.

Optionally, obtaining the biased estimation value of the coupling factor according to the cross-correlation method, includes: according to an Equation:

$$\hat{\beta}(t)|_{Cross\text{-}correlation} = \frac{\left|\sum_{t1=0}^{T_s-1} e(t-t1)x^*(t-t1)\right|^2}{\left|\sum_{t1=0}^{T_s-1} |x(t-t1)|^2\right|^2},$$

obtaining the biased estimation value of the coupling factor, wherein $\hat{\beta}(t)|_{Cross\text{-}correlation}$ is the biased estimation value of the coupling factor based on a cross-correlation technique; $x^*(t-t1)$ is a complex conjugate of $x(t-t1)$; $t1=0, 1, 2, \ldots, T_s-1$, $T_s$ is a quantity of samples used in estimation of the $\hat{\beta}(t)|_{Cross\text{-}correlation}$, and $T_s \ll L$, L is a quantity of coefficients of the FIR filter; $e(t-t1)$ is an error signal outputted by the AEC at a signal sample time $(t-t1)$, $e(t)=y(t)-\vec{x}^H(t)\vec{w}(t)$, $e(t)$ is an error signal outputted by the AEC at a signal sample time t; y(t) is a signal received by the microphone at a signal sample time t; $\vec{x}^H(t)$ is a conjugate transpose matrix of $\vec{x}(t)$; $\vec{x}(t)$ is a far-end reference signal vector and $\vec{x}(t)=[x(t), x(t-1), \ldots, x(t-L+1)]^T$; $x(t-t2)$ is a far-end reference signal at a signal sample time $(t-t2)$; T is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ is a $(t2+1)$-th coefficient of the FIR filter at the signal sample time t, $t2=0, 1, 2, \ldots, L-1$; t is a digital-signal time index number.

Optionally, obtaining the correction factor used for compensating for the biased estimation value of the coupling factor, includes: obtaining a candidate value of a square of a magnitude of a correlation coefficient between an error signal outputted by the AEC and a far-end reference signal; obtaining, according to the candidate value of the square of the magnitude of the correlation coefficient between the error signal outputted by the AEC and the far-end reference signal, a square of an effective magnitude of the correlation coefficient between the error signal outputted by the AEC and the far-end reference signal, and taking the square of the effective magnitude of the correlation coefficient between the error signal outputted by the AEC and the far-end reference signal as the correction factor used for compensating for the biased estimation value of the coupling factor.

Further, obtaining the candidate value of the square of the magnitude of the correlation coefficient between the error signal outputted by the AEC and the far-end reference signal, includes: according to an Equation:

$$\hat{r}(t) = \frac{\left|\sum_{t1=0}^{T_s-1} e(t-t1)x^*(t-t1)\right|^2}{\left(\sum_{t1=0}^{T_s-1} |e(t-t1)|^2\right)\left(\sum_{t1=0}^{T_s-1} |x(t-t1)|^2\right)},$$

obtaining the candidate value of the square of the magnitude of the correlation coefficient between the error signal outputted by the AEC and the far-end reference signal; wherein $\hat{r}(t)$ is the candidate value of the square of the magnitude of the correlation coefficient between the error signal outputted by the AEC and the far-end reference signal; $x(t-t1)$ is the far-end reference signal at a signal sample time $(t-t1)$; $x^*(t-t1)$ is a complex conjugate of $x(t-t1)$; $t1=0, 1, 2, \ldots, T_s-1$, $T_s$ is a quantity of samples used in estimation of $\hat{r}(t)$, and $T_s \ll L$, L is a quantity of coefficients of the FIR filter; $e(t-t1)$ is the error signal outputted by the AEC at a signal sample time $(t-t1)$, $e(t)=y(t)-\vec{x}^H(t)\vec{w}(t)$, $e(t)$ is an error signal outputted by the AEC at a signal sample time t; y(t) is the signal received by the microphone at the signal sample time t; $\vec{x}^H(t)$ is a conjugate transpose matrix of $\vec{x}(t)$; $\vec{x}(t)$ is a far-end reference signal vector and $\vec{x}(t)=[x(t), x(t-1), \ldots, x(t-L+1)]^T$; $x(t-t2)$ is the far-end reference signal at a signal sample time $(t-t2)$; T is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ is a $(t2+1)$-th coefficient of the FIR filter at the signal sample time t, $t2=0, 1, 2, \ldots, L-1$; t is a digital-signal sample time index number.

Optionally, obtaining, according to the candidate value of the square of the magnitude of the correlation coefficient between the error signal outputted by the AEC and the far-end reference signal, the square of the effective magnitude of the correlation coefficient between the error signal outputted by the AEC and the far-end reference signal, includes: according to an Equation:

$$|\hat{r}_{ex}(t)|^2 = \begin{cases} \hat{r}(t), & \text{if } \hat{r}(t) > |\hat{r}_{ex}(t-1)|^2 \\ |\hat{r}_{ex}(t-1)|^2, & \text{if } \hat{r}(t) \leq |\hat{r}_{ex}(t-1)|^2 \end{cases},$$

obtaining the square of the effective magnitude of the correlation coefficient between the signal outputted by the AEC and the far-end reference signal; wherein $|\hat{r}_{ex}(t)|^2$ is the square of the effective magnitude of the correlation coefficient between the error signal outputted by the AEC and the far-end reference signal; $\hat{r}(t)$ is the candidate value of the square of the magnitude of the correlation coefficient between the error signal outputted by the AEC and the far-end reference signal; t is a digital-signal sample time index number.

Optionally, obtaining the effective estimation value of the coupling factor according to the biased estimation value of the coupling factor and the correction factor, includes: obtaining the effective estimation value of the coupling factor according to the Equation:

$$\hat{\beta}(t) = \frac{\hat{\beta}(t)|_{Cross\text{-}correlation}}{|\hat{r}_{ex}(t)|^2},$$

wherein $\hat{\beta}(t)$ is the effective estimation value of the coupling factor; $\hat{\beta}(t)|_{Cross\text{-}correlation}$ is the biased estimation value of the coupling factor based on a cross-correlation technique; $|\hat{r}_{ex}(t)|^2$ is the square of the effective magnitude of the correlation coefficient between the error signal outputted by the AEC and the far-end reference signal; t is a digital-signal sample time index number.

Optionally, according to the power of the signal received by the microphone and the effective estimation value of the coupling factor, obtaining the time-varying regularization factor used for iteratively updating the coefficient vector of the FIR filter in a case that the coefficient vector of the FIR filter is used for processing the preset signal, includes: according to an Equation:

$$\delta^{opt}(t) = \max\left\{\frac{L \cdot \hat{\sigma}_y^2(t)}{\hat{\beta}(t) + \rho_0}, \delta_{min}\right\} = \max\left\{\frac{L \cdot \hat{\sigma}_y^2(t)|\hat{r}_{ex}(t)|^2}{\hat{\beta}(t)|_{Cross-correlation} + \rho}, \delta_{min}\right\},$$

obtaining the time-varying regularization factor used for iteratively updating the coefficient vector of the FIR filter; wherein $\delta^{opt}(t)$ is the time-varying regularization factor; L is a quantity of coefficients of the FIR filter; $\hat{\sigma}_y^2(t)$ is the power of the signal received by the microphone;

$$\hat{\beta}(t) = \frac{\hat{\beta}(t)|_{Cross\ correlation}}{|\hat{r}_{ex}(t)|^2}$$

is the effective estimation value of coupling factor; $\hat{\beta}(t)|_{Cross-correlation}$ is a biased estimation value of the coupling factor based on a cross-correlation technique; $|\hat{r}_{ex}(t)|^2$ is a square of an effective magnitude of a correlation coefficient between an error signal outputted by the AEC and the far-end reference signal; $\delta_{min}$ is a preset small real constant quantity, and $\delta_{min} > 0$; $\rho_0$ and $\rho$ are preset small real constants, and $\rho > 0$, $\rho_0 > 0$, respectively; t is a digital-signal sample time index number.

Optionally, updating the coefficient vector of the FIR filter according to the time-varying regularization factor, includes: according to an Equation: $\vec{w}(t+1) = \vec{w}(t) + \mu \cdot \vec{x}(t)e^*(t)/[\vec{x}^H(t)\vec{x}(t) + \delta^{opt}(t)]$, sustainably adaptively updating the coefficient vector of the FIR filter by applying a Normalized Least Mean Square (NLMS) algorithm, wherein, $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; $\mu$ is a predetermined coefficient updating step-size parameter, and $0 < \mu < 2$; $\vec{x}(t)$ is a far-end reference signal vector and $\vec{x}(t) = [x(t), x(t-1), \ldots, x(t-L+1)]^T$; $x(t-t2)$ is the far-end reference signal at a signal sample time $(t-t2)$; T is a transpose operator; $\vec{x}^H(t)$ is a conjugate transpose matrix of $\vec{x}(t)$; $\delta^{opt}(t)$ is the time-varying regularization factor; $e^*(t)$ is a complex conjugate of $e(t)$; $e(t) = y(t) - \vec{x}^H(t)\vec{w}(t)$, $e(t)$ is the error signal outputted by the AEC at a signal sample time t; $y(t)$ is the signal received by the microphone at the signal sample time t; $\vec{w}(t) = [w_0(t), w_1(t), \ldots, w_{L-1}(t)]^T$, $w_{t2}(t)$ is a (t2+1)-th coefficient of the FIR filter at the signal sample time t, $t2 = 0, 1, 2, \ldots, L-1$; t is a digital-signal sample time index number.

Optionally, updating the coefficient vector of the FIR filter according to the time-varying regularization factor, includes: according to an Equation: $\vec{w}(t+1) = \vec{w}(t) + \mu \cdot X_{state}(t)[X_{state}^H(t)X_{state}(t) + \delta^{opt}(t) \cdot I_{P \times P}]^{-1} \cdot \vec{e}^*(t)$ applying an affine projection (AP) algorithm to sustainably adaptively update the coefficient vector of the FIR filter; wherein $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; $\mu$ is a predetermined coefficient updating step-size parameter, and $0 < \mu < 2$; $\delta^{opt}(t)$ is the time-varying regularization factor; $X_{state}(t)$ is L×P-dimension state matrix, and $X_{state}(t) = [\vec{x}(t), \vec{x}(t-1), \ldots, \vec{x}(t-P+1)]$; $\vec{x}(t-t3)$ is a far-end reference signal vector at a signal sample time $(t-t3)$, and $t3 = 0, 1, \ldots, P-1$, P is an order quantity of the AP algorithm; $X_{state}^H(t)$ is a conjugate transpose matrix of $X_{state}(t)$; $I_{P \times P}$ is a P×P-dimension unit matrix; $\vec{e}^*(t)$ is a complex conjugate of $\vec{e}(t)$, and $\vec{e}(t) = \vec{y}(t) - X_{state}^H(t)\vec{w}(t)$; $\vec{e}(t)$ is a P-dimension error vector; $\vec{y}(t)$ is a P-dimension vector of the signal received by the microphone, and $\vec{y}(t) = [y(t), y(t-1), \ldots, y(t-P+1)]^T$; $y(t-t3)$ is the signal received by the microphone at a signal sample time $(t-t3)$; $\vec{w}(t) = [w_0(t), w_1(t), \ldots, w_{L-1}(t)]^T$, $w_{t2}(t)$ is a (t2+1)-th coefficient of the FIR filter at a signal sample time t, $t2 = 0, 1, 2, \ldots, L-1$; t is a digital-signal sample time index number.

Specifically, the preset signal includes a subband spectrum of a near-end speech signal received by a microphone and inputted in an Acoustic Echo Canceller (AEC) and a subband spectrum of a far-end reference speech signal; the coefficient vector of the FIR filter is a subband-domain coefficient vector of the FIR filter and the time-varying regularization factor is a subband-domain time-varying regularization factor. Obtaining the time-varying regularization factor used for iteratively updating the coefficient vector of the FIR filter in a case that the coefficient vector of the FIR filter is used for processing the preset signal, includes: obtaining a subband power spectrum of the signal received by the microphone and an effective estimation value of a subband-domain coupling factor, respectively; according to the subband power spectrum of the signal received by the microphone and the effective estimation value of the subband-domain coupling factor, obtaining a subband-domain time-varying regularization factor used for iteratively updating the subband-domain coefficient vector of the FIR filter in a case that the subband-domain coefficient vector of the FIR filter is used for processing a preset signal.

Optionally, a manner of obtaining the subband power spectrum of the signal received by the microphone is: according to an Equation:

$$\hat{\sigma}_Y^2(k, n) = \begin{cases} \alpha_a \cdot \hat{\sigma}_Y^2(k, n-1) + (1-\alpha_a) \cdot |Y(k, n)|^2, & \text{if } |Y(k, n)|^2 > \hat{\sigma}_Y^2(k, n-1) \\ \alpha_d \cdot \hat{\sigma}_Y^2(k, n-1) + (1-\alpha_d) \cdot |Y(k, n)|^2, & \text{if } |Y(k, n)|^2 \leq \hat{\sigma}_Y^2(k, n-1) \end{cases},$$

obtaining the subband power spectrum of the signal received by the microphone; wherein $\hat{\sigma}_Y^2(k, n)$ is the subband power spectrum of the signal received by the microphone; $Y(k, n)$ is a subband spectrum of the signal received by the microphone; $\alpha_a$ and $\alpha_d$ are preset recursive constant quantities, and $0 \leq \alpha_a < \alpha_d < 1$; k is a subband index variable, $k = 0, 1, 2, \ldots, K-1$, and K is a total quantity of subbands; n is a signal frame time index variable.

Optionally, a manner of obtaining the effective estimation value of the subband-domain coupling factor, includes: obtaining a biased estimation value of the subband-domain coupling factor according to a cross-correlation method; obtaining a correction factor used for compensating for the biased estimation value of the subband-domain coupling factor; obtaining the effective estimation value of the subband-domain coupling factor according to the biased estimation value of the subband-domain coupling factor and the correction factor.

Optionally, obtaining the biased estimation value of the subband-domain coupling factor according to the cross-correlation method, includes: according to an Equation:

$$\hat{\beta}(k, n)|_{Cross\text{-}correlation} = \frac{\left|\sum_{n1=0}^{N_S-1} E(k, n-n1)X^*(k, n-n1)\right|^2}{\left|\sum_{n1=0}^{N_S-1} |X(k, n-n1)|^2\right|^2},$$

obtaining the biased estimation value of the subband-domain coupling factor; wherein $\hat{\beta}(k, n)|_{Cross\text{-}correlation}$ is the biased estimation value of the subband-domain coupling factor; $X^*(k, n-n1)$ is a complex conjugate of $X(k, n-n1)$; $n1=0, 1, 2, \ldots, N_s-1$, $N_s$ is a quantity of signal frames used in estimation of $\hat{\beta}(k, n)|_{Cross\text{-}correlation}$, and $N_s \ll L_s$, $L_s$ is a quantity of coefficients of the FIR filter in each subband; $E(k, n-n1)$ is a subband spectrum of an error signal outputted by the AEC at a signal frame time $(n-n1)$; $E(k, n)=Y(k, n)-\vec{X}_k^H(n)\vec{W}_k(n)$, $E(k, n)$ is the subband spectrum of the error signal outputted by the AEC at a signal frame time n; $Y(k, n)$ is the subband spectrum of the signal received by the microphone at the signal frame time n; $\vec{X}_k^H(n)$ is a conjugate transpose matrix of $\vec{X}_k(n)$; $\vec{X}_k(n)$ is a subband-spectrum vector of the far-end reference signal, and $\vec{X}_k(n)=[X(k, n), X(k, n-1), \ldots, X(k, n-L_s+1)]^T$; $X(k, n-n2)$ is a subband spectrum of a far-end reference signal at a signal frame time $(n-n2)$; T is a transpose operator; $\vec{W}_k(n)$ is the coefficient vector of the FIR filter in a subband k, $\vec{W}_k(n)=[W_0(k, n), W_1(k, n), \ldots, W_{L_s-1}(k, n)]^T$; $W_{n2}(k, n)$ is a $(n2+1)$-th coefficient of the FIR filter in the subband k at the signal frame time n, $n2=0, 1, 2, \ldots, Ls-1$; k is a subband index variable, $k=0, 1, 2, \ldots, K-1$, and K is a total quantity of subbands; n is a signal frame time index variable.

Optionally, obtaining the correction factor used for compensating for the biased estimation value of the subband-domain coupling factor, includes: obtaining a candidate value of a square of a magnitude of a correlation coefficient between a subband spectrum of an error signal outputted by an AEC and a subband spectrum of a far-end reference signal; obtaining, according to the candidate value of the square of the magnitude of the correlation coefficient between the subband spectrum of the error signal outputted by the AEC and the subband spectrum of the far-end reference signal, a square of an effective magnitude of the correlation coefficient between the subband spectrum of the error signal outputted by the AEC and the subband spectrum of the far-end reference signal, and taking the square of the effective magnitude of the correlation coefficient between the subband spectrum of the error signal outputted by the AEC and the subband spectrum of the far-end reference signal as the correction factor used for compensating for the biased estimation value of the subband-domain coupling factor.

Optionally, obtaining the candidate value of the square of the magnitude of the correlation coefficient between the subband spectrum of the error signal outputted by the AEC and the subband spectrum of the far-end reference signal, includes: according to an Equation:

$$\hat{r}(k, n) = \frac{\left|\sum_{n1=0}^{N_S-1} E(k, n-n1)X^*(k, n-n1)\right|^2}{\left(\sum_{n1=0}^{N_S-1} |E(k, n-n1)|^2\right)\left(\sum_{m=0}^{N_S-1} |X(k, n-n1)|^2\right)},$$

obtaining the candidate value of the square of the magnitude of the correlation coefficient between the subband spectrum of the error signal outputted by the AEC and the subband spectrum of the far-end reference signal; wherein $\hat{r}(k, n)$ is the candidate value of the square of the magnitude of the correlation coefficient between the subband spectrum of the error signal outputted by the AEC and the subband spectrum of the far-end reference signal; $X^*(k, n-n1)$ is a complex conjugate of $X(k, n-n1)$; $n1=0, 1, 2, \ldots, N_s-1$, $N_s$ is a quantity of frames used in estimation of $\hat{r}(k, n)$, and $N_s \ll L_s$, $L_s$ is a quantity of coefficients of the FIR filter in each subband; $E(k, n-n1)$ is the subband spectrum of the error signal outputted by the AEC at a signal frame time $(n-n1)$; $E(k, n)=Y(k, n)-\vec{X}_k^H(n)\vec{W}_k(n)$, $E(k, n)$ is the subband spectrum of the error signal outputted by the AEC at a signal frame time n; $Y(k, n)$ is a subband spectrum of a signal received by the microphone; $\vec{X}_k^H(n)$ is a conjugate transpose matrix of $\vec{X}_k(n)$; $\vec{X}_k(n)$ is a subband spectrum vector of the far-end reference signal, and $\vec{X}_k(n)=[X(k, n), X(k, n-1), \ldots, X(k, n-L_s+1)]^T$; $X(k, n-n2)$ is the subband spectrum of the far-end reference signal at the signal frame time $(n-n2)$; T is a transpose operator; $\vec{W}_k(n)$ is the coefficient vector of the FIR filter in a subband k; $\vec{W}_k(n)=[W_0(k, n), W_1(k, n), \ldots, W_{L_s-1}(k, n)]^T$; $W_{n2}(k, n)$ is a $(n2+1)$-th coefficient of the FIR filter in the signal frame time n in the subband k; $n2=0, 1, 2, \ldots, Ls-1$; k is a subband index variable; $k=, 1, 2, \ldots, K-1$, and K is a total quantity of subbands; n is a signal frame time index variable.

Optionally, obtaining, according to the candidate value of the square of the magnitude of the correlation coefficient between the subband spectrum of the error signal outputted by the AEC and the subband spectrum of the far-end reference signal, the square of the effective magnitude of the correlation coefficient between the subband spectrum of the error signal outputted by the AEC and the subband spectrum of the far-end reference signal, includes: according to an Equation:

$$|\hat{r}_{EX}(k, n)|^2 = \begin{cases} \hat{r}(k, n), & \text{if } \hat{r}(k, n) > |\hat{r}_{EX}(k, n-1)|^2 \\ |\hat{r}_{EX}(k, n-1)|^2, & \text{if } \hat{r}(k, n) \leq |\hat{r}_{EX}(k, n-1)|^2 \end{cases},$$

obtaining the square of the effective magnitude of the correlation coefficient between the subband spectrum of the error signal outputted by the AEC and the subband spectrum of the far-end reference signal; wherein $|\hat{r}_{EX}(k, n)|^2$ is the square of the effective magnitude of the correlation coefficient between the subband spectrum of the error signal outputted by the AEC and the subband spectrum of the far-end reference signal; $\hat{r}(k, n)$ is the candidate value of the square of the magnitude of the correlation coefficient between the subband spectrum of the error signal outputted by the AEC and the subband spectrum of the far-end reference signal; n is a signal frame time index variable.

Optionally, obtaining the effective estimation value of the subband-domain coupling factor according to the biased estimation value of the subband-domain coupling factor and the correction factor, includes: according to an Equation:

$$\hat{\beta}(k, n) = \frac{\hat{\beta}(k, n)|_{Cross\text{-}correlation}}{|\hat{r}_{EX}(k, n)|^2},$$

obtaining the effective estimation value of the subband-domain coupling factor; wherein $\hat{\beta}(k, n)$ is the effective estimation value of the subband-domain coupling factor, $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; n is a signal frame time index variable.

Optionally, according to the subband power spectrum of the signal received by the microphone and the effective estimation value of the subband-domain coupling factor, obtaining the subband-domain time-varying regularization factor used for iteratively updating the subband-domain coefficient vector of the FIR filter in a case that the subband-domain coefficient vector of the FIR filter is used for processing the reset signal, includes: according to an Equation:

$$\delta^{opt}(k, n) = \max\left\{\frac{L_s \cdot \hat{\sigma}_Y^2(k, n)}{\hat{\beta}(k, n) + \rho_0}, \delta_{min}\right\} = \max\left\{\frac{L_s \cdot \hat{\sigma}_Y^2(k, n)|\hat{r}_{EX}(k, n)|^2}{\hat{\beta}(k, n)|_{Cross-correlation} + \rho}, \delta_{min}\right\},$$

obtaining the subband-domain time-varying regularization factor used for iteratively updating the subband-domain coefficient vector of the FIR filter in a case that the subband-domain coefficient vector of the FIR filter is used for processing the preset signal; wherein $\delta^{opt}(k, n)$ is the subband-domain time-varying regularization factor; $\hat{\sigma}_Y^2(k, n)$ is a subband power spectrum of a signal received by the microphone;

$$\hat{\beta}(k, n) = \frac{\hat{\beta}(k, n)|_{Cross-correlation}}{|\hat{r}_{EX}(k, n)|^2},$$

is the effective estimation value of the subband-domain coupling factor, $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; $\delta_{min}$ is a preset small real constant quantity, and $\delta_{min}>0$; $\rho_0$ and $\rho$ are preset small real constants, and $\rho>0$, $\rho_0>0$; n is a signal frame time index variable.

Optionally, updating the coefficient vector of the FIR filter according to the time-varying regularization factor, includes: according to an Equation: $\vec{W}_k(n+1)=\vec{W}_k(n)+\mu\cdot\vec{X}_k(n)E^*(k, n)/[\vec{X}_k^H(n)\vec{X}_k(f)+\delta^{opt}(k, n)]$, sustainably adaptively updating the subband-domain coefficient vector of the FIR filter using a Normalized Least Mean Square (NLMS) algorithm; wherein $\vec{W}_k(n+1)$ is a coefficient vector of the FIR filter in a subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0<\mu<2$; $\vec{X}_k(n)$ is a subband spectrum vector of the far-end reference signal; $\vec{X}_k(n)=[X(k, n), X(k, n-1), \ldots, X(k, n-L_s+1)]^T$; $X(k, n-n2)$ is a subband spectrum of the far-end reference signal at a signal frame time (n-n2); n2=0, 1, . . . , Ls-1, Ls is a quantity of coefficients of the FIR filter in each subband, T is a transpose operator; $\vec{X}_k^H(n)$ is a conjugate transpose matrix of $\vec{X}_k(n)$; $E^*(k, n)$ is a complex conjugate of $E(k, n)$; $E(k, n)$ is the subband spectrum of the error signal outputted by AEC at a signal frame time n, and $E(k, n)=Y(k, n)-\vec{X}_k(n)\vec{W}_k(n)$; $Y(k, n)$ is the subband spectrum of the signal received by the microphone at the signal frame time n; $\vec{W}_k(n)=[W_0(k, n), W_1(k, n), \ldots, W_{L_s-1}(k, n)]^T$; $W_{n2}(k, n)$ is a (n2+1)-th coefficient of the FIR filter in the subband k at the signal frame time n; $\delta^{opt}(k, n)$ is the subband-domain time-varying regularization factor; k is a subband index variable, k=0, 1, 2, . . . , K-1, and K is a total quantity of subbands; n is a signal frame time index variable.

Optionally, updating the coefficient vector of the FIR filter according to the time-varying regularization factor, includes: according to an Equation: $\vec{W}_k(n+1)=\vec{W}_k(n)+\mu\cdot X_{state}(k, n)\cdot[X_{state}^H(k, n)X_{state}(k, n)+\delta^{opt}(k, n)\cdot I_{P\times P}]^{-1}\cdot\vec{E}_k^*(n)$, sustainably adaptively updating the subband-domain coefficient vector of the FIR filter using an affine projection (AP) algorithm; wherein $\vec{W}_k(n+1)$ is the coefficient vector of the FIR filter in a subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0<\mu<2$; $\delta^{opt}(k, n)$ is the subband-domain time-varying regularization factor; $X_{state}(k, n)$ is an L×P-dimension state matrix in the subband k, and $X_{state}(k, n)=[\vec{X}_k(n), \vec{X}_k(n-1), \ldots, \vec{X}_k(n-P+1)]$; $\vec{X}_k(n-n3)$ is a subband spectrum vector of the far-end reference signal at a signal frame time (n-n3), and n3=0, 1, . . . , P-1, P is an order quantity of the AP algorithm; $X_{state}^H(k, n)$ is a conjugate transpose matrix of $X_{state}(k, n)$; $I_{P\times P}$ is a P×P-dimension unit matrix; $\vec{E}_k^*(n)$ is a complex conjugate of $\vec{E}_k(n)$, and $\vec{E}_k(n)=\vec{Y}_k(n)-X_{state}^H(k, n)\vec{W}_k(n)$; $\vec{E}_k(n)$ is a P-dimension subband spectrum vector of an error signal; $\vec{Y}_k(n)$ is a P-dimension subband spectrum vector of a signal received by the microphone, and $\vec{Y}_k(n)=[Y(k, n), Y(k, n-1), \ldots, Y(k, n-P+1)]^T$; $Y(k, n-n3)$ is the signal received by the microphone at a signal frame time (n-n3); $\vec{W}_k(n)=[W_0(k, n), W_1(k, n), \ldots, W_{L_s-1}(k, n)]^T$; $W_{n2}(k, n)$ is a (n2+1)-th coefficient of the FIR filter in the subband k at a signal frame time n, n2=0, 1, . . . , Ls-1, Ls is a quantity of coefficients of the FIR filter in each subband; k is a subband index variable, k=0, 1, 2, . . . , K-1, and K is a total quantity of subbands; n is a signal frame time index variable.

In a second aspect, some embodiments of the present disclosure further provide a sustainable adaptive updating device of a coefficient vector of a Finite Impulse Response (FIR) filter. The device includes a storage, a processor, and a computer program stored on the storage and executable by the processor; wherein when the processor executes the computer program, the processor implements following steps: obtaining a time-varying regularization factor used for iteratively updating the coefficient vector of the FIR filter in a case that the coefficient vector of the FIR filter is used for processing a preset signal; updating the coefficient vector of the FIR filter according to the time-varying regularization factor.

Specifically, the preset signal includes one of combined pairs of following: a far-end reference speech signal inputted in an Acoustic Echo Canceller (AEC) and a near-end speech signal received by a microphone; a noise reference signal and a system input signal in an adaptive noise cancellation system; an interference reference signal and a system input signal in an adaptive interference cancellation system; and an excitation input signal and an unknown system output signal to be identified in adaptive system identification.

Optionally, the preset signal includes a far-end reference speech signal inputted in an Acoustic Echo Canceller (AEC) and a near-end speech signal received by a microphone; when the processor executes the computer program, the processor further implements following steps: obtaining a power of a signal received by a microphone and an effective estimation value of a coupling factor; according to the power of the signal received by the microphone and the effective estimation value of the coupling factor, obtaining the time-varying regularization factor used for iteratively updating the coefficient vector of the FIR filter in a case that the coefficient vector of the FIR filter is used for processing the preset signal.

Optionally, when the processor executes the computer program, the processor further implements following steps: according to an Equation:

$$\hat{\sigma}_y^2(t) = \begin{cases} \alpha_a \cdot \hat{\sigma}_y^2(t-1) + (1-\alpha_a) \cdot |y(t)|^2, & \text{if } |y(t)|^2 > \hat{\sigma}_y^2(t-1) \\ \alpha_d \cdot \hat{\sigma}_y^2(t-1) + (1-\alpha_d) \cdot |y(t)|^2, & \text{if } |y(t)|^2 \le \hat{\sigma}_y^2(t-1) \end{cases}$$

obtaining the power of the signal received by the microphone; wherein $\hat{\sigma}_y^2(t)$ is the power of the signal received by the microphone; $y(t)$ is the signal received by the microphone; $\alpha_s$ and $\alpha_d$ are preset recursive constant quantities, and $0 \le \alpha_a < \alpha_d < 1$; t is a digital-signal time index number.

Optionally, when the processor executes the computer program, the processor further implements following steps: obtaining a biased estimation value of the coupling factor according to a cross-correlation method; obtaining a correction factor used for compensating for the biased estimation value of the coupling factor; obtaining the effective estimation value of the coupling factor according to the biased estimation value of the coupling factor and the correction factor.

Optionally, when the processor executes the computer program, the processor further implements following steps: according to an Equation:

$$\hat{\beta}(t)|_{Cross\text{-}correlation} = \frac{\left|\sum_{t1=0}^{T_s-1} e(t-t1)x^*(t-t1)\right|^2}{\left|\sum_{t1=0}^{T_s-1} |x(t-t1)|^2\right|^2},$$

obtaining the biased estimation value of the coupling factor, wherein $\hat{\beta}(t)|_{Cross\text{-}correlation}$ is the biased estimation value of the coupling factor based on a cross-correlation technique; $x^*(t-t1)$ is a complex conjugate of $x(t-t1)$; $t1=0, 1, 2, \ldots$, $T_s-1$, $T_s$ is a quantity of samples used in estimation of the $\hat{\beta}(t)|_{Cross\text{-}correlation}$, and $T_s \ll L$, L is a quantity of coefficients of the FIR filter; $e(t-t1)$ is an error signal outputted by the AEC at a signal sample time $(t-t1)$, $e(t) = y(t) - \vec{x}^H(t)\vec{w}(t)$, $e(t)$ is an error signal outputted by the AEC at a signal sample time t; $y(t)$ is a signal received by the microphone at a signal sample time t; $\vec{x}^H(t)$ is a conjugate transpose matrix of $\vec{x}(t)$; $\vec{x}(t)$ is a far-end reference signal vector and $\vec{x}(t) = [x(t), x(t-1), \ldots, x(t-L+1)]^T$; $x(t-t2)$ is a far-end reference signal at a signal sample time $(t-t2)$; T is a transpose operator; $\vec{w}(t)$ is the coefficient vector of the FIR filter, $\vec{w}(t) = [w_0(t), w_1(t), \ldots, w_{L-1}(t)]^T$, $w_{t2}(t)$ is a $(t2+1)$-th coefficient of the FIR filter at the signal sample time t, $t2 = 0, 1, 2, \ldots, L-1$; t is a digital-signal time index number.

Optionally, when the processor executes the computer program, the processor further implements following steps: obtaining a candidate value of a square of a magnitude of a correlation coefficient between an error signal outputted by the AEC and a far-end reference signal; obtaining, according to the candidate value of the square of the magnitude of the correlation coefficient between the error signal outputted by the AEC and the far-end reference signal, a square of an effective magnitude of the correlation coefficient between the error signal outputted by the AEC and the far-end reference signal, and taking the square of the effective magnitude of the correlation coefficient between the error signal outputted by the AEC and the far-end reference signal as the correction factor used for compensating for the biased estimation value of the coupling factor.

Optionally, when the processor executes the computer program, the processor further implements following steps: according to an Equation:

$$\hat{r}(t) = \frac{\left|\sum_{t1=0}^{T_s-1} t(t-t1)x^*(t-t1)\right|^2}{\left(\sum_{t1=0}^{T_s-1} |e(t-t1)|^2\right)\left(\sum_{t1=0}^{T_s-1} |x(t-t1)|^2\right)},$$

obtaining the candidate value of the square of the magnitude of the correlation coefficient between the error signal outputted by the AEC and the far-end reference signal; wherein $\hat{r}(t)$ is the candidate value of the square of the magnitude of the correlation coefficient between the error signal outputted by the AEC and the far-end reference signal; $x(t-t1)$ is the far-end reference signal at a signal sample time $(t-t1)$; $x^*(t-t1)$ is a complex conjugate of $x(t-t1)$; $t1=0, 1, 2, \ldots$, $T_s-1$, $T_s$ is a quantity of samples used in estimation of $\hat{r}(t)$, and $T_s \ll L$, L is a quantity of coefficients of the FIR filter; $e(t-t1)$ is the error signal outputted by the AEC at a signal sample time $(t-t1)$, $e(t) = y(t) - \vec{x}^H(t)\vec{w}(t)$, $e(t)$ is an error signal outputted by the AEC at a signal sample time t; $y(t)$ is the signal received by the microphone at the signal sample time t; $\vec{x}^H(t)$ is a conjugate transpose matrix of $\vec{x}(t)$; $\vec{x}(t)$ is a far-end reference signal vector and $\vec{x}(t) = [x(t), x(t-1), \ldots, x(t-L+1)]^T$; $x(t-t2)$ is the far-end reference signal at a signal sample time $(t-t2)$; T is a transpose operator; $\vec{w}(t)$ is the coefficient vector of the FIR filter, $\vec{w}(t) = [w_0(t), w_1(t), \ldots, w_{L-1}(t)]^T$, $w_{t2}(t)$ is a $(t2+1)$-th coefficient of the FIR filter at the signal sample time t, $t2 = 0, 1, 2, \ldots, L-1$; t is a digital-signal sample time index number.

Optionally, when the processor executes the computer program, the processor further implements following steps: according to an Equation:

$$|\hat{r}_{ex}(t)|^2 = \begin{cases} \hat{r}(t), & \text{if } \hat{r}(t) > |\hat{r}_{ex}(t-1)|^2 \\ |\hat{r}_{ex}(t-1)|^2, & \text{if } \hat{r}(t) \leq |\hat{r}_{ex}(t-1)|^2 \end{cases}$$

obtaining the square of the effective magnitude of the correlation coefficient between the signal outputted by the AEC and the far-end reference signal; wherein $|\hat{r}_{ex}(t)|^2$ is the square of the effective magnitude of the correlation coefficient between the error signal outputted by the AEC and the far-end reference signal; $\hat{r}(t)$ is the candidate value of the square of the magnitude of the correlation coefficient between the error signal outputted by the AEC and the far-end reference signal; t is a digital-signal sample time index number.

Optionally, when the processor executes the computer program, the processor further implements following steps: obtaining the effective estimation value of the coupling factor according to the Equation:

$$\hat{\beta}(t) = \frac{\hat{\beta}(t)|_{Cross\text{-}correlation}}{|\hat{r}_{ex}(t)|^2},$$

wherein $\hat{\beta}(t)$ is the effective estimation value of the coupling factor; $\hat{\beta}(t)|_{Cross\text{-}correlation}$ is the biased estimation value of the coupling factor based on a cross-correlation technique; $|\vec{r}_{ex}(t)|^2$ is the square of the effective magnitude of the correlation coefficient between the error signal outputted by the AEC and the far-end reference signal; t is a digital-signal sample time index number.

Optionally, when the processor executes the computer program, the processor further implements following steps: according to an Equation:

$$\delta^{opt}(t) = \max\left\{\frac{L \cdot \hat{\sigma}_y^2(t)}{\hat{\beta}(t) + \rho_0}, \delta_{min}\right\} = \max\left\{\frac{L \cdot \hat{\sigma}_y^2(t)|\hat{r}_{ex}(t)|^2}{\hat{\beta}(t)|_{Cross\text{-}correlation} + \rho}, \delta_{min}\right\},$$

obtaining the time-varying regularization factor used for iteratively updating the coefficient vector of the FIR filter; wherein $\delta^{opt}(t)$ is the time-varying regularization factor; L is a quantity of coefficients of the FIR filter; $\hat{\sigma}_y^2(t)$ is the power of the signal received by the microphone;

$$\hat{\beta}(t) = \frac{\hat{\beta}(t)|_{Cross\text{-}correlation}}{|\hat{r}_{ex}(t)|^2}$$

is the effective estimation value of coupling factor; $\hat{\beta}(t)|_{Cross\text{-}correlation}$ is a biased estimation value of the coupling factor based on a cross-correlation technique; $|\hat{r}_{ex}(t)|^2$ is a square of an effective magnitude of a correlation coefficient between an error signal outputted by the AEC and the far-end reference signal; $\delta_{min}$ is a preset small real constant quantity, and $\delta_{min}>0$; $\rho_0$ and $\rho$ are preset small real constants, and $\rho>0$, $\rho_0>0$, respectively; t is a digital-signal sample time index number.

Optionally, when the processor executes the computer program, the processor further implements following steps: according to an Equation: $\vec{w}(t+1)=\vec{w}(t)+\mu \cdot \vec{x}(t)e^*(t)/[\vec{x}^H(t)\vec{x}(t)+\delta^{opt}(t)]$, sustainably adaptively updating the coefficient vector of the FIR filter by applying a Normalized Least Mean Square (NLMS) algorithm, wherein, $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; $\mu$ is a predetermined coefficient updating step-size parameter, and $0<\mu<2$; $\vec{x}(t)$ is a far-end reference signal vector and $\vec{x}(t)=[x(t), x(t-1), \ldots, x(t-L+1)]^T$; $x(t-t2)$ is the far-end reference signal at a signal sample time (t-t2); T is a transpose operator; $\vec{x}^H(t)$ is a conjugate transpose matrix of $\vec{x}(t)$; $\delta^{opt}(t)$ is the time-varying regularization factor; $e^*(t)$ is a complex conjugate of $e(t)$; $e(t)=y(t)-\vec{x}^H(t)\vec{w}(t)$, $e(t)$ is the error signal outputted by the AEC at a signal sample time t; $y(t)$ is the signal received by the microphone at the signal sample time t; $\vec{w}(t)=[w_0(t), w_1(t), \ldots, w_{L-1}(t)]^T$, $w_{t2}(t)$ is a (t2+1)-th coefficient of the FIR filter at the signal sample time t, t2=0, 1, 2, . . . , L−1; t is a digital-signal sample time index number.

Optionally, when the processor executes the computer program, the processor further implements following steps: according to an Equation: $\vec{w}(t+1)=\vec{w}(t)+\mu \cdot X_{state}(t)[X_{state}^H(t)X_{state}(t)+\delta^{opt}(t) \cdot I_{P \times P}]^{-1} \cdot \vec{e}^*(t)$, applying an affine projection (AP) algorithm to sustainably adaptively update the coefficient vector of the FIR filter; wherein $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; $\mu$ is a predetermined coefficient updating step-size parameter, and $0<\mu<2$; $\delta^{opt}(t)$ is the time-varying regularization factor; $X_{state}(t)$ is L×P-dimension state matrix, and $X_{state}(t)=[\vec{x}(t), \vec{x}(t-1), \ldots, \vec{x}(t-P+1)]$; $\vec{x}(t-t3)$ is a far-end reference signal vector at a signal sample time (t−t3), and t3=0, 1, . . . , P−1, P is an order quantity of the AP algorithm; $X_{state}^H(t)$ is a conjugate transpose matrix of $X_{state}(t)$; $I_{P \times P}$ is a P×P-dimension unit matrix; $\vec{e}^*(t)$ is a complex conjugate of $\vec{e}(t)$, and $\vec{e}(t)=\vec{y}(t)-X_{state}^H(t)\vec{w}(t)$; $\vec{e}(t)$ is a P-dimension error vector; $\vec{y}(t)$ is a P-dimension vector of the signal received by the microphone, and $\vec{y}(t)=[y(t), y(t-1), \ldots, y(t-P+1)]^T$; $y(t-t3)$ is the signal received by the microphone at a signal sample time (t−t3); $\vec{w}(t)=[w_0(t), w_1(t), \ldots, w_{L-1}(t)]^T$, $w_{t2}(t)$ is a (t2+1)-th coefficient of the FIR filter at a signal sample time t, t2=0, 1, 2, . . . , L−1; t is a digital-signal sample time index number.

Optionally, the preset signal includes a subband spectrum of a near-end speech signal received by a microphone and inputted in an Acoustic Echo Canceller (AEC) and a subband spectrum of a far-end reference speech signal; the coefficient vector of the FIR filter is a subband-domain coefficient vector of the FIR filter and the time-varying regularization factor is a subband-domain time-varying regularization factor. When the processor executes the computer program, the processor further implements following steps: obtaining a subband power spectrum of the signal received by the microphone and an effective estimation value of a subband-domain coupling factor, respectively; according to the subband power spectrum of the signal received by the microphone and the effective estimation value of the subband-domain coupling factor, obtaining a subband-domain time-varying regularization factor used for iteratively updating the subband-domain coefficient vector of the FIR filter in a case that the subband-domain coefficient vector of the FIR filter is used for processing a preset signal.

Optionally, when the processor executes the computer program, the processor further implements following steps: according to an Equation:

$$\hat{\sigma}_Y^2(k, n) = \begin{cases} \alpha_a \cdot \hat{\sigma}_Y^2(k, n-1) + (1-\alpha_a) \cdot |Y(k, n)|^2, & \text{if } |Y(k, n)|^2 > \hat{\sigma}_Y^2(k, n-1) \\ \alpha_d \cdot \hat{\sigma}_Y^2(k, n-1) + (1-\alpha_d) \cdot |Y(k, n)|^2, & \text{if } |Y(k, n)|^2 \le \hat{\sigma}_Y^2(k, n-1) \end{cases},$$

obtaining the subband power spectrum of the signal received by the microphone; wherein $\hat{\sigma}_Y^2(k, n)$ is the subband power spectrum of the signal received by the microphone; $Y(k, n)$ is a subband spectrum of the signal received by the microphone; $\alpha_a$ and $\alpha_d$ are preset recursive constant quantities, and $0 \le \alpha_a < \alpha_d < 1$; k is a subband index variable, k=0, 1, 2, ..., K-1, and K is a total quantity of subbands; n is a signal frame time index variable.

Optionally, when the processor executes the computer program, the processor further implements following steps: obtaining a biased estimation value of the subband-domain coupling factor according to a cross-correlation method; obtaining a correction factor used for compensating for the biased estimation value of the subband-domain coupling factor; obtaining the effective estimation value of the subband-domain coupling factor according to the biased estimation value of the subband-domain coupling factor and the correction factor.

Optionally, when the processor executes the computer program, the processor further implements following steps: according to an Equation:

$$\hat{\beta}(k, n)|_{Cross\text{-}correlation} = \frac{\left|\sum_{n1=0}^{N_s-1} E(k, n-n1)X^*(k, n-n1)\right|^2}{\left|\sum_{n1=0}^{N_s-1} |X(k, n-n1)|^2\right|^2},$$

obtaining the biased estimation value of the subband-domain coupling factor; wherein $\hat{\beta}(k, n)|_{Cross\text{-}correlation}$ is the biased estimation value of the subband-domain coupling factor; $X^*(k, n-n1)$ is a complex conjugate of $X(k, n-n1)$; n1=0, 1, 2, ..., $N_s-1$, $N_s$ is a quantity of signal frames used in estimation of $\hat{\beta}(k, n)|_{Cross\text{-}correlation}$, and $N_s \ll L_s$, $L_s$ is a quantity of coefficients of the FIR filter in each subband; $E(k, n-n1)$ is a subband spectrum of an error signal outputted by the AEC at a signal frame time (n-n1); $E(k, n) = Y(k, n) - \vec{X}_k^H(n)\vec{W}_k(n)$, $E(k, n)$ is the subband spectrum of the error signal outputted by the AEC at a signal frame time n; $Y(k, n)$ is the subband spectrum of the signal received by the microphone at the signal frame time n; $\vec{X}_k^H(n)$ is a conjugate transpose matrix of $\vec{X}_k(n)$; $\vec{X}_k(n)$ is a subband-spectrum vector of the far-end reference signal, and $\vec{X}_k(n) = [X(k, n), X(k, n-1), ..., X(k, n-L_s+1)]^T$; $X(k, n-n2)$ is a subband spectrum of a far-end reference signal at a signal frame time (n-n2); T is a transpose operator; $\vec{W}_k(n)$ is the coefficient vector of the FIR filter in a subband k; $\vec{W}_k(n) = [W_0(k, n), W_1(k, n), ..., W_{L_s-1}(k, n)]^T$; $W_{n2}(k, n)$ is a (n2+1)-th coefficient of the FIR filter in the subband k at the signal frame time n, n2=0, 1, 2, ..., Ls-1; k is a subband index variable, k=0, 1, 2, ..., K-1, and K is a total quantity of subbands; n is a signal frame time index variable.

Optionally, when the processor executes the computer program, the processor further implements following steps: obtaining a candidate value of a square of a magnitude of a correlation coefficient between a subband spectrum of an error signal outputted by an AEC and a subband spectrum of a far-end reference signal; obtaining, according to the candidate value of the square of the magnitude of the correlation coefficient between the subband spectrum of the error signal outputted by the AEC and the subband spectrum of the far-end reference signal, a square of an effective magnitude of the correlation coefficient between the subband spectrum of the error signal outputted by the AEC and the subband spectrum of the far-end reference signal, and taking the square of the effective magnitude of the correlation coefficient between the subband spectrum of the error signal outputted by the AEC and the subband spectrum of the far-end reference signal as the correction factor used for compensating for the biased estimation value of the subband-domain coupling factor.

Optionally, when the processor executes the computer program, the processor further implements following steps: according to an Equation:

$$\hat{r}(k, n) = \frac{\left|\sum_{n1=0}^{N_s-1} E(k, n-n1)X^*(k, n-n1)\right|^2}{\left(\sum_{n1=0}^{N_s-1} |E(k, n-n1)|^2\right)\left(\sum_{m=0}^{N_s-1} |X(k, n-n1)|^2\right)},$$

obtaining the candidate value of the square of the magnitude of the correlation coefficient between the subband spectrum of the error signal outputted by the AEC and the subband spectrum of the far-end reference signal; wherein $\hat{r}(k, n)$ is the candidate value of the square of the magnitude of the correlation coefficient between the subband spectrum of the error signal outputted by the AEC and the subband spectrum of the far-end reference signal; $X^*(k, n-n1)$ is a complex conjugate of $X(k, n-n1)$; n1=0, 1, 2, ..., $N_s-1$, $N_s$ is a quantity of frames used in estimation of $\hat{r}(k, n)$, and $N_s \ll L_s$, $L_s$ is a quantity of coefficients of the FIR filter in each subband; $E(k, n-n1)$ is the subband spectrum of the error signal outputted by the AEC at a signal frame time (n-n1); $E(k, n) = Y(k, n) - \vec{X}_k^H(n)\vec{W}_k(n)$, $E(k, n)$ is the subband spectrum of the error signal outputted by the AEC at a signal frame time n; $Y(k, n)$ is a subband spectrum of a signal received by the microphone; $\vec{X}_k^H(n)$ is a conjugate transpose matrix of $\vec{X}_k(n)$; $\vec{X}_k(n)$ is a subband spectrum vector of the far-end reference signal, and $\vec{X}_k(n) = [X(k, n), X(k, n-1), ..., X(k, n-L_s+1)]^T$; $X(k, n-n2)$ is the subband spectrum of the far-end reference signal at the signal frame time (n-n2); T is a transpose operator; $\vec{W}_k(n)$ is the coefficient vector of the FIR filter in a subband k; $\vec{W}_k(n) = [W_0(k, n), W_1(k, n), ..., W_{L_s-1}(k, n)]^T$; $W_{n2}(k, n)$ is a (n2+1)-th coefficient of the FIR filter in the signal frame time n in the subband k; n2=0, 1, 2, ..., Ls-1; k is a subband index variable; k=, 1, 2, ..., K-1, and K is a total quantity of subbands; n is a signal frame time index variable.

Optionally, when the processor executes the computer program, the processor further implements following steps: according to an Equation:

$$|\hat{r}_{EX}(k,n)|^2 = \begin{cases} \hat{r}(k,n), & \text{if } \hat{r}(k,n) > |\hat{r}_{EX}(k,n-1)|^2 \\ |\hat{r}_{EX}(k,n-1)|^2, & \text{if } \hat{r}(k,n) \leq |\hat{r}_{EX}(k,n-1)|^2 \end{cases},$$

obtaining the square of the effective magnitude of the correlation coefficient between the subband spectrum of the error signal outputted by the AEC and the subband spectrum of the far-end reference signal; wherein $|\hat{r}_{EX}(k,n)|^2$ is the square of the effective magnitude of the correlation coefficient between the subband spectrum of the error signal outputted by the AEC and the subband spectrum of the far-end reference signal; $\hat{r}(k,n)$ is the candidate value of the square of the magnitude of the correlation coefficient between the subband spectrum of the error signal outputted by the AEC and the subband spectrum of the far-end reference signal; n is a signal frame time index variable.

Optionally, when the processor executes the computer program, the processor further implements following steps: according to an Equation:

$$\hat{\beta}(k,n) = \frac{\hat{\beta}(k,n)|_{Cross\text{-}correlation}}{|\hat{r}_{EX}(k,n)|^2},$$

obtaining the effective estimation value of the subband-domain coupling factor; wherein $\hat{\beta}(k,n)$ is the effective estimation value of the subband-domain coupling factor, $\hat{\beta}(k,n)|_{Cross\text{-}correlation}$ is the biased estimation value of the subband-domain coupling factor; $|\hat{r}_{EX}(k,n)|^2$ is the square of the effective magnitude of the correlation coefficient between the subband spectrum of the error signal outputted by the AEC and the subband spectrum of the far-end reference signal; n is a signal frame time index variable.

Optionally, when the processor executes the computer program, the processor further implements following steps: according to an Equation:

$$\delta^{opt}(k,n) = \max\left\{\frac{L_s \cdot \hat{\sigma}_Y^2(k,n)}{\hat{\beta}(k,n) + \rho_0}, \delta_{min}\right\} = \max\left\{\frac{L_s \cdot \hat{\sigma}_Y^2(k,n)|\hat{r}_{EX}(k,n)|^2}{\hat{\beta}(k,n)|_{Cross\text{-}correlation} + \rho}, \delta_{min}\right\},$$

obtaining the subband-domain time-varying regularization factor used for iteratively updating the subband-domain coefficient vector of the FIR filter in a case that the subband-domain coefficient vector of the FIR filter is used for processing the preset signal; wherein $\delta^{opt}(k,n)$ is the subband-domain time-varying regularization factor; $\hat{\sigma}_Y^2(k,n)$ is a subband power spectrum of a signal received by the microphone;

$$\hat{\beta}(k,n) = \frac{\hat{\beta}(k,n)|_{Cross\text{-}correlation}}{|\hat{r}_{EX}(k,n)|^2}$$

is the effective estimation value of the subband-domain coupling factor, $\hat{\beta}(k,n)|_{Cross\text{-}correlation}$ is the biased estimation value of the subband-domain coupling factor; $|\hat{r}_{EX}(k,n)|^2$ is the square of the effective magnitude of the correlation coefficient between the subband spectrum of the error signal outputted by the AEC and the subband spectrum of the far-end reference signal; $\delta_{min}$ is a preset small real constant quantity, and $\delta_{min}>0$; $\rho_0$ and $\rho$ are preset small real constants, and $\rho>0$, $\rho_0>0$; n is a signal frame time index variable.

Optionally, when the processor executes the computer program, the processor further implements following steps: according to an Equation: $\vec{W}_k(n+1)=\vec{W}_k(n)+\mu \cdot \vec{X}_k(n)E^*(k,n)/[\vec{X}_k^H(n)\vec{X}_k(n)+\delta^{opt}(k,n)]$, sustainably adaptively updating the subband-domain coefficient vector of the FIR filter using a Normalized Least Mean Square (NLMS) algorithm; wherein $\vec{W}_k(n+1)$ is a coefficient vector of the FIR filter in a subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0<\mu<2$; $\vec{X}_k(n)$ is a subband spectrum vector of the far-end reference signal; $\vec{X}_k(n)=[X(k,n), X(k,n-1), \ldots, X(k,n-L_s+1)]^T$; $X(k,n-n2)$ is a subband spectrum of the far-end reference signal at a signal frame time (n−n2); n2=0, 1, . . . , Ls−1, Ls is a quantity of coefficients of the FIR filter in each subband, T is a transpose operator; $\vec{X}_k^H(n)$ is a conjugate transpose matrix of $\vec{X}_k(n)$; $E^*(k,n)$ is a complex conjugate of $E(k,n)$; $E(k,n)$ is the subband spectrum of the error signal outputted by AEC at a signal frame time n, and $E(k,n)=Y(k,n)-\vec{X}_k^H(n)\vec{W}_k(n)$; $Y(k,n)$ is the subband spectrum of the signal received by the microphone at the signal frame time n; $\vec{W}_k(n)=[W_0(k,n), W_1(k,n), \ldots, W_{L_s-1}(k,n)]^T$; $W_{n2}(k,n)$ is a (n2+1)-th coefficient of the FIR filter in the subband k at the signal frame time n; $\delta^{opt}(k,n)$ is the subband-domain time-varying regularization factor; k is a subband index variable, k=0, 1, 2, . . . , K−1, and K is a total quantity of subbands; n is a signal frame time index variable.

Optionally, when the processor executes the computer program, the processor further implements following steps: according to an Equation: $\vec{W}_k(n+1)=\vec{W}_k(n)+\mu \cdot X_{state}(k,n) \cdot [X_{state}^H(k,n)X_{state}(k,n)+\delta^{opt}(k,n) \cdot I_{P \times P}]^{-1} \cdot \vec{E}_k^*(n)$, sustainably adaptively updating the subband-domain coefficient vector of the FIR filter using an affine projection (AP) algorithm; wherein $\vec{W}_k(n+1)$ is the coefficient vector of the FIR filter in a subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0<\mu<2$; $\delta^{opt}(k,n)$ is the subband-domain time-varying regularization factor; $X_{state}(k,n)$ is an L×P-dimension state matrix in the subband k, and $X_{state}(k,n)=[\vec{X}_k(n), \vec{X}_k(n-1), \ldots, \vec{X}_k(n-P+1)]$; $\vec{X}_k(n-n3)$ is a subband spectrum vector of the far-end reference signal at a signal frame time (n−n3), and n3=0, 1, . . . , P−1, P is an order quantity of the AP algorithm; $X_{state}^H(k,n)$ is a conjugate transpose matrix of $X_{state}(k,n)$; $I_{P \times P}$ is a P×P-dimension unit matrix; $\vec{E}_k^*(n)$ is a complex conjugate of $\vec{E}_k(n)$, and $\vec{E}_k(n)=\vec{Y}_k(n)-X_{state}^H(k,n)\vec{W}_k(n)$; $\vec{E}_k(n)$ is a P-dimension subband spectrum vector of an error signal; $\vec{Y}_k(n)$ is a P-dimension subband spectrum vector of a signal received by the microphone, and $\vec{Y}_k(n)=[Y(k,n), Y(k,n-1), \ldots, Y(k,n-P+1)]^T$; $Y(k,n-n3)$ is the signal received by the microphone at a signal frame time (n−n3); $\vec{W}_k(n)=[W_0(k,n), W_1(k,n), \ldots, W_{L_s-1}(k,n)]^T$; $W_{n2}(k,n)$ is a (n2+1)-th coefficient of the FIR filter in the subband k at a signal frame time n, n2=0, 1, ..., Ls−1, Ls is a quantity of coefficients of the FIR filter in each subband; k is a subband index variable, k=0, 1, 2, ..., K−1, and K is a total quantity of subbands; n is a signal frame time index variable.

In a third aspect, some embodiments of the present disclosure further provide a computer readable storage medium. The medium includes a computer program stored on the computer readable storage medium, wherein when a processor executes the computer program, the processor implements following steps: obtaining a time-varying regularization factor used for iteratively updating a coefficient vector of a Finite Impulse Response (FIR) filter in a case that the coefficient vector of the FIR filter is used for processing a preset signal; updating the coefficient vector of the FIR filter according to the time-varying regularization factor.

In a fourth aspect, some embodiments of the present disclosure further provide a sustainable adaptive updating device of a coefficient vector of a Finite Impulse Response (FIR) filter. The device includes an obtaining module, configured to obtain a time-varying regularization factor used for iteratively updating the coefficient vector of the FIR filter in a case that the coefficient vector of the FIR filter is used for processing a preset signal; an updating module, configured to update the coefficient vector of the FIR filter according to the time-varying regularization factor.

Optionally, the preset signal includes a far-end reference speech signal inputted in an Acoustic Echo Canceller (AEC) and a near-end speech signal received by a microphone. The obtaining module includes: a first obtaining unit, configured to obtain a power of a signal received by the microphone and an effective estimation value of a coupling factor; a second obtaining unit, configured to, according to the power of the signal received by the microphone and the effective estimation value of the coupling factor, obtain the time-varying regularization factor used for iteratively updating the coefficient vector of the FIR filter in a case that the coefficient vector of the FIR filter is used for processing the preset signal.

Optionally, a manner of obtaining the power of the signal received by the microphone performed by the first obtaining unit is: according to an Equation:

$$\hat{\sigma}_y^2(t) = \begin{cases} \alpha_a \cdot \hat{\sigma}_y^2(t-1) + (1-\alpha_a) \cdot |y(t)|^2, & \text{if } |y(t)|^2 > \hat{\sigma}_y^2(t-1) \\ \alpha_d \cdot \hat{\sigma}_y^2(t-1) + (1-\alpha_d) \cdot |y(t)|^2, & \text{if } |y(t)|^2 \le \hat{\sigma}_y^2(t-1) \end{cases}$$

obtaining the power of the signal received by the microphone; wherein $\hat{\sigma}_y^2(t)$ is the power of the signal received by the microphone; $y(t)$ is the signal received by the microphone; $\alpha_a$ and $\alpha_d$ are preset recursive constant quantities, and $0 \le \alpha_a < \alpha_d < 1$; t is a digital-signal time index number.

Optionally, a manner of obtaining the effective estimation value of the coupling factor performed by the first obtaining unit is: obtaining a biased estimation value of the coupling factor according to a cross-correlation method; obtaining a correction factor used for compensating for the biased estimation value of the coupling factor; obtaining the effective estimation value of the coupling factor according to the biased estimation value of the coupling factor and the correction factor.

Optionally, a manner of obtaining the biased estimation value of the coupling factor according to the cross-correlation method is: according to an Equation:

$$\hat{\beta}(t)|_{Cross-correlation} = \frac{\left|\sum_{t1=0}^{T_s-1} e(t-t1)x^*(t-t1)\right|^2}{\left|\sum_{t1=0}^{T_s-1} |x(t-t1)|^2\right|^2},$$

obtaining the biased estimation value of the coupling factor, wherein $\hat{\beta}(t)|_{Cross-correlation}$ is the biased estimation value of the coupling factor based on a cross-correlation technique; $x^*(t-t1)$ is a complex conjugate of $x(t-t1)$; $t1=0, 1, 2, \ldots, T_s-1$, $T_s$ is a quantity of samples used in estimation of the $\hat{\beta}(t)|_{Cross-correlation}$, and $T_s \ll L$, L is a quantity of coefficients of the FIR filter; $e(t-t1)$ is an error signal outputted by the AEC at a signal sample time $(t-t1)$, $e(t)=y(t)-\vec{x}^H(t)\vec{w}(t)$, $e(t)$ is an error signal outputted by the AEC at a signal sample time t; $y(t)$ is a signal received by the microphone at a signal sample time t; $\vec{x}^H(t)$ is a conjugate transpose matrix of $\vec{x}(t)$; $\vec{x}(t)$ is a far-end reference signal vector and $\vec{x}(t)=[x(t), x(t-1), \ldots, x(t-L+1)]^T$; $x(t-t2)$ is a far-end reference signal at a signal sample time $(t-t2)$; T is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ is a $(t2+1)$-th coefficient of the FIR filter at the signal sample time t, $t2=0, 1, 2, \ldots, L-1$; t is a digital-signal time index number.

Optionally, a manner of obtaining the correction factor used for compensating for the biased estimation value of the coupling factor is: obtaining a candidate value of a square of a magnitude of a correlation coefficient between an error signal outputted by the AEC and a far-end reference signal; obtaining, according to the candidate value of the square of the magnitude of the correlation coefficient between the error signal outputted by the AEC and the far-end reference signal, a square of an effective magnitude of the correlation coefficient between the error signal outputted by the AEC and the far-end reference signal, and taking the square of the effective magnitude of the correlation coefficient between the error signal outputted by the AEC and the far-end reference signal as the correction factor used for compensating for the biased estimation value of the coupling factor.

Optionally, a manner of obtaining the candidate value of the square of the magnitude of the correlation coefficient between the error signal outputted by the AEC and the far-end reference signal is: according to an Equation:

$$\hat{r}(t) = \frac{\left|\sum_{t1=0}^{T_s-1} e(t-t1)x^*(t-t1)\right|^2}{\left(\sum_{t1=0}^{T_s-1} |e(t-t1)|^2\right)\left(\sum_{t1=0}^{T_s-1} |x(t-t1)|^2\right)},$$

obtaining the candidate value of the square of the magnitude of the correlation coefficient between the error signal outputted by the AEC and the far-end reference signal; wherein $\hat{r}(t)$ is the candidate value of the square of the magnitude of the correlation coefficient between the error signal outputted by the AEC and the far-end reference signal; $x(t-t1)$ is the far-end reference signal at a signal sample time $(t-t1)$; $x^*(t-t1)$ is a complex conjugate of $x(t-t1)$; $t1=0, 1, 2, \ldots, T_s-1$, $T_s$ is a quantity of samples used in estimation of $\hat{r}(t)$, and $T_s \ll L$, L is a quantity of coefficients of the FIR filter; $e(t-t1)$ is the error signal outputted by the AEC at a signal sample time $(t-t1)$, $e(t)=y(t)-\vec{x}^H(t)\vec{w}(t)$, $e(t)$ is an error signal outputted by the AEC at a signal sample time t; y(t) is the signal received by the microphone at the signal sample time t; $\vec{x}^H(t)$ is a conjugate transpose matrix of $\vec{x}(t)$; $\vec{x}(t)$ is a far-end reference signal vector and $\vec{x}(t)=[x(t), x(t-1), \ldots, x(t-L+1)]^T$; $x(t-t2)$ is the far-end reference signal at a signal sample time (t-t2); T is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ is a (t2+1)-th coefficient of the FIR filter at the signal sample time t, t2=0, 1, 2, ..., L-1; t is a digital-signal sample time index number.

Optionally, a manner of obtaining, according to the candidate value of the square of the magnitude of the correlation coefficient between the error signal outputted by the AEC and the far-end reference signal, the square of the effective magnitude of the correlation coefficient between the error signal outputted by the AEC and the far-end reference signal is: according to an Equation:

$$|\hat{r}_{ex}(t)|^2 = \begin{cases} \hat{r}(t), & \text{if } \hat{r}(t) > |\hat{r}_{ex}(t-1)|^2 \\ |\hat{r}_{ex}(t-1)|^2, & \text{if } \hat{r}(t) \le |\hat{r}_{ex}(t-1)|^2 \end{cases}$$

obtaining the square of the effective magnitude of the correlation coefficient between the signal outputted by the AEC and the far-end reference signal; wherein $|\hat{r}_{ex}(t)|^2$ is the square of the effective magnitude of the correlation coefficient between the error signal outputted by the AEC and the far-end reference signal; $\hat{r}(t)$ is the candidate value of the square of the magnitude of the correlation coefficient between the error signal outputted by the AEC and the far-end reference signal; t is a digital-signal sample time index number.

Optionally, a manner of obtaining the effective estimation value of the coupling factor according to the biased estimation value of the coupling factor and the correction factor is: obtaining the effective estimation value of the coupling factor according to the Equation:

$$\hat{\beta}(t) = \frac{\hat{\beta}(t)|_{Cross\text{-}correlation}}{|\hat{r}_{ex}(t)|^2},$$

wherein $\hat{\beta}(t)$ is the effective estimation value of the coupling factor; $\hat{\beta}(t)|_{Cross\text{-}correlation}$ is the biased estimation value of the coupling factor based on a cross-correlation technique; $|\hat{r}_{ex}(t)|^2$ is the square of the effective magnitude of the correlation coefficient between the error signal outputted by the AEC and the far-end reference signal; t is a digital-signal sample time index number.

Optionally, the second obtaining unit is configured to: according to an Equation:

$$\delta^{opt}(t) = \max\left\{\frac{L \cdot \hat{\sigma}_y^2(t)}{\hat{\beta}(t) + \rho_0}, \delta_{min}\right\} = \max\left\{\frac{L \cdot \hat{\sigma}_y^2(t)|\hat{r}_{ex}(t)|^2}{\hat{\beta}(t)|_{Cross\text{-}correlation} + \rho}, \delta_{min}\right\},$$

obtain the time-varying regularization factor used for iteratively updating the coefficient vector of the FIR filter; wherein $\delta^{opt}(t)$ is the time-varying regularization factor; L is a quantity of coefficients of the FIR filter; $\hat{\sigma}_y^2(t)$ is the power of the signal received by the microphone;

$$\hat{\beta}(t) = \frac{\hat{\beta}(t)|_{Cross\text{-}correlation}}{|\hat{r}_{ex}(t)|^2}$$

is the effective estimation value of coupling factor; $\hat{\beta}(t)|_{Cross\text{-}correlation}$ is a biased estimation value of the coupling factor based on a cross-correlation technique; $|\hat{r}_{ex}(t)|^2$ is a square of an effective magnitude of a correlation coefficient between an error signal outputted by the AEC and the far-end reference signal; $\delta_{min}$ is a preset small real constant quantity, and $\delta_{min}>0$; $\rho_0$ and $\rho$ are preset small real constants, and $\rho>0$, $\rho_0>0$, respectively; t is a digital-signal sample time index number.

Optionally, the updating module is configured to: according to an Equation: $\vec{w}(t+1)=\vec{w}(t)+\mu \cdot \vec{x}(t)e^*(t)/[\vec{x}^H(t)\vec{x}(t)+\delta^{opt}(t)]$, sustainably adaptively update the coefficient vector of the FIR filter by applying a Normalized Least Mean Square (NLMS) algorithm, wherein, $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; $\mu$ is a predetermined coefficient updating step-size parameter, and $0<\mu<2$; $\vec{x}(t)$ is a far-end reference signal vector and $\vec{x}(t)=[x(t), x(t-1), \ldots, x(t-L+1)]^T$; $x(t-t2)$ is the far-end reference signal at a signal sample time (t-t2); T is a transpose operator; $\vec{x}^H(t)$ is a conjugate transpose matrix of $\vec{x}(t)$; $\delta^{opt}(t)$ is the time-varying regularization factor; $e^*(t)$ is a complex conjugate of e(t); $e(t)=y(t)-\vec{x}^H(t)\vec{w}(t)$, e(t) is the error signal outputted by the AEC at a signal sample time t; y(t) is the signal received by the microphone at the signal sample time t; $\vec{w}(t)=[w_0(t), w_1(t), \ldots, w_{L-1}(t)]^T$, $w_{t2}(t)$ is a (t2+1)-th coefficient of the FIR filter at the signal sample time t, t2=0, 1, 2, ..., L-1; t is a digital-signal sample time index number.

Optionally, the updating module is configured to: according to an Equation: $\vec{w}(t+1)=\vec{w}(t)+\mu \cdot X_{state}(t)[X_{state}^H(t)X_{state}(t)+\delta^{opt}(t) \cdot I_{P \times P}]^{-1} \cdot \vec{e}^*(t)$, applying an affine projection (AP) algorithm to sustainably adaptively update the coefficient vector of the FIR filter; wherein $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; $\mu$ is a predetermined coefficient updating step-size parameter, and $0<\mu<2$; $\delta^{opt}(t)$ is the time-varying regularization factor; $X_{state}(t)$ is L×P-dimension state matrix, and $X_{state}(t)=[\vec{x}(t), \vec{x}(t-1), \ldots, \vec{x}(t-P+1)]$; $\vec{x}(t-t3)$ is a far-end reference signal vector at a signal sample time (t-t3), and t3=0, 1, ..., P-1, P is an order quantity of the AP algorithm; $X_{state}^H(t)$ is a conjugate transpose matrix of $X_{state}(t)$; $I_{P \times P}$ is a P×P-dimension unit matrix; $\vec{e}^*(t)$ is a complex conjugate of $\vec{e}(t)$, and $\vec{e}(t)=\vec{y}(t)-X_{state}^H(t)\vec{w}(t)$; $\vec{e}(t)$ is a P-dimension error vector; $\vec{y}(t)$ is a P-dimension vector of the signal received by the microphone, and $\vec{y}(t)=[y(t), y(t-1), \ldots, y(t-P+1)]^T$; y(t-t3) is the signal received by the microphone at a signal sample time (t-t3); $\vec{w}(t)=[w_0(t), w_1(t), \ldots, w_{L-1}(t)]^T$, $w_{t2}(t)$ is a (t2+1)-th coefficient of the FIR filter at a signal sample time t, t2=0, 1, 2, ..., L-1; t is a digital-signal sample time index number.

Optionally, the preset signal includes a subband spectrum of a near-end speech signal received by a microphone and inputted in an Acoustic Echo Canceller (AEC) and a subband spectrum of a far-end reference speech signal; the coefficient vector of the FIR filter is a subband-domain coefficient vector of the FIR filter and the time-varying regularization factor is a subband-domain time-varying regularization factor. The obtaining module includes: a third obtaining unit, configured to obtain a subband power spectrum of the signal received by the microphone and an effective estimation value of a subband-domain coupling factor, respectively; a fourth obtaining unit, configured to, according to the subband power spectrum of the signal received by the microphone and the effective estimation value of the subband-domain coupling factor, obtain a subband-domain time-varying regularization factor used for iteratively updating the subband-domain coefficient vector of the FIR filter in a case that the subband-domain coefficient vector of the FIR filter is used for processing a preset signal.

Optionally, a manner of obtaining the subband power spectrum of the signal received by the microphone performed by the third obtaining unit is: according to an Equation:

$$\hat{\sigma}_Y^2(k, n) = \begin{cases} \alpha_a \cdot \hat{\sigma}_Y^2(k, n-1) + (1-\alpha_a) \cdot |Y(k,n)|^2, & \text{if } |Y(k,n)|^2 > \hat{\sigma}_Y^2(k, n-1) \\ \alpha_d \cdot \hat{\sigma}_Y^2(k, n-1) + (1-\alpha_d) \cdot |Y(k,n)|^2, & \text{if } |Y(k,n)|^2 \leq \hat{\sigma}_Y^2(k, n-1) \end{cases},$$

obtaining the subband power spectrum of the signal received by the microphone; wherein $\sigma_Y^2(k, n)$ is the subband power spectrum of the signal received by the microphone; $Y(k, n)$ is a subband spectrum of the signal received by the microphone; $\alpha_a$ and $\alpha_d$ are preset recursive constant quantities, and $0 \leq \alpha_a < \alpha_d < 1$; k is a subband index variable, $k=0, 1, 2, \ldots, K-1$, and K is a total quantity of subbands; n is a signal frame time index variable.

Optionally, a manner of obtaining the effective estimation value of the subband-domain coupling factor performed by the third obtaining unit, includes: obtaining a biased estimation value of the subband-domain coupling factor according to a cross-correlation method; obtaining a correction factor used for compensating for the biased estimation value of the subband-domain coupling factor; obtaining the effective estimation value of the subband-domain coupling factor according to the biased estimation value of the subband-domain coupling factor and the correction factor.

Optionally, a manner of obtaining the biased estimation value of the subband-domain coupling factor according to the cross-correlation method is: according to an Equation:

$$\hat{\beta}(k, n)\big|_{Cross\text{-}correlation} = \frac{\left|\sum_{n1=0}^{N_s-1} E(k, n-n1) X^*(k, n-n1)\right|^2}{\left|\sum_{n1=0}^{N_s-1} |X(k, n-n1)|^2\right|^2},$$

obtaining the biased estimation value of the subband-domain coupling factor; wherein $\hat{\beta}(k, n)|_{Cross\text{-}correlation}$ is the biased estimation value of the subband-domain coupling factor; $X^*(k, n-n1)$ is a complex conjugate of $X(k, n-n1)$; $n1=0, 1, 2, \ldots, N_s-1$, $N_s$ is a quantity of signal frames used in estimation of $\hat{\beta}(k, n)|_{Cross\text{-}correlation}$, and $N_s \ll L_s$, $L_s$ is a quantity of coefficients of the FIR filter in each subband; $E(k, n-n1)$ is a subband spectrum of an error signal outputted by the AEC at a signal frame time $(n-n1)$; $E(k, n)=Y(k, n)-\vec{X}_k^H(n)\vec{W}_k(n)$, $E(k, n)$ is the subband spectrum of the error signal outputted by the AEC at a signal frame time n; $Y(k, n)$ is the subband spectrum of the signal received by the microphone at the signal frame time n; $\vec{X}_k^H(n)$ is a conjugate transpose matrix of $\vec{X}_k(n)$; $\vec{X}_k(n)$ is a subband-spectrum vector of the far-end reference signal, and $\vec{X}_k(n)=[X(k, n), X(k, n-1), \ldots, X(k, n-L_s+1)]^T$; $X(k, n-n2)$ is a subband spectrum of a far-end reference signal at a signal frame time $(n-n2)$; T is a transpose operator; $\vec{W}_k(n)$ is the coefficient vector of the FIR filter in a subband k, $\vec{W}_k(n)=[W_0(k, n), W_1(k, n), \ldots, W_{L_s-1}(k, n)]^T$; $W_{n2}(k, n)$ is a $(n2+1)$-th coefficient of the FIR filter in the subband k at the signal frame time n, $n2=0, 1, 2, \ldots, L_s-1$; k is a subband index variable, $k=0, 1, 2, \ldots, K-1$, and K is a total quantity of subbands; n is a signal frame time index variable.

Optionally, a manner of obtaining the correction factor used for compensating for the biased estimation value of the subband-domain coupling factor is: obtaining a candidate value of a square of a magnitude of a correlation coefficient between a subband spectrum of an error signal outputted by an AEC and a subband spectrum of a far-end reference signal; obtaining, according to the candidate value of the square of the magnitude of the correlation coefficient between the subband spectrum of the error signal outputted by the AEC and the subband spectrum of the far-end reference signal, a square of an effective magnitude of the correlation coefficient between the subband spectrum of the error signal outputted by the AEC and the subband spectrum of the far-end reference signal, and taking the square of the effective magnitude of the correlation coefficient between the subband spectrum of the error signal outputted by the AEC and the subband spectrum of the far-end reference signal as the correction factor used for compensating for the biased estimation value of the subband-domain coupling factor.

Optionally, a manner of obtaining the candidate value of the square of the magnitude of the correlation coefficient between the subband spectrum of the error signal outputted by the AEC and the subband spectrum of the far-end reference signal is: according to an Equation:

$$\hat{r}(k, n) = \frac{\left|\sum_{n1=0}^{N_s-1} E(k, n-n1) X^*(k, n-n1)\right|^2}{\left(\sum_{n1=0}^{N_s-1} |E(k, n-n1)|^2\right)\left(\sum_{m=0}^{N_s-1} |X(k, n-n1)|^2\right)},$$

obtaining the candidate value of the square of the magnitude of the correlation coefficient between the subband spectrum of the error signal outputted by the AEC and the subband spectrum of the far-end reference signal; wherein $\vec{r}(k, n)$ is the candidate value of the square of the magnitude of the correlation coefficient between the subband spectrum of the error signal outputted by the AEC and the subband spectrum of the far-end reference signal; $X^*(k, n-n1)$ is a complex conjugate of $X(k, n-n1)$; $n1=0, 1, 2, \ldots, N_s-1$, $N_s$ is a quantity of frames used in estimation of $\hat{r}(k, n)$, and $N_s \ll L_s$, $L_s$ is a quantity of coefficients of the FIR filter in each subband; $E(k, n-n1)$ is a subband spectrum of the error signal outputted by the AEC at a signal frame time $(n-n1)$;

$E(k, n)=Y(k, n)-\vec{X}_k^H(n)\vec{W}_k(n)$, $E(k, n)$ is the subband spectrum of the error signal outputted by the AEC at a signal frame time n; $Y(k, n)$ is a subband spectrum of a signal received by the microphone; $\vec{X}_k^H(n)$ is a conjugate transpose matrix of $\vec{X}_k(n)$; $\vec{X}_k(n)$ is a subband spectrum vector of the far-end reference signal, and $\vec{X}_k(n)=[X(k, n), X(k, n-1), \ldots, X(k, n-L_s+1)]^T$; $X(k, n-n2)$ is the subband spectrum of the far-end reference signal at the signal frame time (n-n2); T is a transpose operator; $\vec{W}_k(n)$ is the coefficient vector of the FIR filter in a subband k; $\vec{W}_k(n)=[W_0(k, n), W_1(k, n), \ldots, W_{L_s-1}(k, n)]^T$; $W_{n2}(k, n)$ is a (n2+1)-th coefficient of the FIR filter in the signal frame time n in the subband k; n2=0, 1, 2, ..., Ls-1; k is a subband index variable; k=, 1, 2, ..., K-1, and K is a total quantity of subbands; n is a signal frame time index variable.

Optionally, a manner of obtaining, according to the candidate value of the square of the magnitude of the correlation coefficient between the subband spectrum of the error signal outputted by the AEC and the subband spectrum of the far-end reference signal, the square of the effective magnitude of the correlation coefficient between the subband spectrum of the error signal outputted by the AEC and the subband spectrum of the far-end reference signal is: according to an Equation:

$$|\hat{r}_{EX}(k, n)|^2 = \begin{cases} \hat{r}(k, n), & \text{if } \hat{r}(k, n) > |\hat{r}_{EX}(k, n-1)|^2 \\ |\hat{r}_{EX}(k, n-1)|^2, & \text{if } \hat{r}(k, n) \leq |\hat{r}_{EX}(k, n-1)|^2 \end{cases},$$

obtaining the square of the effective magnitude of the correlation coefficient between the subband spectrum of the error signal outputted by the AEC and the subband spectrum of the far-end reference signal; wherein $|\vec{r}_{EX}(k, n)|^2$ is the square of the effective magnitude of the correlation coefficient between the subband spectrum of the error signal outputted by the AEC and the subband spectrum of the far-end reference signal; $\hat{r}(k, n)$ is the candidate value of the square of the magnitude of the correlation coefficient between the subband spectrum of the error signal outputted by the AEC and the subband spectrum of the far-end reference signal; n is a signal frame time index variable.

Optionally, a manner of obtaining the effective estimation value of the subband-domain coupling factor according to the biased estimation value of the subband-domain coupling factor and the correction factor is: according to an Equation:

$$\hat{\beta}(k, n) = \frac{\hat{\beta}(k, n)|_{Cross-correlation}}{|\hat{r}_{EX}(k, n)|^2},$$

obtaining the effective estimation value of the subband-domain coupling factor; wherein $\hat{\beta}(k, n)$ is the effective estimation value of the subband-domain coupling factor, $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; n is a signal frame time index variable.

Optionally, the fourth obtaining unit is configured to: according to an Equation:

$$\delta^{opt}(k, n) = \max\left\{\frac{L_s \cdot \hat{\sigma}_Y^2(k, n)}{\hat{\beta}(k, n) + \rho_0}, \delta_{min}\right\} = \max\left\{\frac{L_s \cdot \hat{\sigma}_Y^2(k, n)|\hat{r}_{EX}(k, n)|^2}{\hat{\beta}(k, n)|_{Cross-correlation} + \rho},\right.$$

$\delta_{min}\}$, obtain the subband-domain time-varying regularization factor used for iteratively updating the subband-domain coefficient vector of the FIR filter in a case that the subband-domain coefficient vector of the FIR filter is used for processing the preset signal; wherein $\delta^{opt}(k, n)$ is the subband-domain time-varying regularization factor; $\hat{\sigma}_Y^2(k, n)$ is a subband power spectrum of a signal received by the microphone;

$$\hat{\beta}(k, n) = \frac{\hat{\beta}(k, n)|_{Cross-correlation}}{|\hat{r}_{EX}(k, n)|^2}$$

is the effective estimation value of the subband-domain coupling factor, $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; $\delta_{min}$ is a preset small real constant quantity, and $\delta_{min}>0$; $\rho_0$ and $\rho$ are preset small real constants, and $\rho>0$, $\rho_0>0$; n is a signal frame time index variable.

Optionally, the updating module is configured to: according to an Equation: $\vec{W}_k(n+1)=\vec{W}_k(n)+\mu \cdot \vec{X}_k(n)E^*(k, n)/[\vec{X}_k^H(n)\vec{X}_k(n)+\delta^{opt}(k, n)]$, sustainably adaptively update the subband-domain coefficient vector of the FIR filter using a Normalized Least Mean Square (NLMS) algorithm; wherein $\vec{W}_k(n+1)$ is a coefficient vector of the FIR filter in a subband k after the coefficient vector of the FIR filter is updated; $\vec{W}_k(n)$ is the coefficient vector of the FIR filter in the subband k before the coefficient vector of the FIR filter is updated; μ is a predetermined coefficient updating step-size parameter, and $0<\mu<2$; $\vec{X}_k(n)$ is a subband spectrum vector of the far-end reference signal; $\vec{X}_k(n)=[X(k, n), X(k, n-1), \ldots, X(k, n-L_s+1)]^T$; $X(k, n-n2)$ is a subband spectrum of the far-end reference signal at a signal frame time (n-n2); n2=0, 1, ..., Ls-1, Ls is a quantity of coefficients of the FIR filter in each subband, T is a transpose operator; $\vec{X}_k^H(n)$ is a conjugate transpose matrix of $\vec{X}_k(n)$; $E^*(k, n)$ is a complex conjugate of $E(k, n)$; $E(k, n)$ is the subband spectrum of the error signal outputted by AEC at a signal frame time n, and $E(k, n)=Y(k, n)-\vec{X}_k^H(n)\vec{W}_k(n)$; $Y(k, n)$ is the subband spectrum of the signal received by the microphone at the signal frame time n; $\vec{W}_k(n)=[W_0(k, n), W_1(k, n), \ldots, W_{L_s-1}(k, n)]^T$; $W_{n2}(k, n)$ is a (n2+1)-th coefficient of the FIR filter in the subband k at the signal frame time n; $\delta^{opt}(k, n)$ is the subband-domain time-varying regularization factor; k is a subband index variable, k=0, 1, 2, ..., K-1, and K is a total quantity of subbands; n is a signal frame time index variable.

Optionally, the updating module is configured to: according to an Equation: $\vec{W}_k(n+1)=\vec{W}_k(n)+\mu \cdot X_{state}(k, n) \cdot [X_{state}^H(k, n)X_{state}(k, n)+\delta^{opt}(k, n) \cdot I_{P \times P}]^{-1} \cdot \vec{E}_k^*(n)$, substantially adaptively update the subband-domain coefficient vector of the FIR filter using an affine projection (AP) algorithm; wherein $\vec{W}_k(n+1)$ is the coefficient vector of the FIR filter in a subband k after the coefficient vector of the FIR filter is updated; $\vec{W}_k(n)$ is the coefficient vector of the FIR filter in the subband k before the coefficient vector of the FIR filter is updated; μ is a predetermined coefficient updating step-size parameter, and 0<μ<2; $\delta^{opt}(k, n)$ is the subband-domain time-varying regularization factor; $X_{state}(k, n)$ is an L×P-dimension state matrix in the subband k, and $X_{state}(k, n)$=[ $\vec{X}_k(n)$, k(n−1), . . . , $\vec{X}_k(n−P+1)$]; $\vec{X}_k(n−n3)$ is a subband spectrum vector of the far-end reference signal at a signal frame time (n−n3), and n3=0, 1, . . . , P−1, P is an order quantity of the AP algorithm; $X_{state}^{H}(k, n)$ is a conjugate transpose matrix of $X_{state}(k, n)$; $I_{P\times P}$ is a P×P-dimension unit matrix; $\vec{E}_k^*(n)$ is a complex conjugate of $\vec{E}_k(n)$, and $\vec{E}_k(n)$= $\vec{Y}_k(n)−X_{state}^{H}(k, n)\vec{W}_k(n)$; $\vec{E}_k(n)$ is a P-dimension subband spectrum vector of an error signal; $\vec{Y}_k(n)$ is a P-dimension subband spectrum vector of a signal received by the microphone, and $\vec{Y}_k(n)$=[Y(k, n), Y(k, n−1), . . . , Y(k, n−P+1)]$^T$; Y(k, n−n3) is the signal received by the microphone at a signal frame time (n−n3); $\vec{W}_k(n)$=[W₀(k, n), W₁(k, n), . . . , $W_{L_s-1}(k, n)$]$^T$; $W_{n2}(k, n)$ is a (n2+1)-th coefficient of the FIR filter in the subband k at a signal frame time n, n2=0, 1, . . . , Ls−1, Ls is a quantity of coefficients of the FIR filter in each subband; k is a subband index variable, k=0, 1, 2, . . . , K−1, and K is a total quantity of subbands; n is a signal frame time index variable.

Beneficial effects of the present disclosure are as follow: in the above solutions, the time-varying regularization factor used for iteratively updating the coefficient vector of the FIR filter is obtained, and the coefficient vector of the FIR filter is sustainably adaptively updated according to the time-varying regularization factor, thus, the performance stability of the FIR filter is guaranteed, and the signal processing reliability is improved.

DETAILED DESCRIPTION

In order to make objectives, technical solutions and advantages of the present disclosure clearer, the present disclosure will be described in detail below with reference to accompanying drawings and specific embodiments.

Figures 1, 2:
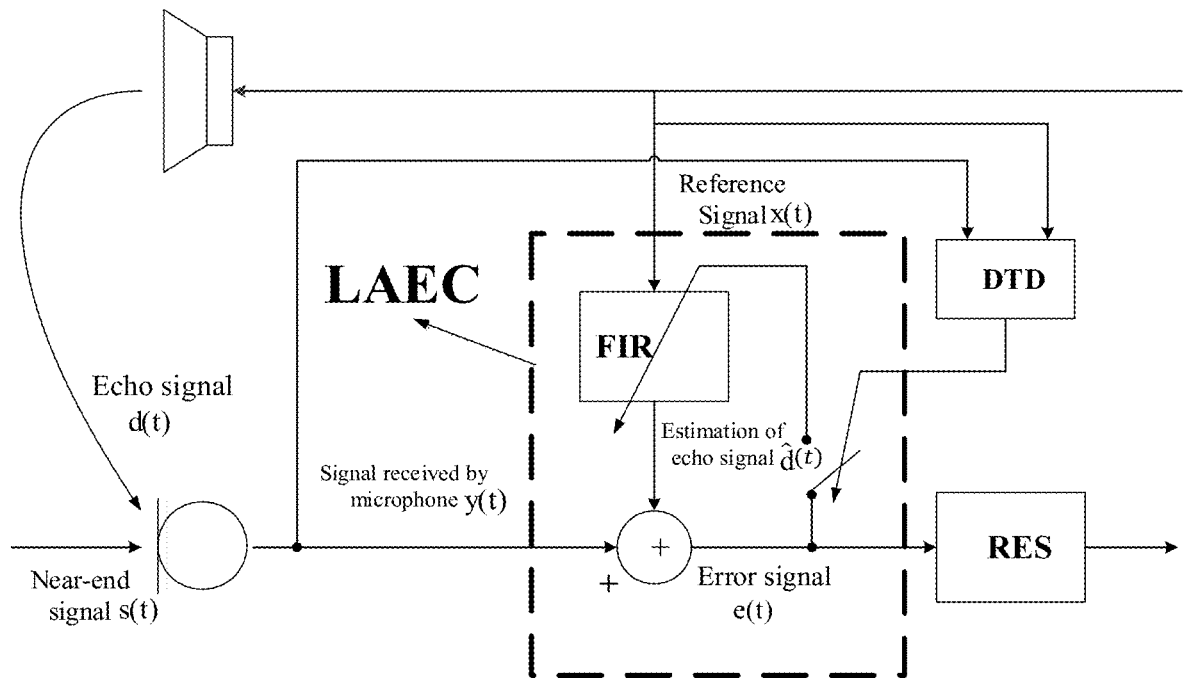
FIG. 1 shows a schematic diagram of an operation principle of an AEC.
FIG. 2 represents a flow diagram of a method of sustainably adaptively updating a coefficient vector of an FIR filter according to some embodiments of the present disclosure.

An operation principle of an AEC is shown in FIG. 1. FIG. 1 generally includes three processing modules, i.e., a linear echo canceller (LAEC), a "double talk" detector (DTD) and a nonlinear residual echo suppressor (RES). The LAEC estimates an echo signal (represented by d(t)) using an FIR linear filter and a downlink signal (i.e., a reference signal, represented by x(t)). The estimate (represented by $\hat{d}(t)$) is then subtracted from a signal (represented by y(t)) received by the microphone. The coefficient of the FIR filter is typically updated adaptively using an echo cancellation (NLMS) algorithm by using an error signal (represented by e(t)) only in a case of a "single talk" (i.e. no near-end speech signal represented by s(t))), and is expressed by an Equation 1 as:

$$e(t)=y(t)-\vec{x}^T(t)\vec{w}(t) \qquad \text{Equation 1:}$$

Where, $$\vec{w}(t+1) = \vec{w}(t) + \mu \frac{e(t)\vec{x}(t)}{\vec{x}^T(t)\vec{x}(t)+\delta} \qquad \text{Equation 2}$$

Where $\vec{w}(t)$ denotes a coefficient vector of the FIR filter at time t, and $\vec{w}(t)$=[w₀(t), . . . , $w_{L-1}(t)$]$^T$; $\vec{x}(t)$ denotes a time delay line vector of a reference signal at the time t, and $\vec{x}(t)$=[x(t), . . . , x(t−L+1)]$^T$; μ is a parameter of a constant learning rate; δ is a regularization factor parameter of a small normal quantity; L is the number of filter coefficients.

In a case of a "double talk" (i.e. a near-end speech signal (s(t)) exists), a coefficient updating process of the FIR filter will be frozen to avoid divergence of a NLMS learning algorithm. A detection to the "double talk" is done by the DTD. Due to non-linearity of a downlink speaker and an uplink microphone, the LAEC can only cancel a linear component of an echo signal in the signal (y(t)) received by the microphone, and residual non-linear component of the echo signal will be suppressed by a subsequent residual echo suppression (RES) module.

It is pointed out above that an adaptive updating of an FIR filter coefficient in the AEC must be performed only under the condition that there is no near-end speech signal (i.e., the "single talk" mode). In a case that a near-end speech signal exists (i.e., in a "double talk" mode), adaptive updating of a coefficient of the FIR filter must stopped so as not to cause damage to the near-end speech signal due to divergence of the coefficient the filter. The detection in the "double talk" mode is usually done by the DTD, but a processing delay of the DTD and possible misjudgment thereof will seriously affect an adaptive learning behavior of an AEC filter and further affect a performance of the AEC. For this reason, a number of adaptive variable step-size learning techniques are proposed to sustainably update the coefficient of the FIR filter iteratively, all of the techniques use a learning-rate variable quantity (i.e. a variable step-size parameter), The learning-rate variable quantity is adaptively adjusted with respect to a gradient of the learning-rate variable quantity according to a cost function of the AEC, with a disadvantage that the learning-rate variable quantity is very sensitive to an initialization of an algorithm-related parameter and is only suitable for a stationary input signal. It is thus difficult to obtain good performance in practical applications, especially in applications of echo cancellation. Thus, a so-called generalized normalized gradient descent (GNGD) algorithm is proposed to overcome the above disadvantage, as shown in Equations 3 to 5:

$$\vec{w}(t+1) = \vec{w}(t) + \mu \frac{e(t)\vec{x}(t)}{\vec{x}^T(t)\vec{x}(t) + \delta(t)} = \vec{w}(t) + \eta(t)e(t)\vec{x}(t); \quad \text{Equation 3}$$

$$\eta(t) = \frac{\mu}{\vec{x}^T(t)\vec{x}(t) + \delta(t)}; \quad \text{Equation 4}$$

$$\delta(t) = \delta(t-1) - \rho_1 \mu \frac{e(t)e(t-1)\left[\vec{x}^T(t)\vec{x}(t-1)\right]}{\left[\vec{x}^T(t-1)\vec{x}(t-1) + \delta(t-1)\right]^2}; \quad \text{Equation 5}$$

Where $\eta(t)$ is a learning rate; $\delta(t)$ is a learning rate control parameter; $\rho_1$ is an adaptive iteration step-size parameter of $\delta(t)$.

Although the GNGD algorithm is insensitive to the initialization of associated parameters, the control parameter ($\delta(t)$) of the learning rate ($\eta(t)$) is adaptively adjusted based on behavior characteristics of an NLMS random gradient, the GNGD can only make relatively slow adaptive adjustment (often requiring tens or hundreds of samples). For this reason, the GNGD algorithm cannot deal well with the "double talk" case with the near-end (non-stationary) speech.

In view of the above, the present disclosure is directed to the problem that an adaptive learning characteristic of a related FIR filter cannot guarantee performance stability of the FIR filter and affects a signal processing reliability, and the present disclosure provides a method and a device of sustainably updating a coefficient vector of a finite impulse response filter.

As shown in FIG. 2, some embodiments of the present disclosure provide a method of sustainably adaptive updating a coefficient vector of a finite impulse response (FIR) filter. The method includes steps 21-22.

Step 21: obtaining a time-varying regularization factor used for iteratively updating a coefficient vector of a FIR filter in a case that the coefficient vector of the FIR filter is used for processing a preset signal.

It should be noted that the preset signal includes one of combined pairs of following: a far-end reference speech signal inputted in an acoustic echo canceller (AEC) and a near-end speech signal received by a microphone; a noise reference signal and a system input signal in an adaptive noise cancellation system; an interference reference signal and a system input signal in an adaptive interference cancellation system, and an excitation input signal and an unknown system output signal to be identified in adaptive system identification.

Step 22: updating the coefficient vector of the FIR filter according to the time-varying regularization factor.

In the above solution, the time-varying regularization factor used for iteratively updating the coefficient vector of the FIR filter is obtained, and the coefficient vector of the FIR filter is sustainably adaptively updated according to the time-varying regularization factor. In this way, the performance stability of the FIR filter is guaranteed, and the signal processing stability is improved.

Taking as an example a case in which the far-end reference speech signal inputted in the AEC and the near-end speech signal received by the microphone are processed, and starting from a time domain and a subband domain, respectively, the present disclosure will be described as follows.

I. Time Domain

For a time-domain LAEC shown in FIG. 2, the present disclosure focuses on a sustainable adaptive learning issue that a good robustness is generated to a "double talk" and an echo path change, and a real-time on-line calculation method of time-varying regularization factor for a time-domain adaptive learning of the LAEC is presented. The adaptive iterative updating algorithm for coefficient vector of the FIR filter in the LAEC formed by using the time-varying regularization factor has a good robustness on the "double talk" and the echo path change. First, taking as an example a case of a normalized least mean square (NLMS) algorithm in a time-domain LAEC adaptive learning, a method of solving the time-varying regularization factor on-line in real time is described in detail. Then, the time-varying regularization factor is applied to the sustainable adaptive learning of the LAEC, and an NLMS algorithm of the time-varying regularization factor and an affine projection (AP) algorithm of the time-varying regularization factor are presented respectively.

Referring to the time-domain LAEC shown in FIG. 2, assuming that a time domain signal involved is a complex signal, the coefficient vector of the FIR filter (or a complex coefficient vector of the FIR filter) at time t is expressed by an Equation 6: $\vec{w}(t)=[w_0(t), w_1(t), \ldots, w_{L-1}(t)]^T$.

Where $w_{t2}(t)$ is the (t2+1)-th coefficient of the FIR filter at a signal sample time t, t2=0, 1, 2, ..., L−1; L is the number of coefficients of the FIR filter; T is a transpose operator; t is a time index number of a digital signal sample.

Then the NLMS learning algorithm for updating the coefficient of the FIR filter can be expressed by an Equation 7 and an Equation 8 as follow:

$$e(t) = y(t) - \vec{x}^H(t)\vec{w}(t);$$

$$\vec{w}(t+1) = \vec{w}(t) + \mu \cdot \vec{x}(t)e^*(t)/[\vec{x}^H(t)\vec{x}(t) + \delta];$$

where $e(t)$ is an error signal outputted by the AEC at a signal sample time t; $y(t)$ is a signal received by the microphone at the signal sample time t; $\vec{x}^H(t)$ is a conjugate transpose matrix of $\vec{x}(t)$; $\vec{x}(t)$ is a far-end reference signal vector; and a symbol "*" represents a complex conjugate operation; H is a complex conjugate transpose operator; $0<\mu<2$ is a predetermined step-size parameter for updating a coefficient, $\delta>0$ is a small positive real constant called a "regularization factor" to avoid the denominator of the Equation 8 to be zero.

Specifically, $\vec{x}(t)$ is expressed as $\vec{x}(t) \triangleq [x(t), x(t-1), \ldots, x(t-L+1)]^T$, using the Equation 9;
where $x(t-t2)$ is the far-end reference signal at the signal sample time t-t2.

$y(t)$ is defined by an Equation 10: $y(t)=d(t)+s(t)$;
where $d(t)$ is an echo signal at time t; $s(t)$ is the near-end speech signal at the time t.

Since an adaptive iterative step-size of the filter coefficients can be controlled by a using "time-varying" regularization factor $\delta(t)$ parameter, this "time-varying" regularization factor parameter $\delta(t)$ must be able to be solved on-line in real time. In fact, assuming that an ideal complex coefficient vector of a sub-FIR filter is $\vec{h}(t)$, which is estimated as $\vec{w}(t)$, then an adaptive vector of a filter system is defined using an Equation 11 as:

$$\vec{\Delta}(t) \triangleq \vec{h}(t) - \vec{w}(t) \triangleq [\Delta_0(t), \Delta_1(t), \ldots, \Delta_{L-1}(t)]^T$$

Then the error e(t) outputted by the LAEC can be expressed by an Equation 12 as follows:

$$e(t) = y(t) - \vec{x}^H(t)\vec{w}(t) = \in(t) + s(t)$$

where $\in(t) \triangleq \vec{x}^H(t)\vec{\Delta}(t)$ is defined as a distortion-free error of the LAEC or a systematic error of the filter (i.e. a residual echo).

Then, the δ(t) must be chosen such that the following variable quantities are minimized, i.e. an Equation 13:

$$E\{\|\vec{\Delta}(t)\|_2^2\} = E\{\vec{\Delta}^H(t)\vec{\Delta}(t)\} \to \min$$

Here, E{•} is a statistical average operator, and $\|\cdot\|_2$ is a 2-norm of a complex vector. According to the Equation 8, substituting δ(t) for δ results in an Equation 14: $\vec{\Delta}(t+1) = \vec{\Delta}(t) - \mu \cdot \vec{x}(t)e^*(t)/[\vec{x}^H(t)\vec{x}(t) + \delta(t)]$.

Further, an Equation 15 is obtained by applying the 2-norm of the complex vector to the Equation 14:

$$\|\vec{\Delta}(t+1)\|_2^2 =$$

$$\|\vec{\Delta}(t)\|_2^2 - \frac{\mu \cdot \{2|\in(t)|^2 + s(t)\in^*(t) + s^*(t)\in(t)\}}{\|\vec{x}(t)\|_2^2 + \delta(n)} + \frac{\mu^2\|\vec{x}(t)\|_2^2 \cdot |e(t)|^2}{[\|\vec{x}(t)\|_2^2 + \delta(t)]^2} \approx$$

$$\|\vec{\Delta}(t)\|_2^2 - \frac{\mu \cdot \{2|\in(t)|^2 + s(t)\in^*(t) + s^*(t)\in(t)\}}{L\sigma_x^2(t) + \delta(t)} + \frac{\mu^2 L\sigma_x^2(t) \cdot |e(t)|^2}{[L\sigma_x^2(t) + \delta(t)]^2}$$

Where $\sigma_x^2(t)$ is expressed as by using an Equation 16: $\sigma_x^2(t) = E\{|x(t)|^2\}$ Assuming that s(t) is not related with x(t), then applying a statistical average on both sides of the Equation 15 may derive an Equation 17:

$$E\{\|\vec{\Delta}(t+1)\|_2^2\} = E\{\|\vec{\Delta}(t)\|_2^2\} - \frac{2\mu\sigma_\in^2(t)}{L\sigma_x^2(t) + \delta(t)} + \frac{\mu^2 L\sigma_x^2(t) \cdot \sigma_e^2(t)}{[L\sigma_x^2(t) + \delta(t)]^2}$$

Further, an Equation 18 and an Equation 19 are defined:

$$\sigma_\in^2(t) \triangleq E\{|\in(t)|^2\}; \quad \text{Equation 18:}$$

$$\sigma_e^2(t) \triangleq E\{|e(t)|^2\} \quad \text{Equation 19:}$$

Further assuming that a system adaptive vector $\vec{\Delta}(t)$ for a t-th frame is unrelated with δ(t) and is related only with δ(t−1), δ(t−2), . . . , etc., then an Equation 20 is provided as follows:

$$\frac{\partial}{\partial \delta(t)} E\{\|\vec{\Delta}(t+1)\|_2^2\} \approx \frac{2\mu\sigma_\in^2(t)}{[L\sigma_x^2(t) + \delta(t)]^2} - \frac{2\mu^2 L\sigma_x^2(t) \cdot \sigma_e^2(t)}{[L\sigma_x^2(t) + \delta(t)]^3}$$

If the Equation twenty is set as zero, then an optimal regularization factor $\delta^{opt}(t)$ is obtained and expressed by an Equation 21 as:

$$\delta^{opt}(t) = \frac{L \cdot \sigma_x^2(t)[\mu\sigma_e^2(t) - \sigma_\in^2(t)]}{\sigma_\in^2(t)}$$

Assuming further that L≫1, and that x(t) is a whitened excitation signal (if the x(t) is not the whitened excitation signal, then x(t) can be changed to a whitened excitation source by a whitening process), then there are following Equations:

$$\sigma_\in^2(t) = E\{|\in(t)|^2\} = \sigma_x^2(t)E\{\|\vec{\Delta}(t)\|_2^2\} \quad \text{Equation 22:}$$

$$\sigma_e^2(t) = \sigma_\in^2(t) + \sigma_s^2(t), \text{ where } \sigma_s^2(t) \triangleq E\{|s(t)|^2\} \quad \text{Equation 23:}$$

If μ=1, then the Equation 21 can be expressed by using the Equation 24 as follows.

$$\delta^{opt}(t) = \frac{L \cdot \sigma_x^2(t)[\mu\sigma_e^2(t) - \sigma_\in^2(t) + \sigma_s^2(t)]}{\sigma_x^2(t)E\{\|\vec{\Delta}(t)\|_2^2\}} = \frac{L[\sigma_y^2(t) - \sigma_d^2(t)]}{E\{\|\vec{\Delta}(n)\|_2^2\}} \quad \text{Equation 24}$$

In the Equation 24, $\sigma_y^2(t) \triangleq E\{|y(t)|^2\}$ is a power of a signal received by the microphone at time t, and $\sigma_d^2(t) \triangleq E\{|d(t)|^2\}$ is a power of an echo signal at the time t. Since the power $\sigma_d^2(t)$ of the echo signal is not directly available, the present disclosure simplifies, for purpose of facilitating actual implementation, the Equation 24 to:

$$\delta^{opt}(t) \approx \frac{L \cdot \sigma_y^2(t)}{E\{\|\vec{\Delta}(t)\|_2^2\}} \quad \text{Equation 25}$$

$\delta^{opt}(t)$ as a control variable quantity for the iteration step-size of updating a filter coefficient vector, can be estimated and obtained by using the Equation 25. Although the adaptive iteration of the filter coefficients is slightly over-suppressed in the presence of echoes, a desired effect of slowing down the iteration of updating a filter coefficient vector can still be achieved when a near-end speech signal having a higher level is present. The engineering calculation of $\sigma_y^2(t)$ can be implemented on-line in real time by using a first order recursive model, considering that $\sigma_y^2(t)$ must track a change of a level of the near-end speech signal in time, the present disclosure uses the following manner of "fast attack/slow decay" to estimate the variable $\sigma_y^2(t)$ online in real time, that is, an Equation 26 is provided:

$$\hat{\sigma}_y^2(t) = \begin{cases} \alpha_a \cdot \hat{\sigma}_y^2(t-1) + (1-\alpha_a) \cdot |y(t)|^2, & \text{if } |y(t)|^2 > \hat{\sigma}_y^2(t-1) \\ \alpha_d \cdot \hat{\sigma}_y^2(t-1) + (1-\alpha_d) \cdot |y(t)|^2, & \text{otherwise} \end{cases}$$

where $0 \leq \alpha_a < \alpha_d < 1$ is a preset recursive constant.

In addition, the Equation 25 also relates to estimation of the parameter $E\{\|\vec{\Delta}(t)\|_2^2\}$, the estimation of the parameter $E\{\|\vec{\Delta}(t)\|_2^2\}$ is actually estimation of an echo coupling factor β(t). In the case of the "simple talk," the coupling factor. β(t), according to a definition thereof, can be estimated directly by the following Equation 27, i.e.:

$$\beta(t)|_{Direct} \triangleq \frac{E\{|e(t)|^2\}}{E\{|x(t)|^2\}} \xrightarrow{\text{Single talk}} \frac{E\{|e(t)|^2\}}{E\{|x(t)|^2\}}$$

Obviously, the Equation 27 cannot be applied to the case of "double talk". In the case of the "double talk", in order to overcome an influence of the near-end speech s(t), we propose a cross-correlation technique to estimate the coupling factor β(t), that is, an Equation 28:

$$\beta(t)|_{cross\text{-}correlation} \triangleq \frac{|E\{e(t)x^*(t)\}|^2}{[E\{|x(t)|^2\}]^2} = \frac{|E\{\epsilon(t)x^*(t)\}|^2}{[E\{|x(t)|^2\}]^2}.$$

Although the Equation 28 removes the influence of the near-end speech s(t) by using statistical non-correlation between the near-end signal s(t) and the reference signal x(t), this estimate is a biased estimate and therefore there is a bias. Therefore, we need to compensate it to improve an estimation accuracy of coupling factor $\beta(t)$.

Considering now the case of the "single talk", by dividing the Equation 28 with the Equation 27, an Equation 28 may be obtained:

$$\frac{\beta(t)|_{Cross\text{-}correlation}}{\beta(t)|_{Direct}} =$$

$$\frac{|E\{\epsilon(t)x^*(t)\}|^2}{E\{|\epsilon(t)|^2\} \cdot E\{|x(t)|^2\}} \xrightarrow{\text{Single talk}} \frac{|E\{e(t)x^*(t)\}|^2}{E\{|e(t)|^2\} \cdot E\{|x(t)|^2\}} = |r_{ex}(t)|^2 \leq 1;$$

where $r_{ex}(t)$ is a (normalized) correlation coefficient between the LAEC output signal e(t) and the far-end reference signal x(n) in the case of the "single talk". The Equation 29 shows that, in the case of "single talk", a square of a magnitude of the (normalized) correlation coefficient between the time-domain LAEC output signal e(t) and the far-end reference signal x(t) is exactly a ratio between $\beta(t)|_{Cross\text{-}correlation}$ estimated by the cross-correlation technique and $\beta(t)|_{Direct}$ estimated by the direct method. If we can estimate the square of the magnitude of this correlation coefficient effectively, we can use it to compensate and correct $\beta(t)|_{Cross\text{-}correlation}$ estimated by the cross-correlation technique, thereby improving an estimation accuracy of the couple factor $\beta(t)$. That is to say, the estimation of $E\{\|\vec{\Delta}(t)\|_2^2\}$ can be expressed by using an Equation 30 as:

$$\{\|\vec{\Delta}(t)\|_2^2\} \triangleq \beta(t) = \frac{\beta(t)|_{cross\text{-}correlation}}{|r_{ex}(t)|^2}.$$

Obviously, the Equation 30 for estimating the coupling factor applies not only to the case of the "single talk" but also applies to the case of "double talk" as long as the square of the magnitude of the correlation coefficient between e(t) and x(t) can be effectively estimated. How to correctly and effectively estimate the square of the magnitude of the correlation coefficient can be obtained from following analytical discussion and a relevant inspiration may be obtained. Taking note of such a fact that in the case of "single talk", $|r_{ex}(t)|^2$ may be calculated according to the definition given in Equation 29, that is an Equation 31 is provided:

$$|r_{ex}(t)|^2 = \frac{|E\{e(t)x^*(t)\}|^2}{E\{|e(t)|^2\} \cdot E\{|x(t)|^2\}} \xrightarrow{\text{Single talk}} \frac{|E\{\epsilon(t)x^*(t)\}|^2}{E\{|\epsilon(t)|^2\}E\{|x(t)|^2\}}$$

In the case of "double talk", note that a candidate value of the square of the magnitude of the correlation coefficient at this time is r(t), then r(t) can be express by using an Equation 32 as:

$$r(t) = \frac{|E\{e(t)x^*(t)\}|^2}{E\{|e(t)|^2\}E\{|x(t)|^2\}} \xrightarrow{\text{Double talk}}$$

$$\frac{|E\{\epsilon(t)x(t)\}|^2}{[E\{|\epsilon(t)|^2\} + E\{|s(t)|^2\}]E\{|x(t)|^2\}} < |r_{ex}(t)|^2$$

Considering comprehensively an effective estimation value of the Equation 31 and the Equation 32, the effective estimate $|\hat{r}_{ex}(t)|^2$ of $|r_{ex}(t)|^2$ can be expressed by using the following Equation 33:

$$|\hat{r}_{ex}(t)|^2 = \begin{cases} \hat{r}(t), & \text{If } \hat{r}(t) > |\hat{r}_{ex}(t-1)|^2 \\ |\hat{r}_{ex}(t-1)|^2, & \text{Otherwise} \end{cases}$$

In terms of engineering implementation, the estimation of the $\beta(t)|_{Cross\text{-}correlation}$ in the Equation 28 can be approximately expressed by using the Equation 34 as:

$$\hat{\beta}(t)|_{Cross\text{-}correlation} \approx \frac{\left|\sum_{t1=0}^{T_s-1} e(t-t1)x^*(t-t1)\right|^2}{\left|\sum_{t1=0}^{T_s-1} |x(t-t1)|^2\right|^2}.$$

The Equation 32 can be expressed by using an Equation 35 as:

$$\hat{r}(t) \approx \frac{\left|\sum_{t1=0}^{T_s-1} e(t-t1)x^*(t-t1)\right|^2}{\left(\sum_{t1=0}^{T_s-1} |e(t-t1)|^2\right)\left(\sum_{t1=0}^{T_s-1} |x(t-t1)|^2\right)}.$$

Where $T_s \ll L$ is a positive integer which is used to estimate the number of samples used in Equations 34 and 35. The Equation 30, and the Equation 33 to the Equation 35 constitute a high-precision estimation algorithm for $\beta(t) \triangleq E\{\|\vec{\Delta}(t)\|_2^2\}$ that can be used for both the case of "double talk" and a case of an echo path changing scene. The estimated value obtained by this algorithm is substituted into the Equation 25 to obtain an Equation 36:

$$\delta^{opt}(t) = \frac{L \cdot \hat{\sigma}_y^2(t)}{\hat{\beta}(t) + \rho_0} = \frac{L \cdot \hat{\sigma}_y^2(t)|\hat{r}_{ex}(t)|^2}{\hat{\beta}(t)|_{Cross\text{-}correlation} + \rho}$$

where $\rho$ and $\rho_0 > 0$ are very small real constants in order to avoid the denominator of the Equation 36 from being zero, $$\hat{\beta}(t) = \frac{\hat{\beta}(t)|_{Cross\text{-}correlation}}{|\hat{r}_{ex}(t)|^2}.$$

From the Equation 36, it can be seen that in the case of "single talk", $\hat{\sigma}_y^2(t) = \sigma_d^2(t)$, if the echo path changes at this time, in the case, $\hat{\sigma}_\epsilon^2(t)$ will increase rapidly, leading to $|\hat{r}_{ex}(t)|^2 \approx 1$. Correspondingly, $\hat{\beta}(t)|_{Cross\text{-}correlation}$ also increases rapidly (because the residual echo signal x(t) is strongly correlated with the far-end reference signal x(t) at this time), while a change of $\hat{\sigma}_y^2(t)$ is not too large. Therefore, $\delta^{opt}(t)$ becomes smaller, which is advantageous to accelerate the iteration of updating the coefficient vector of a subband FIR filter. In the case of "double talk", $\hat{\sigma}_y^2(t)=\sigma_d^2(t)+\sigma_s^2(t)$, $\sigma_s^2(t)$ of the near-end speech signal appears, causing that $\hat{\sigma}_y^2(t)$ rapidly increases. On the other hand, the estimation (see the Equations 33 and 34) of $\hat{\beta}(t)|_{Cross\text{-}correlation}$ and the estimation of $|\hat{r}_{ex}(t)|^2$ are robust to the case of "double talk", thus, parameter values of the estimations do not change significantly. Therefore, $\delta^{opt}(t)$ becomes larger rapidly, which greatly slows down the iteration of updating the filter coefficient vector, and avoids divergence of updating the filter coefficient vector in the case of "double talk".

On the other hand, under a condition that a level of the near-end speech signal is low or there is no near-end speech signal, in order to stabilize the iterative algorithm for updating a filter coefficient vector, the regularization factor must be defined to be a small real constant $\delta_{min}>0$. Therefore, a reasonable on-line calculation Equation of the regularization factor is shown in an Equation 37:

$$\delta^{opt}(t) = \max\left\{\frac{L \cdot \hat{\sigma}_y^2(t)|\hat{r}_{ex}(t)|^2}{\hat{\beta}(t)|_{Cross\text{-}correlation}+\rho}, \delta_{min}\right\}$$

From the above derivation process, it can be seen that a time-domain $\delta^{opt}(t)$ can be obtained by obtaining $\hat{\sigma}_y^2(t)$, $|\hat{r}_{ex}(t)|^2$, $\hat{\beta}(t)|_{Cross\text{-}correlation}$. The specific implementation of the step 21 in the present disclosure is as follows: obtaining a power of a signal received by a microphone and an effective estimation value of a coupling factor; according to the power of the signal received by the microphone and the effective estimation value of the coupling factor, obtaining a time-varying regularization factor for iteratively updating the coefficient vector of the FIR filter when the coefficient vector of the FIR filter is used for processing a preset signal.

Further, the method of obtaining the power of the signal received by the microphone is as follows:
according to the Equation 26:

$$\hat{\sigma}_y^2(t) = \begin{cases} \alpha_a \cdot \hat{\sigma}_y^2(t-1) + (1-\alpha_a) \cdot |y(t)|^2, & \text{if } |y(t)|^2 > \hat{\sigma}_y^2(t-1) \\ \alpha_d \cdot \hat{\sigma}_y^2(t-1) + (1-\alpha_d) \cdot |y(t)|^2, & \text{if } |y(t)|^2 \le \hat{\sigma}_y^2(t-1) \end{cases}$$

obtaining the power of the signal received by the microphone;

where $\hat{\sigma}_y^2(t)$ is the power of the signal received by the microphone; y(t) is the signal received by the microphone; $\alpha_a$ and $\alpha_d$ are preset recursive constant quantities, and $0 \le \alpha_a < \alpha_d < 1$; t is a digital-signal time index number.

Further, the method of obtaining the effective estimation value of the coupling factor is as follows: obtaining a biased estimation value of the coupling factor according to a cross-correlation method; obtaining a correction factor used for compensating for the biased estimation value of the coupling factor; obtaining the effective estimation value of the coupling factor according to the biased estimation value of the coupling factor and the correction factor.

Further, the step of obtaining the biased estimation value of the coupling factor according to the cross-correlation method includes:

according to the Equation 34:

$$\hat{\beta}(t)|_{Cross\text{-}correlation} = \frac{\left|\sum_{t1=0}^{T_s-1} e(t-t1)x^*(t-t1)\right|^2}{\left|\sum_{t1=0}^{T_s-1} |x(t-t1)|^2\right|^2},$$

obtaining the biased estimation value of the coupling factor, where $\hat{\beta}(t)|_{Cross\text{-}correlation}$ is the biased estimation value of the coupling factor based on the cross-correlation technique. $x^*(t-t1)$ is a complex conjugate of $x(t-t1)$; $t1=0, 1, 2, \ldots, T_s-1$, $T_s$ is the number of samples used in the estimation of the $\hat{\beta}(t)|_{Cross\text{-}correlation}$, and $T_s \ll L$, L is the number of coefficients of the FIR filter; $e(t-t1)$ is an error signal outputted by the AEC at the signal sample time $(t-t1)$, $e(t)=y(t)-\vec{x}^H(t)\vec{w}(t)$, $e(t)$ is an error signal outputted by the AEC at the signal sample time t; y(t) is a signal received by the microphone at the signal sample time t; $\vec{x}^H(t)$ is a conjugate transpose matrix of $\vec{x}(t)$; $\vec{x}(t)$ is the far-end reference signal vector and $\vec{x}(t)=[x(t), x(t-1), \ldots, x(t-L+1)]^T$; $x(t-t2)$ is the far-end reference signal at the signal sample time $(t-t2)$; T is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ is the $(t2+1)$-th coefficient of the FIR filter at the signal sample time t, $t2=0, 1, 2, \ldots, L-1$.

Further, the step of obtaining the correction factor used for compensating for the biased estimation value of the coupling factor includes: obtaining a candidate value of the square of a magnitude of a correlation coefficient between the error signal outputted by the AEC and the far-end reference signal; obtaining the square of an effective magnitude of the correlation coefficient between the error signal outputted by the AEC and the far-end reference signal based on the candidate value of the square of the magnitude of the correlation coefficient between the error signal outputted by the AEC and the far-end reference signal, and taking the square of an effective magnitude of the correlation coefficient between the error signal outputted by the AEC and the far-end reference signal as the correction factor used for compensating for the biased estimation value of the coupling factor.

Further, the step of obtaining the candidate value of the square of the magnitude of the correlation coefficient between the error signal outputted by the AEC and the far-end reference signal includes: according to the Equation 35:

$$\hat{r}(t) = \frac{\left|\sum_{t1=0}^{T_s-1} e(t-t1)x^*(t-t1)\right|^2}{\left(\sum_{t1=0}^{T_s-1} |e(t-t1)|^2\right)\left(\sum_{t=0}^{T_s-1} |x(t-t1)|^2\right)},$$

obtaining the candidate value of the square of the magnitude of the correlation coefficient between the error signal outputted by the AEC and the far-end reference signal;

where $\hat{r}(t)$ is the candidate value of the square of the magnitude of the correlation coefficient between the error signal outputted by the AEC and the far-end reference signal; $x(t-t1)$ is the far-end reference signal at the signal sample time $(t-t1)$; $x^*(t-t1)$ is the complex conjugate of x(t−t1); t1=0, 1, 2, ..., $T_s$−1, $T_s$ is the number of samples used in the estimation of $\hat{r}(t)$, and $T_s \ll L$, L is the number of coefficients of the FIR filter; e(t−t1) is the error signal outputted by the AEC at the signal sample time (t−t1), e(t)=y(t)−$\vec{x}^H(t)\vec{w}(t)$, e(t) is an error signal outputted by the AEC at the signal sample time t; y(t) is the signal received by the microphone at the signal sample time t; $\vec{x}^H(t)$ is the conjugate transpose matrix of $\vec{x}(t)$; $\vec{x}(t)$ is the far-end reference signal vector and $\vec{x}(t)$=[x(t), x(t−1), ..., x(t−L+1)]$^T$; x(t−t2) is the far-end reference signal at the signal sample time (t−t2); T is a transpose operator; $\vec{w}(t)$ is the coefficient vector of the FIR filter, $\vec{w}(t)$=[$w_0(t), w_1(t), ..., w_{L-1}(t)$]$^T$, $w_{t2}(t)$ is the (t2+1)-th coefficient of the FIR filter at the signal sample time t, t2=0, 1, 2, ..., L−1.

Further, the step of obtaining the square of the effective magnitude of the correlation coefficient between the error signal outputted by the AEC and the far-end reference signal according to the candidate value of the square of the magnitude of the correlation coefficient between the error signal outputted by the AEC and the far-end reference signal, includes:

according to an Equation 33:

$$|\hat{r}_{ex}(t)|^2 = \begin{cases} \hat{r}(t), & \text{if } \hat{r}(t) > |\hat{r}_{ex}(t-1)|^2 \\ |\hat{r}_{ex}(t-1)|^2, & \text{if } \hat{r}(t) \leq |\hat{r}_{ex}(t-1)|^2 \end{cases}$$

obtaining the square of the effective magnitude of the correlation coefficient between the signal outputted by the AEC and the far-end reference signal;

where $|\hat{r}_{ex}(t)|^2$ is the square of the effective magnitude of the correlation coefficient between the error signal outputted by the AEC and the far-end reference signal; $\hat{r}(t)$ is the candidate value of the square of the magnitude of the correlation coefficient between the error signal outputted by the AEC and the far-end reference signal.

Further, the step of obtaining the effective estimation value of the coupling factor according to the biased estimation value of the coupling factor and the correction factor includes: obtaining the effective estimation value of the coupling factor according to the Equation:

$$\hat{\beta}(t) = \frac{\hat{\beta}(t)|_{Cross\text{-}correlation}}{|\hat{r}_{ex}(t)|^2},$$

where $\hat{\beta}(t)$ is the effective estimation value of the coupling factor; $\hat{\beta}(t)|_{Cross\text{-}correlation}$ is the biased estimation value of the coupling factor based on the cross-correlation technique; $|\hat{r}_{ex}(t)|^2$ is the square of the effective magnitude of the correlation coefficient between the error signal outputted by the AEC and the far-end reference signal.

Further, the step of obtaining the time-varying regularization factor used for iteratively updating the coefficient vector of the FIR filter when processing the preset signal using the coefficient vector of the FIR filter, according to the effective estimation values of the power of the signal received by the microphone and the coupling factor, includes: according to an Equation 36 and an Equation 37:

$$\delta^{opt}(t) = \max\left\{\frac{L \cdot \hat{\sigma}_y^2(t)}{\hat{\beta}(t) + \rho_0}, \delta_{min}\right\} = \max\left\{\frac{L \cdot \hat{\sigma}_y^2(t)|\hat{r}_{ex}(t)|^2}{\hat{\beta}(t)|_{Cross\text{-}correlation} + \rho}, \delta_{min}\right\},$$

obtaining the time-varying regularization factor used for iteratively updating the coefficient vector of the FIR filter;

where $\delta^{opt}(t)$ is the time-varying regularization factor; L is the number of coefficients of the FIR filter; $\hat{\sigma}_y^2(t)$ is the power of the signal received by the microphone;

$$\hat{\beta}(t) = \frac{\hat{\beta}(t)|_{Cross\text{-}correlation}}{|\hat{r}_{ex}(t)|^2}$$

is the effective estimation value of coupling factor; $\hat{\beta}(t)|_{Cross\text{-}correlation}$ is the biased estimation value of the coupling factor based on the cross-correlation technique; $|\hat{r}_{ex}(t)|^2$ is the square of the effective magnitude of the correlation coefficient between the error signal outputted by the AEC and the far-end reference signal; $\delta_{min}$ is a preset small real constant quantity, and $\delta_{min}>0$; $\rho_0$ and $\rho$ are preset small real constants, and $\rho>0$, $\rho_0>0$, respectively.

Specifically, when sustainably adaptively updating the coefficient vector of the FIR filter using the NLMS algorithm, specific implementation of the step 22 is as follows:

according to an Equation: $\vec{w}(t+1)=\vec{w}(t)+\mu \cdot \vec{x}(t)e^*(t)/[\vec{x}^H(t)\vec{x}(t)+\delta^{opt}(t)]$, sustainably adaptively updating the coefficient vector of the FIR filter by applying a Normalized Least Mean Square (NLMS) algorithm, wherein, $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; μ is a predetermined coefficient updating step-size parameter, and $0<\mu<2$; $\vec{x}(t)$ is the far-end reference signal vector and $\vec{x}(t)$=[x(t), x(t−1), ..., x(t−L+1)]$^T$; x(t−t2) is the far-end reference signal at the signal sample time (t−t2); T is a transpose operator; $\vec{x}^H(t)$ is the conjugate transpose matrix of $\vec{x}(t)$; $\delta^{opt}(t)$ is the time-varying regularization factor; $e^*(t)$ is the complex conjugate of e(t); e(t)=y(t)−$\vec{x}^H(t)\vec{w}(t)$, e(t) is the error signal outputted by the AEC at the signal sample time t; y(t) is the signal received by the microphone at the signal sample time t; $\vec{w}(t)$=[$w_0(t), w_1(t), ..., w_{L-1}(t)$]$^T$, $w_{t2}(t)$ is the (t2+1)-th coefficient of the FIR filter at the signal sample time t, t2=0, 1, 2, ..., L−1.

The time-varying regularization factor $\delta^{opt}(t)$ defined by the Equation 37 is applied to the NLMS adaptive learning algorithm of the time-domain LAEC, an NLMS sustainable adaptive learning algorithm with the time-varying regularization factor in the time-domain LAEC can be obtained. The algorithm has good robustness to both the "double talk" and an echo path change. A specific algorithm implementation flow is as follows:

Step 1: Initializing 1.1 Presetting parameters $0<\mu<2$, $0 \leq \alpha_a < \alpha_d < 1$, τ≥0, ρ>0, and values of $\delta_{min}$, L, and $T_s$;

1.2 Initializing relevant variables $\vec{x}(0)$=0, $\vec{h}(o)$=0, $\hat{\sigma}_y^2(0)$=0, $|\hat{r}_{ex}(t)|^2$=τ;

1.3 Setting a signal time index variable "t" to zero, that is, t=0;

Step 2: Calculating a relevant variable online 2.1 Using the Equation 26 to calculate $\hat{\sigma}_y^2(t)$;

2.2 Calculating the output e(t) of the LAEC using the Equation 7;

2.3 Calculating $|\hat{r}_{ex}(t)|^2$ using the Equation 33 and the Equation 35;

2.4 Calculating $\hat{\beta}(t)|_{Cross-correlation}$ using the Equation 34;

Step 3: Calculating the regularization factor $\delta^{opt}(t)$ online 3.1 Using the Equation 37 to calculate opt(t);

Step 4: Updating the Iterated Coefficient Vector of the FIR Filter 4.1 Calculating the coefficient vector of the FIR filter using the Equation $\vec{w}(t+1)=\vec{w}(t)+\mu \cdot \vec{x}(t)e^*(t)/[\vec{x}^H(t)\vec{x}(t)+\delta^{opt}(t)]$;

Step 5: Updating a signal frame index variable "t," that is, t=t+1, and jumping to the Step 2.

It should be noted that an optimal time-varying regularization factor determined by the Equation 37 is also applicable to an adaptive learning AP algorithm of the time-domain LAEC. In fact, the adaptive learning AP algorithm of the time-domain LAEC can be characterized by using the Equation 38 and the Equation 39 as follows: $\vec{e}(t)=\vec{y}(t)-X_{state}^H(t)\vec{w}(t)$;

$$\vec{w}(t+1)=\vec{w}(t)+\mu \cdot X_{state}(t)[X_{state}^H(t)X_{state}(t)+\delta(t) \cdot I_{P \times P}]^{-1} \cdot \vec{e}^*(t);$$

where $\vec{e}(t) \triangleq [e(t), e(t-1), \ldots, e(t-P+1)]^T$ is a P-dimensional error vector, $\delta(t)$ is a regularization factor, $\vec{y}(t) \triangleq [y(t), y(t-1), \ldots, y(t-P+1)]^T$ is a P-dimensional vector of a signal received by the microphone; $X_{state}(t) \triangleq [\vec{x}(t), \vec{x}(t-1), \ldots, \vec{x}(t-P+1)]$ is an L×P-dimension state matrix; $I_{P \times P}$ is P×P-dimension unit matrix, P is the order quantity of the AP algorithm.

Then, according to a system adaptation vector defined by the Equation 11, there is an Equation 40, i.e.:

$$\vec{e}(t)=\vec{y}(t)-X_{state}^H(t)\vec{w}(t)=\vec{\mathcal{E}}(t)+\vec{s}(t)$$

where an Equation 41 is used to define $\vec{\mathcal{E}}(t)$, that is, $\vec{\mathcal{E}}(t) \triangleq X_{state}^H(t) \cdot \vec{\Delta}(t)$;

where $\vec{\mathcal{E}}(t)$ is a P-dimensional system distortion-free error vector.

Defining $\vec{s}(t)$ by using an Equation 42, i.e., $\vec{s}(t) \triangleq [s(t), s(t-1), \ldots, s(t-P+1)]^T$;

where $\vec{s}(t)$ is a P-dimensional near-end speech signal vector.

An Equation 43 is easily obtained from the Equation 39, i.e.:

$$\vec{\Delta}(t+1)=\vec{\Delta}(t)-\mu \cdot X_{state}(t)[X_{state}^H(t)X_{state}(t)+\delta(t) \cdot I_{P \times P}]^{-1} \cdot \vec{e}^*(t)$$

Assuming that the reference signal x(t) is a whitened excitation source and the number L of the coefficients of the FIR filter of the LAEC is large, i.e. L>>1, then the inverse matrix in the Equation 43 may be approximately represented by the Equation 44 as follows:

$$[X_{state}^H(t)X_{state}(t)+\delta(t) \cdot I_{P \times P}]^{-1} \approx \frac{1}{L \cdot \sigma_x^2(t)+\delta(t)}I_{P \times P}$$

where $\sigma_x^2(t)$ is defined by the Equation 16. The Equation 44 is added to the Equation 43 to obtain an Equation 45:

$$\vec{\Delta}(t+1) \approx \vec{\Delta}(t)-\mu \cdot X_{state}(t) \cdot \vec{e}^*(t)/[L \cdot \sigma_x^2(t)+\delta(t)]$$

Hence there is an Equation 46:

$$E\left\{\left\|\vec{\Delta}(t+1)\right\|_2^2\right\} \approx E\left\{\left\|\vec{\Delta}(t)\right\|_2^2\right\} - \frac{2\mu \cdot P \cdot \sigma_\mathcal{E}^2(t)}{L \cdot \sigma_x^2(t)+\delta(t)} + \frac{\mu^2 \cdot L \cdot P \cdot \sigma_x^2(t) \cdot \sigma_e^2(t)}{[L \cdot \sigma_x^2(t)+\delta(t)]^2}$$

where $\sigma_\mathcal{E}^2(t)$ and $\sigma_e^2(t)$ are defined by the Equation 18 and the Equation 19, respectively.

Assuming that u=1, then taking a partial derivative to $\delta(t)$ in the Equation 46, and setting the partial derivative to zero to obtain an optimal $\delta(t)$, noting the optimal $\delta(t)$ as $\delta_{AP}^{opt}(t)$, then $\delta_{AP}^{opt}(t)$ can be expressed by using an Equation 47 as follows:

$$\Delta_{AP}^{opt}(t) = \frac{L[\sigma_y^2(t)-\sigma_d^2(t)]}{E\left\{\left\|\vec{\Delta}(n)\right\|_2^2\right\}}$$

By comparing the Equation 47 with the Equation 24, it is known that the optimal time-varying regularization factor determined by the Equation 37 is also applicable to the AP algorithm. Specifically, when sustainable adaptive updating of the coefficient vector of the FIR filter is performed using the AP algorithm, the specific implementation of the step 22 is as follows:

according to the following Equation:

$$\vec{w}(t+1)=\vec{w}(t)+\mu \cdot X_{state}(t)[X_{state}^H(t)X_{state}(t)+\delta^{opt}(t) \cdot I_{P \times P}]^{-1} \cdot \vec{e}^*(t)$$

applying an affine projection (AP) algorithm to sustainably adaptively update the coefficient vector of the FIR filter;

where $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; μ is a predetermined coefficient updating step-size parameter, and 0<μ<2; $\delta^{opt}(t)$ is a time-varying regularization factor; $X_{state}(t)$ is L×P-dimension state matrix, and $X_{state}(t)=[\vec{x}(t), \vec{x}(t-1), \ldots, \vec{x}(t-P+1)]$; $\vec{x}(t-t3)$ is the far-end reference signal vector at the signal sample time (t−t3), and t3=0, 1, ..., P−1, P is the order quantity of the AP algorithm; $X_{state}^H(t)$ is the conjugate transpose matrix of $X_{state}(t)$; $I_{P \times P}$ is a P×P-dimension unit matrix; $\vec{e}^*(t)$ is a complex conjugate of $\vec{e}(t)$, and $\vec{e}(t)=\vec{y}(t)-X_{state}^H(t)\vec{w}(t)$; $\vec{e}(t)$ is a P-dimension error vector; $\vec{y}(t)$ is a P-dimension vector of the signal received by the microphone, and $\vec{y}(t)=[y(t), y(t-1), \ldots, y(t-P+1)]^T$; y(t−t3) is the signal received by the microphone at the signal sample time (t−t3); $\vec{w}(t)=[w_0(t), w_1(t), \ldots, w_{L-1}(t)]^T$, $w_{t2}(t)$ is the (t2+1)-th coefficient of the FIR filter at the signal sample time t, t2=0, 1, 2, ..., L−1; t is the digital-signal sample time index number.

By applying the time-varying regularization factor $\delta^{opt}(t)$ defined by the Equation 37 to the AP adaptive learning algorithm of the time-domain LAEC, an AP sustainable adaptive learning algorithm of the time-domain LAEC with the time-varying regularization factor can be obtained. The algorithm has good robustness to the "double talk" and the echo path change. The specific implementation flow of the algorithm is as follows:

Step 1: Initializing 1.1 Presetting parameters $0<\mu<2$, $0\leq\alpha_a<\alpha_d<1$, $\tau\geq 0$, $\rho>0$, and values of $\delta_{min}$, L, and $T_s$;

1.2 Initializing relevant variables $\vec{x}(0)=0, \vec{h}(0)=0, \hat{\sigma}_y^2(0)=0, |\hat{r}_{ex}(t)|^2=\tau$;

1.3 Setting a signal time index variable "t" to zero, that is, t=0;

Step 2: Calculating a relevant variable online 2.1 Using the Equation 26 to calculate $\hat{\sigma}_1^2(t)$;

2.2 Calculating the output e(t) of the LAEC using the Equation 7;

2.3 Calculating $|\hat{r}_{ex}(t)|^2$ using the Equation 33 and the Equation 35;

2.4 Calculating $\hat{\beta}(t)|_{Cross-correlation}$ using the Equation 34;

Step 3: Calculating the regularization factor $\delta^{opt}(t)$ online 3.1 Using the Equation 37 to calculate $\delta^{opt}(t)$;

Step 4: Updating the iterated coefficient vector of the FIR filter 4.1 Calculating the error vector $\vec{e}(t)$ using the Equation 38;

4.2 Calculating the coefficient vector of the FIR filter using the Equation $\vec{w}(t+1)=\vec{w}(t)+\mu \cdot X_{state}(t)[X_{state}^H(t)X_{state}(t)+\delta^{opt}(t)\cdot I_{P\times P}]^{-1}\cdot \vec{e}^*(t)$;

Step 5: Updating a signal frame index variable "t," that is, t=t+1, and jumping to the Step 2.

II. Subband Domain

It is well known that an acoustic path usually changes rapidly with time. Due to a correlation of a speech signal, an NLMS learning algorithm of the time-domain LAEC will converge very slowly, so the algorithm cannot track a change of an echo path in real time. Furthermore, in certain applications, such as in a handfree speaker phone, an acoustic echo path is generally long, which exacerbates the above-mentioned drawbacks. Although a time-domain Recursive Least Square (RLS) algorithm has a fast convergence speed, it cannot be implemented on a current commercial DSP because the algorithm needs high computational complexity. In the time-domain Affine-Projection (AP) algorithm, a convergence speed and computational complexity of the algorithm are compromise to some extent, but in the case where the order P of the affine projection is large (in order to accelerate the convergence of the AP algorithm), the computational complexity of the algorithm also renders the algorithm to be difficult to be implemented on a current commercial DSP. This prompts people to study and explore a frequency-domain realization technology for the AEC, especially the realization technology implemented in a subband domain. In fact, in the subband domain, certain characteristic of a speech signal and a transfer functions of the acoustic echo path (e.g., a reduction in the number of coefficients of an echo path transfer function in each subband and a reduction in an update rate of weights thereof, a reduction of a dynamic range of a subband signal relative to that of a time-domain signal etc.) will benefit fast estimation and real-time tracking of the acoustic echo path transfer function by the adaptive learning algorithm. The content described below is to apply an idea of the adaptive learning algorithm of the time-domain LAEC with the time-varying regularization factor discussed above to an adaptive learning problem of a subband-domain LAEC, an NLMS algorithm and an AP algorithm for adaptive learning of the subband-domain LAEC with a time-varying regularization factor are proposed.

Figure 4:
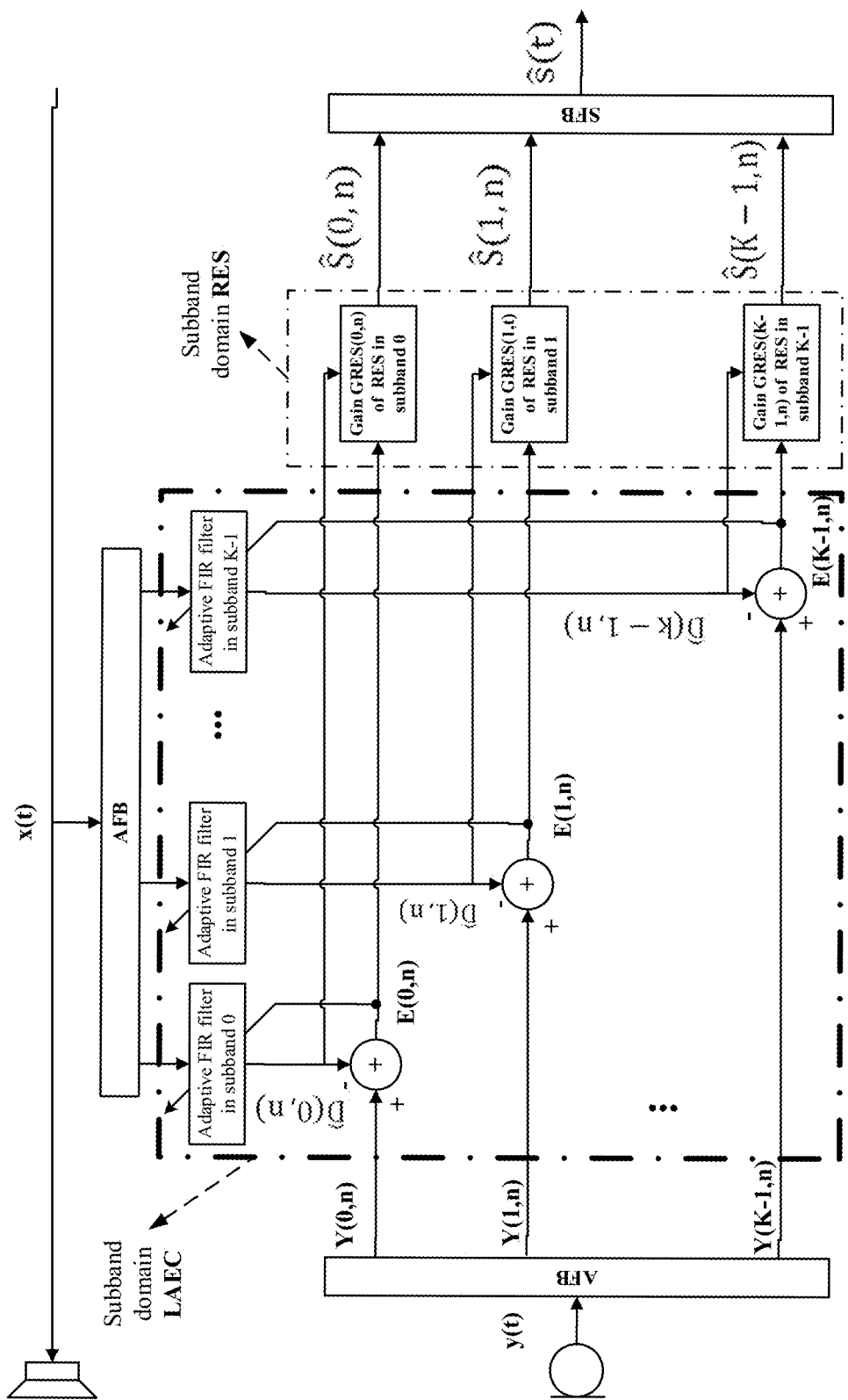
FIG. 4 is a schematic diagram showing a structure of a subband domain AEC.

A structure of the subband-domain AEC is shown in FIG. 4, which is composed of an analysis filter bank (AFB), a subband-domain linear echo canceller (LAEC), a subband-domain residual echo suppressor (RES) and a synthesis filter bank (SFB), where t, n and k represent a digital signal sample time, a signal frame time index variable, and a subband index sequence number (a subband index sequence-number variable), respectively; the AFB firstly transforms the time-domain reference signal x(t) from a far end and the time-domain microphone signal y(t) from a near end into subband-domain signals X(k, n) and Y(k, n) being inputted to the subband-domain LAEC for linear echo cancellation. An outputted signal E(k, n) of the subband-domain LAEC is processed in the subband-domain RES and then transformed into a time-domain signal $\hat{s}(t)$ by the SFB.

Figure 5:
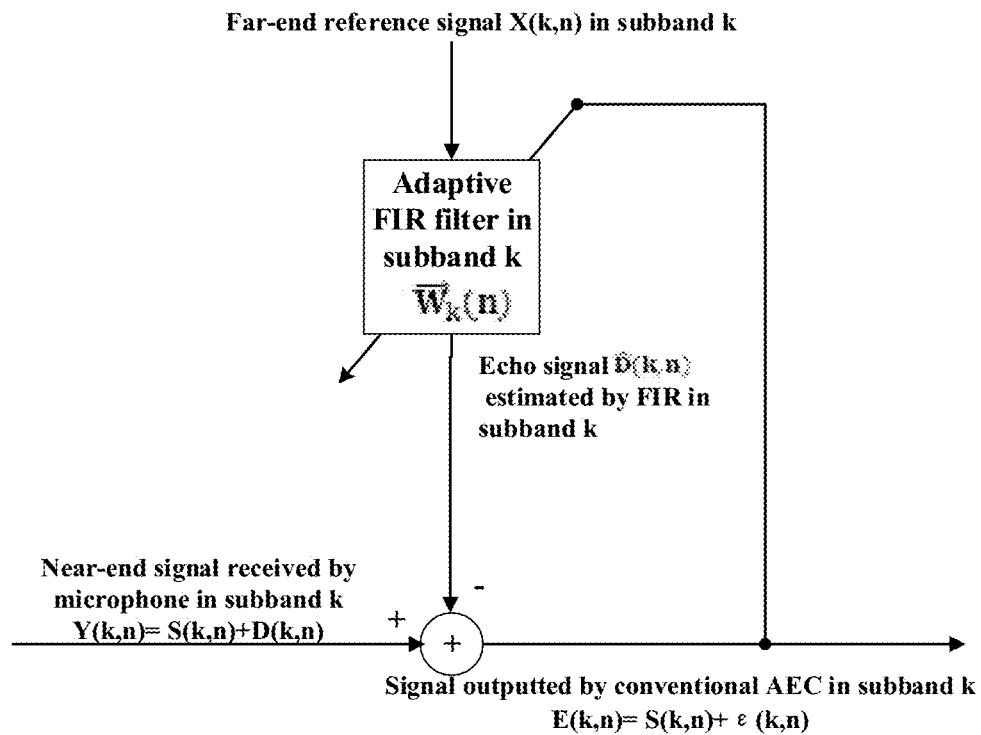
FIG. 5 shows a schematic view showing an LAEC structure of a subband k.

A structure of the LAEC in a subband k is shown in FIG. 5, where the subband spectrum of the far-end reference signal of the subband k at the signal frame time n is X (k, n), the subband spectrum of the signal received by the microphone is Y(k, n), The subband spectrum of the near-end speech signal is S(k, n), the subband spectrum of the echo signal is D(k, n), the number of coefficients of the FIR filter is $L_s$, and the outputted $\hat{D}(k, n)$ is a linear estimation value of the echo signal D(k, n). The coefficient vector of the FIR filter in the k-subband at the signal frame time "n" is expressed by anc Equation 48 as: $\vec{W}_k(n)=[W_0(k, n), W_1(k, n), \ldots, W_{L_s-1}(k, n)]^T$, where k is a subband index variable, k=0, 1, 2, ..., K−1, and k is the total number of subbands.

Figure 3:
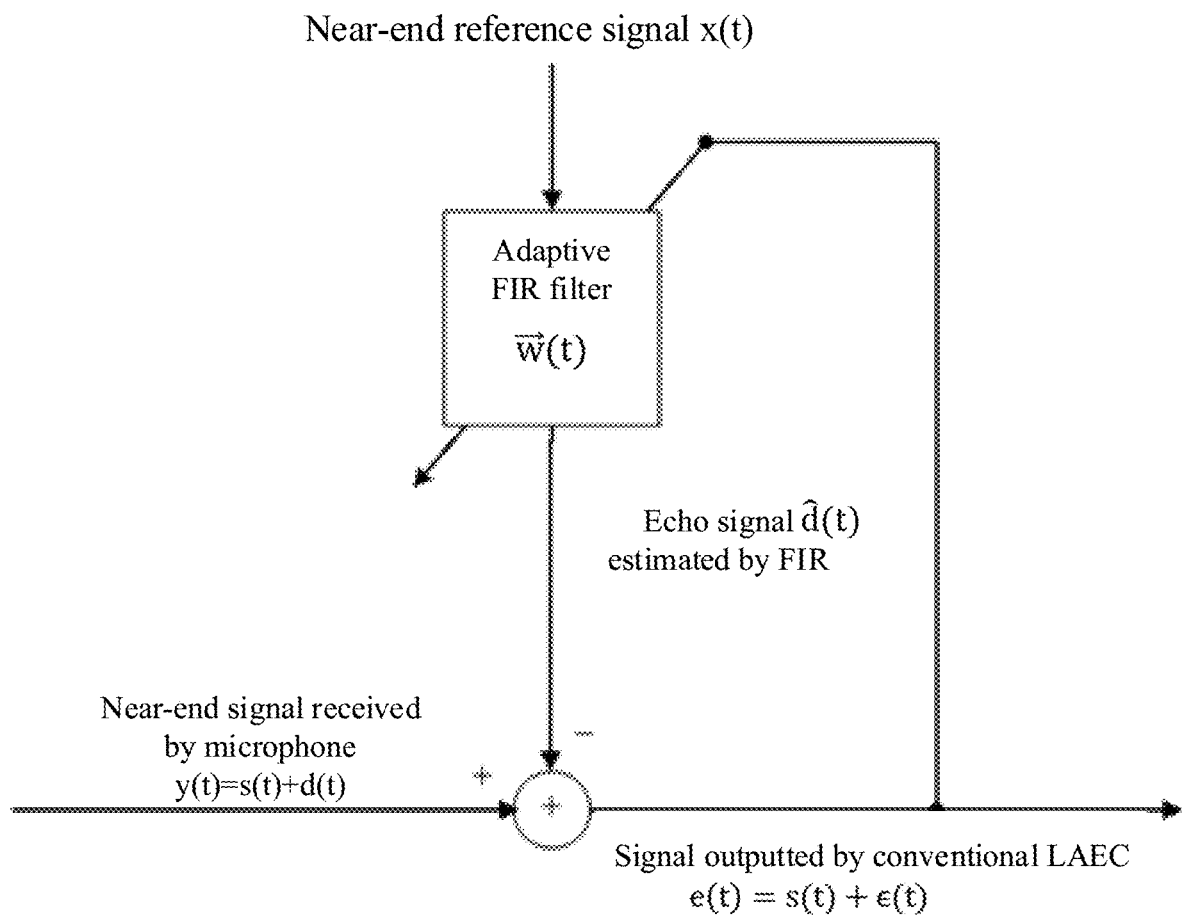
FIG. 3 is a schematic diagram showing a structure of a time-domain LAEC.

Comparing the structure of the time-domain LAEC shown in FIG. 3 with the structure of the subband-domain LAEC shown in FIG. 5, correspondence relationship shown in Table 1 can be obtained:

TABLE 1

Parameter correspondence relationship between time-domain LAEC and subband-domain LAEC

| Class of signal/parameter | Time-domain LAEC shown in FIG. 3 | Subband-domain of LAEC shown in FIG. 5 |
|---|---|---|
| Far-end reference signal | x(t) | X(k, n) |
| A signal received by the microphone | y(t) | Y(k, n) |
| Near-end speech signal | s(t) | S(k, n) |
| Echo signal | d(t) | D(k, n) |
| Linear Estimation of the Echo Signal | $\hat{d}(t)$ | $\hat{D}(k, n)$ |
| Output signal | e(t) | E(k, n) |
| Residual echo | $\epsilon(t)$ | $\epsilon(k, n)$ |
| Number of FIR filter coefficients | L | $L_s$ |
| FIR filter coefficient vector | $\vec{w}(t) = [w_0(t), w_1(t), \ldots, w_{L-1}(t)]^T$ | $\vec{W}_k(n) = [W_0(k, n), W_1(k, n), \ldots, W_{L_s-1}(k, n)]^T$ |

Table 1 shows that the subband-domain LAEC is in fact equivalent to a time-domain LAEC (along an axis of a signal frame "n") on a fixed k-subband. Because each subband is independent of each other, then for a given subband k, we can directly apply the adaptive algorithm about time-varying regularization factor discussed in the previous section to solve the adaptive learning issue of the FIR filter in the subband k. According to the correspondence relationship of Table 1, it may be easily known that the Equation 37 for calculating the time-varying regularization factor in the time-domain LAEC should correspond to the Equation 49 in the subband k:

$$\delta^{opt}(k, n) = \max\left\{\frac{L_s \cdot \hat{\sigma}_Y^2(k, n)|\hat{r}_{EX}(k, n)|^2}{\hat{\beta}(k, n)|_{Cross\text{-}correlation} + \rho}, \delta_{min}\right\};$$

where $\hat{\sigma}_Y^2(k, n)$, $\hat{\beta}(k, n)|_{Cross\text{-}correlation}$ and $|\hat{r}_{EX}(k, n)|^2$ are a subband power spectrum, a subband-domain coupling factor and a Magnitude Squared Coherence (MSC) between an output signal $E(k, t)$ of the subband-domain LAEC and a far-end reference signal $X(k, t)$, respectively, which are respectively derived from performing a variable substitution to the related Equation 26, Equation 33 to Equation 35 in the time-domain LAEC, and are expressed by using the following Equation:

Equation 50:

$$\hat{\sigma}_Y^2(k, n) =$$
$$\begin{cases} \alpha_a \cdot \hat{\sigma}_Y^2(k, n-1) + (1-\alpha_a) \cdot |Y(k, n)|^2, \text{ if } |Y(k, n)|^2 > \hat{\sigma}_Y^2(k, n-1) \\ \alpha_d \cdot \hat{\sigma}_Y^2(k, n-1) + (1-\alpha_d) \cdot |Y(k, n)|^2, \text{ otherwise} \end{cases}$$

where $0 \leq \alpha_a < \alpha_d < 1$ are preset recursive constant quantities.

Equation 51:

$$\hat{\beta}(k, n)\Big|_{Cross\text{-}correlation} \approx \frac{\left|\sum_{n1=0}^{N_s-1} E(k, n-n1)X^*(k, n-n1)\right|^2}{\left|\sum_{n1=0}^{N_s-1} |X(k, n-n1)|^2\right|^2}$$

where $N_s$ is the number of signal frames used in calculating the average, and $N_s \ll L_s$.

Equation 52:

$$\hat{r}(k, n) \approx \frac{\left|\sum_{n1=0}^{N_s-1} E(k, n-n1)X^*(k, n-n1)\right|^2}{\left(\sum_{n1=0}^{N_s-1} |E(k, n-n1)|^2\right)\left(\sum_{n1=0}^{N_s-1} |X(k, n-n1)|^2\right)}$$

Equation 53:

$$|\hat{r}_{EX}(k, n)|^2 = \begin{cases} \hat{r}(k, n), \text{ if } \hat{r}(k, n) > |\hat{r}_{EX}(k, n-1)|^2 \\ |\hat{r}_{EX}(k, n-1)|^2, \text{ otherwise} \end{cases}$$

Then the NLMS learning algorithm for updating FIR filter coefficients with the time-varying regularization factor in the subband k can be expressed by using an Equation 54 and an Equation 55 as follows:

$$E(k,n) = Y(k,n) - \vec{X}_k^H(n)\vec{W}_k(n) \quad \text{Equation 54:}$$

$$\vec{W}_k(n+1) = \vec{W}_k(n) + \mu \cdot \vec{X}_k(n)E^*(k,n)/[\vec{X}_k^H(n)\vec{X}_k(n) + \delta^{opt}] \quad \text{Equation 55:}$$

where $\delta^{opt}(k, n)$ is a time-varying regularization factor determined by the Equation 49; $\vec{X}_k(n)$ can be defined by an Equation 56: $\vec{X}_k(n) \triangleq [X(k, n), X(k, n-1), \ldots, X(k, n-L_s+1)]^T$.

It is known from the above derivation that the preset signal includes a subband spectrum of the near-end speech signal received by the microphone and inputted in the AEC and a subband spectrum of a far-end reference speech signal. When the coefficient vector of the FIR filter is a subband-domain coefficient vector of the FIR filter and the time-varying regularization factor is a subband-domain time-varying regularization factor, the specific implementation of the Step 21 in the present disclosure is as follows: obtaining a subband power spectrum of the signal received by the microphone and an effective estimation value of a subband-domain coupling factor, respectively; according to the subband power spectrum of the signal received by the microphone and the effective estimation value of the subband-domain coupling factor, obtaining a subband-domain time-varying regularization factor used for iteratively updating the subband-domain coefficient vector of the FIR filter when the subband-domain coefficient vector of the FIR filter is used for processing a preset signal.

Further, a method of obtaining the subband power spectrum of the signal received by the microphone is as follows:

According to the Equation 50:

$$\hat{\sigma}_Y^2(k, n) =$$
$$\begin{cases} \alpha_a \cdot \hat{\sigma}_Y^2(k, n-1) + (1-\alpha_a) \cdot |Y(k, n)|^2, \text{ if } |Y(k, n)|^2 > \hat{\sigma}_Y^2(k, n-1) \\ \alpha_d \cdot \hat{\sigma}_Y^2(k, n-1) + (1-\alpha_d) \cdot |Y(k, n)|^2, \text{ if } |Y(k, n)|^2 \leq \hat{\sigma}_Y^2(k, n-1) \end{cases},$$

obtaining the subband power spectrum of the signal received by the microphone;

where $\hat{\sigma}_Y^2(k, n)$ is the subband power spectrum of the signal received by the microphone; $Y(k, n)$ is a subband spectrum of the signal received by the microphone; $\alpha_a$ and $\alpha_d$ are preset recursive constant quantities, and $0 \cdot \alpha_a < \alpha_d < 1$; k is a subband index variable, $k=0, 1, 2, \ldots, K-1$, and K is the total number of subbands; n is the signal frame time index variable.

Further, the method of obtaining the effective estimation value of the subband-domain coupling factor includes: obtaining a biased estimation value of the subband-domain coupling factor according to a cross-correlation method; obtaining a correction factor used for compensating for the biased estimation value of the subband-domain coupling factor; obtaining an effective estimation value of the subband-domain coupling factor according to the biased estimation value of the subband-domain coupling factor and the correction factor.

Further, the step of obtaining the biased estimation value of the subband-domain coupling factor according to the cross-correlation method includes:

according to an Equation 51:

$$\hat{\beta}(k, n)\Big|_{Cross\text{-}correlation} = \frac{\left|\sum_{n1=0}^{N_s-1} E(k, n-n1)X^*(k, n-n1)\right|^2}{\left|\sum_{n1=0}^{N_s-1} |X(k, n-n1)|^2\right|^2},$$

obtaining the biased estimation value of the subband-domain coupling factor;

where $\hat{\beta}(k, n)|_{Cross\text{-}correlation}$ is a biased estimation value of the subband-domain coupling factor; $X^*(k, n-n1)$ is a complex conjugate of $X(k, n-n1)$; $n1=0, 1, 2, \ldots, N_s-1$, $N_s$ is the number of signal frames used for estimation of $\hat{\beta}(k, n)|_{Cross\text{-}correlation}$, and $N_s \ll L_s$, $L_s$ is the number of coefficients of the FIR filter in each subband; $E(k, n-n1)$ is a subband spectrum of an error signal outputted by the AEC at signal frame time $(n-n1)$; $E(k, n)=Y(k, n)-\vec{X}_k^H(n)\vec{W}_k(n)$, $E(k, n)$ is the subband spectrum of the error signal outputted by the AEC at signal frame time n; $Y(k, n)$ is the subband spectrum of the signal received by the microphone at the signal frame time n; $\vec{X}_k^H(n)$ is a conjugate transpose matrix of $\vec{X}_k(n)$; $\vec{X}_k(n)$ is a subband-spectrum vector of the far-end reference signal, and $\vec{X}_k(n)=[X(k, n), X(k, n-1), \ldots, X(k, n-L_s+1)]^T$; $X(k, n-n2)$ is a subband spectrum of a far-end reference signal at signal frame time $(n-n2)$; T is a transpose operator; $\vec{W}_k(n)$ is the coefficient vector of the FIR filter in a subband k, $\vec{W}_k(n)=[W_0(k, n), W_1(k, n), \ldots, W_{L_s-1}(k, n)]^T$; $W_{n2}(k, n)$ is the $(n2+1)$-th coefficient of the FIR filter in the subband k at the signal frame time n, $n2=0, 1, 2, \ldots, L_s-1$; k is a subband index variable, $k=0, 1, 2, \ldots, K-1$, and K is the total number of subbands; n is the signal frame time index variable.

Further, the step of obtaining the correction factor used for compensating for the biased estimation value of the subband-domain coupling factor includes: obtaining a candidate value of a square of a magnitude of a correlation coefficient between a subband spectrum of the error signal outputted by the AEC and a subband spectrum of a far-end reference signal; obtaining a square of an effective magnitude of a correlation coefficient between a subband spectrum of the error signal outputted by the AEC and a subband spectrum of the far-end reference signal according to the candidate value of the square of the magnitude of the correlation coefficient between the subband spectrum of the error signal outputted by the AEC and the subband spectrum of the far-end reference signal, and taking the square of the effective magnitude of the correlation coefficient between the subband spectrum of the error signal outputted by the AEC and the subband spectrum of the far-end reference signal as the correction factor used for compensating for the biased estimation value of the subband-domain coupling factor.

Further, the step of obtaining the candidate value of the square of the magnitude of the correlation coefficient between the subband spectrum of the error signal outputted by the AEC and the subband spectrum of the far-end reference signal includes: according to an Equation 52:

$$\hat{r}(k, n) = \frac{\left|\sum_{n1=0}^{N_s-1} E(k, n-n1)X^*(k, n-n1)\right|^2}{\left(\sum_{n1=0}^{N_s-1} |E(k, n-n1)|^2\right)\left(\sum_{m=0}^{N_s-1} |X(k, n-n1)|^2\right)},$$

obtaining the candidate value of the square of the magnitude of the correlation coefficient between the subband spectrum of the error signal outputted by the AEC and the subband spectrum of the far-end reference signal;

where $\hat{r}(k, n)$ is the candidate value of the square of the magnitude of the correlation coefficient between the subband spectrum of the error signal outputted by the AEC and the subband spectrum of the far-end reference signal; $X^*(k, n-n1)$ is a complex conjugate of $X(k, n-n1)$; $n1=0, 1, 2, \ldots, N_s-1$, $N_s$ is the number of frames used for estimation of $\hat{r}(k, n)$, and $N_s \ll L_s$, $L_s$ is the number of coefficients of the FIR filter in each subband; $E(k, n-n1)$ is the subband spectrum of the error signal outputted by the AEC at signal frame time $(n-n1)$; $E(k, n)=Y(k, n)-\vec{X}_k^H(n)\vec{W}_k(n)$, $E(k, n)$ is the subband spectrum of the error signal outputted by the AEC at signal frame time n; $Y(k, n)$ is a subband spectrum of a signal received by the microphone; $\vec{X}_k^H(n)$ is a conjugate transpose matrix of $\vec{X}_k(n)$; $\vec{X}_k(n)$ is the subband spectrum vector of the far-end reference signal, and $\vec{X}_k(n)=[X(k, n), X(k, n-1), \ldots, X(k, n-L_s+1)]^T$; $X(k, n-n2)$ is the subband spectrum of the far-end reference signal at the signal frame time $(n-n2)$; T is a transpose operator; $\vec{W}_k(n)$ is the coefficient vector of the FIR filter in a subband k; $\vec{W}_k(n)=[W_0(k, n), W_1(k, n), \ldots, W_{L_s-1}(k, n)]^T$; $W_{n2}(k, n)$ is a $(n2+1)$-th coefficient of the FIR filter in the signal frame time n in the subband k; $n2=0, 1, 2, \ldots, L_s-1$; k is a subband index variable; $k=, 1, 2, \ldots, K-1$, and K is the total number of subbands; n is the signal frame time index variable.

Further, the step of obtaining the square of the effective magnitude of the correlation coefficient between the subband spectrum of the error signal outputted by the AEC and the subband spectrum of the far-end reference signal according to the candidate value of the square of the magnitude of the correlation coefficient between the subband spectrum of the error signal outputted by the AEC and the subband spectrum of the far-end reference signal, includes:

according to an Equation 53:

$$|\hat{r}_{EX}(k, n)|^2 = \begin{cases} \hat{r}(k, n), & \text{if } \hat{r}(k, n) > |\hat{r}_{EX}(k, n-1)|^2 \\ |\hat{r}_{EX}(k, n-1)|^2, & \text{if } \hat{r}(k, n) \leq |\hat{r}_{EX}(k, n-1)|^2 \end{cases},$$

obtaining the square of the effective magnitude of the correlation coefficient between the subband spectrum of the error signal outputted by the AEC and the subband spectrum of the far-end reference signal;

where $|\hat{r}_{EX}(k, n)|^2$ is the square of the effective magnitude of the correlation coefficient between the subband spectrum of the error signal outputted by the AEC and the subband spectrum of the far-end reference signal; $\hat{r}(k, n)$ is the candidate value of the square of the magnitude of the correlation coefficient between the subband spectrum of the error signal outputted by the AEC and the subband spectrum of the far-end reference signal; n is the signal frame time index variable.

Further, the step of obtaining the effective estimation value of the subband-domain coupling factor according to the biased estimation value of the subband-domain coupling factor and the correction factor includes:

based on an Equation:

$$\hat{\beta}(k, n) = \frac{\hat{\beta}(k, n)|_{Cross\text{-}correlation}}{|\hat{r}_{EX}(k, n)|^2},$$

obtaining the effective estimation value of the subband-domain coupling factor;

where $\hat{\beta}(k, n)$ is the effective estimation value of the subband-domain coupling factor, $\hat{\beta}(k, n)|_{Cross\text{-}correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; n is the signal frame time index variable.

Further, the step of obtaining the subband-domain time-varying regularization factor used for iteratively updating the subband-domain coefficient vector of the FIR filter when the subband-domain coefficient vector of the FIR filter is used for processing a preset signal, according to the subband power spectrum of the signal received by the microphone and the effective estimation value of the subband-domain coupling factor, includes:

according to the Equation 49:

$$\delta^{opt}(k, n) = \max\left\{\frac{L_s \cdot \hat{\sigma}_Y^2(k, n)}{\hat{\beta}(k, n) + \rho_0}, \delta_{min}\right\} = \max\left\{\frac{L_s \cdot \hat{\sigma}_Y^2(k, n)|\hat{r}_{EX}(k, n)|^2}{\hat{\beta}(k, n)|_{Cross-correlation} + \rho}, \delta_{min}\right\},$$

obtaining a subband-domain time-varying regularization factor used for iteratively updating the subband-domain coefficient vector of the FIR filter when the subband-domain coefficient vector of the FIR filter is used for processing a preset signal;

where $\delta^{opt}(k, n)$ is the subband-domain time-varying regularization factor; $\hat{\sigma}_Y^2(k, n)$ is the subband power spectrum of the signal received by the microphone;

$$\hat{\beta}(k, n) = \frac{\hat{\beta}(k, n)|_{Cross-correlation}}{|\hat{r}_{EX}(k, n)|^2}$$

is the effective estimation value of the subband-domain coupling factor, $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; $\delta_{min}$ is the preset small real constant quantity, and $\delta_{min} > 0$; $\rho_0$ and $\rho$ are preset small real constants, and $\rho > 0$, $\rho_0 > 0$; n is the signal frame time index variable.

Specifically, when substainably adaptively updating the coefficient vector of the FIR filter using the NLMS algorithm, the specific implementation of the Step 22 is as follows:

according to the Equation:

$\vec{W}_k(n+1) = \vec{W}_k(n) + \mu \cdot \vec{X}_k(n) E^*(k, n) / [\vec{X}_k^H(n)\vec{X}_k(n) + \delta^{opt}(k, n)]$ sustainably adaptively updating the subband-domain coefficient vector of the FIR filter using a Normalized Least Mean Square (NLMS) algorithm;

where $\vec{W}_k(n+1)$ is the coefficient vector of the FIR filter in the subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0 < \mu < 2$; $\vec{X}_k(n)$ is the subband spectrum vector of the far-end reference signal; $\vec{X}_k(n) = [X(k, n), X(k, n-1), \ldots, X(k, n-L_s+1)]^T$; $X(k, n-n2)$ is the subband spectrum of the far-end reference signal at the signal frame time (n−n2); n2=0, 1, ..., $L_s$−1, $L_s$ is the number of coefficients of the FIR filter in each subband, T is the transpose operator; $\vec{X}_k^H(n)$ is a conjugate transpose matrix of $\vec{X}_k(n)$; $E^*(k, n)$ is the complex conjugate of $E(k, n)$; $E(k, n)$ is the subband spectrum of the error signal outputted by AEC at the signal frame time "n", and $E(k, n) = Y(k, n) - \vec{X}_k^H(n)\vec{W}_k(n)$; $Y(k, n)$ is the subband spectrum of the signal received by the microphone at the signal frame time "n"; $\vec{W}_k(n) [W_0(k, n), W_1(k, n), \ldots, W_{L_s-1}(k, n)]^T$; $W_{n2}(k, n)$ is the (n2+1)-th coefficient of the FIR filter in the subband k in the signal frame time "n"; $\delta^{opt}(k, n)$ is the subband-domain time-varying regularization factor; k is a subband index variable, k=0, 1, 2, ..., K−1, and K is the total number of subbands; n is the signal frame time index variable.

By applying the time-varying regularization factor $\delta^{opt}(k, n)$ defined by the Equation 49 to the NLMS adaptive learning algorithm of the subband-domain LAEC, an NLMS sustainable adaptive learning algorithm with the time-varying regularization factor in the subband-domain LAEC can be obtained. The algorithm has good robustness to both the "double talk" and the echo path change. The specific implementation flow of the algorithm is as follows:

Step 1: Initializing 1.1 Presetting parameters $0 < \mu < 2$, $0 \leq \alpha_a < \alpha_d < 1$, $\tau \geq 0$, $\rho > 0$, and values of $\delta_{min}$, $L_s$, and $T_s$;

1.2 Initializing relevant variables, and performing following initialization to all subbands k, k=0, ..., K−1:

$\vec{X}_k(0) = 0, \vec{W}_k(0) = 0, \hat{\sigma}_Y^2(k, 0) = 0, |\hat{r}_{EX}(k, 0)|^2 = \tau;$ 1.3 Setting the signal frame index variable "n" to zero, that is, n=0;

Step 2: Performing following processing to all subbands k, k=0, ..., K−1:

2.1 Calculating relevant variables online 2.1.1 Using the Equation 50 to calculate $\hat{\sigma}_Y^2(k, n)$;

2.1.2 Calculating an output E(k, n) of the LAEC using the Equation 54;

2.1.3 Calculating $|\hat{r}_{EX}(k, n)|^2$ using the Equation 52 and the Equation 53;

2.1.4 Calculating $\hat{\beta}(k, n)|_{Cross-correlation}$ using the Equation 51.

2.2 Calculating the regularization factor $\delta^{opt}(k, n)$ online 2.2.1 Calculating the $\delta^{opt}(k, n)$ using the Equation 49;

2.3 Iteratively updating the subband-domain coefficient vector of the FIR filter 2.3.1 Using the Equation $\vec{W}_k(n+1) = \vec{W}_k(n) + \mu \cdot \vec{X}_k(n) E^*(k, n)/[\vec{X}_k^H(n)\vec{X}_k(n) + \delta^{opt}(k, n)]$ to calculate the coefficient vector of the FIR filter;

Step 3: Updating the signal frame index variable "n", i.e., n=n+1, and jumping to the step 2.

Similarly, a time-varying regularization factor AP algorithm for updating the coefficients of the FIR filter in the subband k can be expressed by using the Equation 57 and the Equation 58, respectively, as follow: $\vec{E}_k(n) = \vec{Y}_k(n) - X_{state}^H(k, n)\vec{W}_k(n)$; $\vec{W}_k(n+1) = \vec{W}_k(n) + \lambda \cdot X_{state}(k, n) \cdot [X_{state}^H(k, n) X_{state}(k, n) + \delta^{opt}(k, n) \cdot I_{P \times P}]^{-1} \cdot \vec{E}_k^*(n),$ where, $\vec{E}_k(n) \triangleq [E(k, n), E(k, n-1), \ldots, E(k, n-P+1)]^T$ is a P-dimension error vector; $\vec{Y}_k(n) \triangleq [Y(k, n), Y(k, n-1), \ldots, Y(k, n-P+1)]^T$ is a P-dimension vector of the signal received by the microphone, $X_{state}(k, n) \triangleq [\vec{X}_k(n), \vec{X}_k(n-1), \ldots, \vec{X}_k(n-P+1)]$ is an L×P-dimension state matrix, $I_{P \times P}$ is a P×P dimension unit matrix.

Specifically, when sustainably adaptively updating the coefficient vector of the FIR filter using the AP algorithm, the specific implementation of the Step 22 is as follows:
according to the Equation:

$\vec{W}_k(n+1)=\vec{W}_k(n))+\mu \cdot X_{state}(k, n) \cdot [X_{state}^H(k, n)X_{state}(k, n)+\delta^{opt}(k, n) \cdot I_{P \times P}]^{-1} \cdot \vec{E}_k^*(n)$, sustainably adaptively updating the subband-domain coefficient vector of the FIR filter using an affine projection (AP) algorithm.

where $\vec{W}_k(n+1)$ is the coefficient vector of the FIR filter in the subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0<\mu<2$; $\delta^{opt}(k, n)$ is the subband-domain time-varying regularization factor; $X_{state}(k, n)$ is an L×P-dimension state matrix in the subband k, and $X_{state}(k, n) = [\vec{X}_k(n), \vec{X}_k(n-1), \ldots, \vec{X}_k(n-P+1)]$ is the subband spectrum vector of the far-end reference signal at the signal frame time (n−n3), and n3=0, 1, . . . , P−1, P is the order quantity of the AP algorithm; $X_{state}^H(k, n)$ is the conjugate transpose matrix of $X_{state}(k, n)$; $I_{P \times P}$ is a P×P-dimension unit matrix; $\vec{E}_k^*(n)$ is the complex conjugate of $\vec{E}_k(n)$, and $\vec{E}_k(n) = \vec{Y}_k(n) - X_{state}^H(k, n)\vec{W}_k(n)$; $\vec{E}_k(n)$ is the subband spectrum vector of a P-dimensional error signal; $\vec{Y}_k(n)$ is the P-dimension subband spectrum vector of the signal received by the microphone, and $\vec{Y}_k(n)=[Y(k, n), Y(k, n-1), \ldots, Y(k, n-P+1)]^T$; Y(k, n−n3) is the signal received by the microphone at the signal frame time (n−n3); $\vec{W}_k(n)=[W_0(k, n), W_1(k, n), \ldots, W_{L_s-1}(k, n)]^T$; $W_{n2}(k, n)$ is the (n2+1)-th coefficient of the FIR filter in the subband k at the signal frame time "n", n2=0, 1, . . . , $L_s$−1, $L_s$ is the number of coefficients of the FIR filter in each subband; k is a subband index variable, k=0, 1, 2, . . . , K−1, and K is the total number of subbands; n is the signal frame time index variable.

By applying the time-varying regularization factor $\delta^{opt}(k, n)$ defined by the Equation 49 to the AP adaptive learning algorithm of the subband-domain LAEC, an AP sustainable adaptive learning algorithm with the time-varying regularization factor in the subband-domain LAEC can be obtained. The algorithm has good robustness to both the "double talk" and the echo path change. The specific implementation flow of the algorithm is as follows:

Step 1: Initializing
1.1 Presetting parameters $0<\mu<2$, $0 \leq \alpha_a < \alpha_d < 1$, $\tau > 0$, $\rho > 0$, and values of $\delta_{min}$, $L_s$ and $N_s$;
1.2 Initializing relevant variables, and performing following initialization to all subbands k, k=0, . . . , K−1:

$\vec{X}_k(0)=0, \vec{W}_k(0)=0, \hat{\sigma}_Y^2(k,0)=0, |\hat{r}_{EX}(k,0)|^2 = \tau;$ 1.3 Setting the signal frame index variable "n" to zero, that is, n=0;
Step 2: Performing following processing to all subbands k, k=0, . . . , K−1:
2.1 Calculating relevant variables online
2.1.1 Using the Equation 50 to calculate $\hat{\sigma}_Y^2(k, n)$;
2.1.2 Calculating an output E(k, n) of the LAEC using the Equation 54;
2.1.3 Calculating $|\hat{r}_{EX}(k, n)|^2$ using the Equation 52 and the Equation 53;
2.1.4 Calculating $\hat{\beta}(k, n)|_{Cross-correlation}$ using the Equation 51.
2.2 Calculating the regularization factor $\delta^{opt}(k, n)$ online
2.2.1 Calculating the $\delta^{opt}(k, n)$ using the Equation 49;

2.3 Iteratively updating the subband-domain coefficient vector of the FIR filter
2.3.1 Using an Equation 57 to calculate an error vector $\vec{E}_k(n)$
2.3.2 Using an Equation $\vec{W}_k(n+1)=\vec{W}_k(n)+ \mu \cdot X_{state}(k, n) \cdot [X_{state}^H(k, n)X_{state}(k, n)+\delta^{opt}(k, n) \cdot I_{P \times P}]^{-1} \cdot \vec{E}_k^*(n)$ to calculate the coefficient vector of the FIR filter;
Step 3: Updating the signal frame index variable "n", i.e., n=n+1, and jumping to the step 2.

It should be noted that some embodiments of the present disclosure have the following advantages:

A. the time-varying regularization factor adaptive learning algorithms of the time-domain LAEC and the subband-domain LAEC proposed by the present disclosure are insensitive to an initialization process;

B. the time-varying regularization factor adaptive learning algorithms of the time-domain LAEC and the subband-domain LAEC proposed by the present disclosure have good robustness to both the "double talk" in an echo cancellation application;

C. the time-varying regularization factor adaptive learning algorithms of the time-domain LAEC and the subband-domain LAEC proposed by the present disclosure have good robustness to the "echo path change" in an echo cancellation application;

D. the time-varying regularization factor adaptive learning algorithm of the subband-domain LAEC proposed in the present disclosure reduces the complexity by $M^2/K$ (where M is a decimation factor and K is the total number of subbands), as compared with the relevant time-domain LAEC learning algorithm. Considering that the subband spectrum of a real signal satisfies a conjugate symmetry property, the learning algorithm of the subband-domain LAEC only needs to run on the first (K/2+1) subbands, so an algorithm complexity of the subband-domain LAEC can be further reduced (by about a half). This learning algorithm of the subband-domain LAEC having a low computational complexity is easy to be implemented on a commercial DSP chip. Furthermore, in view of parallelism of a subband-domain processing structure, the subband-domain algorithm proposed by the present disclosure is easier to be implemented with an Application Specific Integrated Circuit (ASIC).

Figure 6:
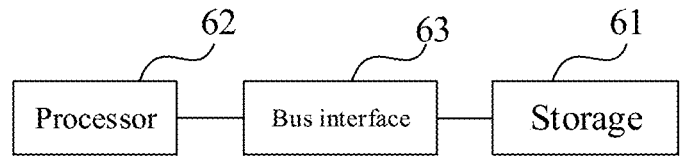
FIG. 6 is a schematic diagram showing a structure of a device of sustainably adaptively updating a coefficient vector of an FIR filter according to some embodiments of the present disclosure.

As shown in FIG. 6, some embodiments of the present disclosure also provide a device of sustainably adaptively updating a coefficient vector of an Finite Impulse Response (FIR) filter. The device includes a storage 61, a processor 62 and a computer program stored on the storage 61 and executable by the processor 62. The storage 61 is connected to the processor 62 through a bus interface 63, wherein, when the processor 62 executes the computer program, the processor 62 implements following steps: obtaining a time-varying regularization factor used for iteratively updating a coefficient vector of a FIR filter in a case that the coefficient vector of the FIR filter is used for processing a preset signal; updating the coefficient vector of the FIR filter according to the time-varying regularization factor.

Specifically, the preset signal includes one of combined pairs of following: a far-end reference speech signal inputted in an acoustic echo canceller (AEC) and a near-end speech signal received by a microphone; a noise reference signal and a system input signal in an adaptive noise cancellation system; an interference reference signal and a system input signal in an adaptive interference cancellation system, and an excitation input signal and an unknown system output signal to be identified in adaptive system identification.

Further, the preset signal includes a far-end reference speech signal inputted in an AEC and a near-end speech signal received by a microphone; when the processor 62 executes the computer program, the processor 62 further implements following steps: obtaining a power of a signal received by a microphone and an effective estimation value of a coupling factor; according to the power of the signal received by the microphone and the effective estimation value of the coupling factor, obtaining a time-varying regularization factor used for iteratively updating the coefficient vector of the FIR filter when the coefficient vector of the FIR filter is used for processing a preset signal.

Further, when the processor 62 executes the computer program, the processor 62 further implements following steps:

according to an Equation:

$$\hat{\sigma}_y^2(t) = \begin{cases} \alpha_a \cdot \hat{\sigma}_y^2(t-1) + (1-\alpha_a) \cdot |y(t)|^2, & \text{if } |y(t)|^2 > \hat{\sigma}_y^2(t-1) \\ \alpha_d \cdot \hat{\sigma}_y^2(t-1) + (1-\alpha_d) \cdot |y(t)|^2, & \text{if } |y(t)|^2 \leq \hat{\sigma}_y^2(t-1) \end{cases}$$

obtaining the power of the signal received by the microphone;

where $\hat{Y}_y^2(t)$ is the power of the signal received by the microphone; $y(t)$ is the signal received by the microphone; $\alpha_a$ and $\alpha_d$ are preset recursive constant quantities, and $0 \leq \alpha_a < \alpha_d < 1$; t is a digital-signal time index number.

Further, when the processor 62 executes the computer program, the processor 62 further implements following steps: obtaining a biased estimation value of the coupling factor according to a cross-correlation method; obtaining a correction factor used for compensating for the biased estimation value of the coupling factor; obtaining an effective estimation value of the coupling factor according to the biased estimation value of the coupling factor and the correction factor.

Further, when the processor 62 executes the computer program, the processor 62 further implements following steps:

according to an Equation:

$$\hat{\beta}(t)|_{Cross\text{-}correlation} = \frac{\left|\sum_{t1=0}^{T_s-1} e(t-t1)x^*(t-t1)\right|^2}{\left|\sum_{t1=0}^{T_s-1} |x(t-t1)|^2\right|^2},$$

obtaining the biased estimation value of the coupling factor, where $\hat{\beta}(t)|_{Cross\text{-}correlation}$ is the biased estimation value of the coupling factor based on the cross-correlation technique; $x^*(t-t1)$ is a complex conjugate of $x(t-t1)$; $t1=0, 1, 2, \ldots, T_s-1$, $T_s$ is the number of samples used in the estimation of the $\hat{\beta}(t)|_{Cross\text{-}correlation}$, and $T_s \ll L$, L is the number of coefficients of the FIR filter; $e(t-t1)$ is an error signal outputted by the AEC at the signal sample time $(t-t1)$, $e(t) = y(t) - \vec{x}^H(t)\vec{w}(t)$, $e(t)$ is an error signal outputted by the AEC at the signal sample time t; $y(t)$ is a signal received by the microphone at the signal sample time t; $\vec{x}^H(t)$ is a conjugate transpose matrix of $\vec{x}(t)$; $\vec{x}(t)$ is the far-end reference signal vector and $\vec{x}(t) = [x(t), x(t-1), \ldots, x(t-L+1)]^T$; $x(t-t2)$ is the far-end reference signal at the signal sample time $(t-t2)$; T is a transpose operator; $\vec{w}(t)$ is the coefficient vector of the FIR filter, $\vec{w}(t) = [w_0(t), w_1(t), \ldots, w_{L-1}(t)]^T$, $w_{t2}(t)$ is the (t2+1)-th coefficient of the FIR filter at the signal sample time t, $t2 = 0, 1, 2, \ldots, L-1$; t is a digital-signal time index number.

Further, when the processor 62 executes the computer program, the processor 62 further implements following steps:

obtaining a candidate value of a square of a magnitude of a correlation coefficient between the error signal outputted by the AEC and the far-end reference signal; obtaining a square of an effective magnitude of the correlation coefficient between the error signal outputted by the AEC and the far-end reference signal based on the candidate value of the square of the magnitude of the correlation coefficient between the error signal outputted by the AEC and the far-end reference signal, and taking the square of the effective magnitude of the correlation coefficient between the error signal outputted by the AEC and the far-end reference signal as the correction factor used for compensating for the biased estimation value of the coupling factor.

Further, when the processor 62 executes the computer program, the processor 62 further implements following steps:

according to an Equation:

$$\hat{r}(t) = \frac{\left|\sum_{t1=0}^{T_s-1} e(t-t1)x^*(t-t1)\right|^2}{\left(\sum_{t1=0}^{T_s-1} |e(t-t1)|^2\right)\left(\sum_{t1=0}^{T_s-1} |x(t-t1)|^2\right)},$$

obtaining the candidate value of the square of the magnitude of the correlation coefficient between the error signal outputted by the AEC and the far-end reference signal; where $\vec{r}(t)$ is the candidate value of the square of the magnitude of the correlation coefficient between the error signal outputted by the AEC and the far-end reference signal; $x(t-t1)$ is the far-end reference signal at the signal sample time $(t-t1)$; $x^*(t-t1)$ is the complex conjugate of $x(t-t1)$; $t1=0, 1, 2, \ldots, T_s-1$, $T_s$ is the number of samples used in the estimation of $\vec{r}(t)$, and $T_s \ll L$, L is the number of coefficients of the FIR filter; $e(t-t1)$ is the error signal outputted by the AEC at the signal sample time $(t-t1)$, $e(t) = y(t) - \vec{x}^H(t)\vec{w}(t)$, $e(t)$ is an error signal outputted by the AEC at the signal sample time t; $y(t)$ is the signal received by the microphone at the signal sample time t; $\vec{x}^H(t)$ is the conjugate transpose matrix of $\vec{x}(t)$; $\vec{x}(t)$ is the far-end reference signal vector and $\vec{x}(t) = [x(t), x(t-1), \ldots, x(t-L+1)]^T$; $x(t-t2)$ is the far-end reference signal at the signal sample time $(t-t2)$; T is a transpose operator; $\vec{w}(t)$ is the coefficient vector of the FIR filter, $\vec{w}(t) = [w_0(t), w_1(t), \ldots, w_{L-1}(t)]^T$, $w_{t2}(t)$ (t) is the (t2+1)-th coefficient of the FIR filter at the signal sample time t, $t2 = 0, 1, 2, \ldots, L-1$; t is a digital-signal sample time index number.

Further, when the processor 62 executes the computer program, the processor 62 further implements following steps:

according to an Equation:

$$|\hat{r}_{ex}(t)|^2 = \begin{cases} \hat{r}(t), & \text{if } \hat{r}(t) > |\hat{r}_{ex}(t-1)|^2 \\ |\hat{r}_{ex}(t-1)|^2, & \text{if } \hat{r}(t) \leq |\hat{r}_{ex}(t-1)|^2 \end{cases}$$

obtaining the square of the effective magnitude of the correlation coefficient between the signal outputted by the AEC and the far-end reference signal;

where $|\vec{r}(t)|^2$ is the square of the effective magnitude of the correlation coefficient between the error signal outputted by the AEC and the far-end reference signal; $\hat{r}(t)$ is the candidate value of the square of the magnitude of the correlation coefficient between the error signal outputted by the AEC and the far-end reference signal; t is a digital-signal sample time index number.

Further, when the processor 62 executes the computer program, the processor 62 further implements following steps:

obtaining the effective estimation value of the coupling factor according to the Equation:

$$\hat{\beta}(t) = \frac{\hat{\beta}(t)|_{Cross-correlation}}{|\hat{r}_{ex}(t)|^2},$$

where $\hat{\beta}(t)$ is the effective estimation value of the coupling factor; $\hat{\beta}(t)|_{Cross-correlation}$ is the biased estimation value of the coupling factor based on the cross-correlation technique; $|\hat{r}_{ex}(t)|^2$ is the square of the effective magnitude of the correlation coefficient between the error signal outputted by the AEC and the far-end reference signal; t is a digital-signal sample time index number.

Further, when the processor 62 executes the computer program, the processor 62 further implements following steps:

according to an Equation:

$$\delta^{opt}(t) = \max\left\{\frac{L \cdot \hat{\sigma}_y^2(t)}{\hat{\beta}(t) + \rho_0}, \delta_{min}\right\} = \max\left\{\frac{L \cdot \hat{\sigma}_y^2(t)|\hat{r}_{ex}(t)|^2}{\hat{\beta}(t)|_{Cross-correlation} + \rho}, \delta_{min}\right\},$$

obtaining the time-varying regularization factor used for iteratively updating the coefficient vector of the FIR filter; where $\delta^{opt}(t)$ is the time-varying regularization factor; L is the number of coefficients of the FIR filter; $\hat{\sigma}_y^2(t)$ is the power of the signal received by the microphone;

$$\hat{\beta}(t) = \frac{\hat{\beta}(t)|_{Cross-correlation}}{|\hat{r}_{ex}(t)|^2}$$

is the effective estimation value of coupling factor; $\hat{\beta}(t)|_{Cross-correlation}$ is the biased estimation value of the coupling factor based on the cross-correlation technique; $|\hat{r}_{ex}(t)|^2$ is the square of the effective magnitude of the correlation coefficient between the error signal outputted by the AEC and the far-end reference signal; $\delta_{min}$ is a preset small real constant quantity, and $\delta_{min} > 0$; $\rho_0$ and $\rho$ are preset small real constants, and $\rho > 0$, $\rho_0 > 0$, respectively; t is a digital-signal sample time index number.

Further, when the processor 62 executes the computer program, the processor 62 further implements following steps:

according to an Equation: $\vec{w}(t+1) = \vec{w}(t) + \lambda \cdot \vec{x}(t)e^*(t)/[\vec{x}^H(t)\vec{x}(t) + \delta^{opt}(t)]$, sustainably adaptively updating the coefficient vector of the FIR filter by applying a Normalized Least Mean Square (NLMS) algorithm, wherein, $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; µ is a predetermined coefficient updating step-size parameter, and $0 < \mu < 2$; $\vec{x}(t)$ is the far-end reference signal vector and $\vec{x}(t) = [x(t), x(t-1), \ldots, x(t-L+1)]^T$; $x(t-t2)$ is the far-end reference signal at the signal sample time $(t-t2)$; T is a transpose operator; $\vec{x}^H(t)$ is the conjugate transpose matrix of $\vec{x}(t)$; $\delta^{opt}(t)$ is the time-varying regularization factor; $e^*(t)$ is the complex conjugate of $e(t)$; $e(t) = y(t) - \vec{x}^H(t)\vec{w}(t)$, $e(t)$ is the error signal outputted by the AEC at the signal sample time t; $y(t)$ is the signal received by the microphone at the signal sample time t; $\vec{w}(t) = [w_0(t), w_1(t), \ldots, w_{L-1}(t)]^T$, $w_{t2}(t)$ is the $(t2+1)$-th coefficient of the FIR filter at the signal sample time t, $t2 = 0, 1, 2, \ldots, L-1$; t is the digital-signal sample time index number.

Further, when the processor 62 executes the computer program, the processor 62 further implements following steps:

according to an Equation:
$\vec{w}(t+1) =$
$\vec{w}(t) + \lambda \cdot X_{state}(t)[X_{state}^H(t)X_{state}(t) + \delta^{opt}(t) \cdot I_{P \times P}]^{-1} \cdot \vec{e}^*(t)$,
applying an affine projection (AP) algorithm to sustainably adaptively update the coefficient vector of the FIR filter;

where $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; µ is a predetermined coefficient updating step-size parameter, and $0 < \mu < 2$; $\delta^{opt}(t)$ is a time-varying regularization factor; $X_{state}(t)$ is L×P-dimension state matrix, and $X_{state}(t) = [\vec{x}(t), \vec{x}(t-1), \ldots, \vec{x}(t-P+1)]$; $\vec{x}(t-t3)$ is the far-end reference signal vector at the signal sample time $(t-t3)$, and $t3 = 0, 1, \ldots, P-1$, P is the order quantity of the AP algorithm; $X_{state}^H(t)$ is the conjugate transpose matrix of $X_{state}(t)$; $I_{P \times P}$ is a P×P-dimension unit matrix; $\vec{e}^*(t)$ is a complex conjugate of $\vec{e}(t)$, and $\vec{e}(t) = \vec{y}(t) - X_{state}^H(t)\vec{w}(t)$; $\vec{e}(t)$ is a P-dimension error vector; $\vec{y}(t)$ is a P-dimension vector of the signal received by the microphone, and $\vec{y}(t) = [y(t), y(t-1), \ldots, y(t-P+1)]^T$; $y(t-t3)$ is the signal received by the microphone at the signal sample time $(t-t3)$; $\vec{w}(t) = [w_0(t), w_1(t), \ldots, w_{L-1}(t)]^T$, $w_{t2}(t)$ is the $(t2+1)$-th coefficient of the FIR filter at the signal sample time t, $t2 = 0, 1, 2, \ldots, L-1$; t is a digital-signal sample time index number.

Specifically, the preset signal includes a subband spectrum of the near-end speech signal received by the microphone and inputted in the AEC and a subband spectrum of a far-end reference speech signal. The coefficient vector of the FIR filter is a subband-domain coefficient vector of the FIR filter and the time-varying regularization factor is a subband-domain time-varying regularization factor. When the processor 62 executes the computer program, the processor 62 further implements following steps: obtaining a subband power spectrum of the signal received by the microphone and an effective estimation value of a subband-domain coupling factor, respectively; according to the subband power spectrum of the signal received by the microphone and the effective estimation value of the subband-domain coupling factor, obtaining a subband-domain time-varying regularization factor used for iteratively updating the subband-domain coefficient vector of the FIR filter when the subband-domain coefficient vector of the FIR filter is used for processing a preset signal.

Further, when the processor 62 executes the computer program, the processor 62 further implements following steps:
according to an Equation:

$$\hat{\sigma}_Y^2(k, n) = \begin{cases} \alpha_a \cdot \hat{\sigma}_Y^2(k, n-1) + (1-\alpha_a) \cdot |Y(k, n)|^2, & \text{if } |Y(k, n)|^2 > \hat{\sigma}_Y^2(k, n-1) \\ \alpha_d \cdot \hat{\sigma}_Y^2(k, n-1) + (1-\alpha_d) \cdot |Y(k, n)|^2, & \text{if } |Y(k, n)|^2 \leq \hat{\sigma}_Y^2(k, n-1) \end{cases},$$

obtaining the subband power spectrum of the signal received by the microphone;
where $\hat{\sigma}_Y^2(k, n)$ is the subband power spectrum of the signal received by the microphone; $Y(k, n)$ is a subband spectrum of the signal received by the microphone; $\alpha_a$ and $\alpha_d$ are preset recursive constant quantities, and $0 \leq \alpha_a < \alpha_d < 1$; k is a subband index variable, $k=0, 1, 2, \ldots, K-1$, and K is the total number of subbands; n is the signal frame time index variable.

Further, when the processor 62 executes the computer program, the processor 62 further implements following steps:
obtaining a biased estimation value of the subband-domain coupling factor according to a cross-correlation method; obtaining a correction factor used for compensating for the biased estimation value of the subband-domain coupling factor; obtaining an effective estimation value of the subband-domain coupling factor according to the biased estimation value of the subband-domain coupling factor and the correction factor.

Further, when the processor 62 executes the computer program, the processor 62 further implements following steps:
according to an Equation:

$$\hat{\beta}(k, n)|_{Cross-correlation} = \frac{\left|\sum_{n1=0}^{N_s-1} E(k, n-n1) X^*(k, n-n1)\right|^2}{\left|\sum_{n1=0}^{N_s-1} |X(k, n-n1)|^2\right|^2},$$

obtaining the biased estimation value of the subband-domain coupling factor;
where $\hat{\beta}(k, n)|_{Cross-correlation}$ is a biased estimation value of the subband-domain coupling factor; $X^*(k, n-n1)$ is a complex conjugate of $X(k, n-n1)$; $n1=0, 1, 2, \ldots, N_s-1$, $N_s$ is the number of signal frames used for estimation of $\hat{\beta}(k, n)|_{Cross-correlation}$, and $N_s \ll L_s$, $L_s$ is the number of coefficients of the FIR filter in each subband; $E(k, n-n1)$ is a subband spectrum of an error signal outputted by the AEC at signal frame time $(n-n1)$; $E(k, n)=Y(k, n)-\vec{X}_k^H(n)\vec{W}_k(n)$, $E(k, n)$ is the subband spectrum of the error signal outputted by the AEC at signal frame time n; $Y(k, n)$ is the subband spectrum of the signal received by the microphone at the signal frame time n; $\vec{X}_k^H(n)$ is a conjugate transpose matrix of $\vec{X}_k(n)$; $\vec{X}_k(n)$ is a subband-spectrum vector of the far-end reference signal, and $\vec{X}_k(n)=[X(k, n), X(k, n-1), \ldots, X(k, n-L_s+1)]^T$; $X(k, n-n2)$ is a subband spectrum of a far-end reference signal at signal frame time $(n-n2)$; T is a transpose operator; $\vec{W}_k(n)$ is the coefficient vector of the FIR filter in a subband k, $\vec{W}_k(n)=[W_0(k, n), W_1(k, n), \ldots, W_{L_s-1}(k, n)]^T$; $W_{n2}(k, n)$ is the $(n2+1)$-th coefficient of the FIR filter in the subband k at the signal frame time n, $n2=0, 1, 2, \ldots, L_s-1$; k is a subband index variable, $k=0, 1, 2, \ldots, K-1$, and K is the total number of subbands; n is the signal frame time index variable.

Further, when the processor 62 executes the computer program, the processor 62 further implements following steps:
obtaining a candidate value of a square of a magnitude of a correlation coefficient between a subband spectrum of the error signal outputted by the AEC and a subband spectrum of a far-end reference signal; obtaining a square of an effective magnitude of a correlation coefficient between a subband spectrum of the error signal outputted by the AEC and a subband spectrum of the far-end reference signal according to the candidate value of the square of the magnitude of the correlation coefficient between the subband spectrum of the error signal outputted by the AEC and the subband spectrum of the far-end reference signal, and taking the square of the effective magnitude of the correlation coefficient between the subband spectrum of the error signal outputted by the AEC and the subband spectrum of the far-end reference signal as the correction factor used for compensating for the biased estimation value of the subband-domain coupling factor.

Further, when the processor 62 executes the computer program, the processor 62 further implements following steps:
according to an Equation:

$$\hat{r}(k, n) = \frac{\left|\sum_{n1=0}^{N_s-1} E(k, n-n1) X^*(k, n-n1)\right|^2}{\left(\sum_{n1=0}^{N_s-1} |E(k, n-n1)|^2\right)\left(\sum_{m=0}^{N_s-1} |X(k, n-n1)|^2\right)},$$

obtaining the candidate value of the square of the magnitude of the correlation coefficient between the subband spectrum of the error signal outputted by the AEC and the subband spectrum of the far-end reference signal;
where $\hat{r}(k, n)$ is the candidate value of the square of the magnitude of the correlation coefficient between the subband spectrum of the error signal outputted by the AEC and the subband spectrum of the far-end reference signal; $X^*(k, n-n1)$ is a complex conjugate of $X(k, n-n1)$; $n1=0, 1, 2, \ldots, N_s-1$, $N_s$ is the number of frames used for estimation of $\hat{r}(k, n)$, and $N_s \ll L_s$, $L_s$ is the number of coefficients of the FIR filter in each subband; $E(k, n-n1)$ is the subband spectrum of the error signal outputted by the AEC at signal frame time $(n-n1)$; $E(k, n)=Y(k, n)-\vec{X}_k^H(n)\vec{W}_k(n)$, $E(k, n)$ is the subband spectrum of the error signal outputted by the AEC at signal frame time n; $Y(k, n)$ is a subband spectrum of a signal received by the microphone; $\vec{X}_k^H(n)$ is a conjugate transpose matrix of $\vec{X}_k(n)$; $\vec{X}_k(n)$ is the subband spectrum vector of the far-end reference signal, and $\vec{X}_k(n)=[X(k, n), X(k, n-1), \ldots, X(k, n-L_s+1)]^T$; $X(k, n-n2)$ is the subband spectrum of the far-end reference signal at the signal frame time (n−n2); T is a transpose operator; $\vec{W}_k(n)$ is the coefficient vector of the FIR filter in a subband k; $\vec{W}_k(n)=[W_0(k, n), W_1(k, n), \ldots, W_{L_s-1}(k, n)]^T$; $W_{n2}(k, n)$ is a (n2+1)-th coefficient of the FIR filter in the signal frame time n in the subband k; n2=0, 1, 2, …, $L_s$−1; k is a subband index variable; k=, 1, 2, …, K−1, and K is the total number of subbands; n is the signal frame time index variable.

Further, when the processor 62 executes the computer program, the processor 62 further implements following steps:
according to an Equation:

$$|\hat{r}_{EX}(k, n)|^2 = \begin{cases} \hat{r}(k, n), & \text{if } \hat{r}(k, n) > |\hat{r}_{EX}(k, n-1)|^2 \\ |\hat{r}_{EX}(k, n-1)|^2, & \text{if } \hat{r}(k, n) \leq |\hat{r}_{EX}(k, n-1)|^2 \end{cases},$$

obtaining the square of the effective magnitude of the correlation coefficient between the subband spectrum of the error signal outputted by the AEC and the subband spectrum of the far-end reference signal;
where $|\hat{r}_{EX}(k, n)|^2$ is the square of the effective magnitude of the correlation coefficient between the subband spectrum of the error signal outputted by the AEC and the subband spectrum of the far-end reference signal; $\vec{r}(k, n)$ is the candidate value of the square of the magnitude of the correlation coefficient between the subband spectrum of the error signal outputted by the AEC and the subband spectrum of the far-end reference signal; n is the signal frame time index variable.

Further, when the processor 62 executes the computer program, the processor 62 further implements following steps:
according to an Equation:

$$\hat{\beta}(k, n) = \frac{\hat{\beta}(k, n)|_{Cross-correlation}}{|\hat{r}_{EX}(k, n)|^2},$$

obtaining the effective estimation value of the subband-domain coupling factor;
where $\hat{\beta}(k, n)$ is the effective estimation value of the subband-domain coupling factor, $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; n is the signal frame time index variable.

Further, when the processor 62 executes the computer program, the processor 62 further implements following steps:
according to the Equation:

$$\delta^{opt}(k, n) = \max\left\{\frac{L_s \cdot \hat{\sigma}_Y^2(k, n)}{\hat{\beta}(k, n) + \rho_0}, \delta_{min}\right\} = \max\left\{\frac{L_s \cdot \hat{\sigma}_Y^2(k, n)|\hat{r}_{EX}(k, n)|^2}{\hat{\beta}(k, n)|_{Cross-correlation} + \rho}, \delta_{min}\right\},$$

obtaining a subband-domain time-varying regularization factor used for iteratively updating the subband-domain coefficient vector of the FIR filter when the subband-domain coefficient vector of the FIR filter is used for processing a preset signal;
where $\delta^{opt}(k, n)$ is the subband-domain time-varying regularization factor; $\hat{\sigma}_Y^2(k, n)$ is the subband power spectrum of the signal received by the microphone;

$$\hat{\beta}(k, n) = \frac{\hat{\beta}(k, n)|_{Cross-correlation}}{|\hat{r}_{EX}(k, n)|^2}$$

is the effective estimation value of the subband-domain coupling factor, $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; $\delta_{min}$ is the preset small real constant quantity, and $\delta_{min}>0$; $\rho_0$ and $\rho$ are preset small real constants, and $\rho>0$, $\rho_0>0$; n is the signal frame time index variable.

Further, when the processor 62 executes the computer program, the processor 62 further implements following steps:
according to an Equation:

$\vec{W}_k(n+1)=\vec{W}_k(n)+\mu \cdot \vec{X}_k(n)E^*(k, n)/[\vec{X}_k^H(n)\vec{X}_k(n)+\delta^{opt}(k, n)]$, sustainably adaptively updating the subband-domain coefficient vector of the FIR filter using a Normalized Least Mean Square (NLMS) algorithm;

where $\vec{W}_k(n+1)$ is the coefficient vector of the FIR filter in the subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0<\mu<2$; $\vec{X}_k(n)$ is the subband spectrum vector of the far-end reference signal; $\vec{X}_k(n)=[X(k, n), X(k, n-1), \ldots, X(k, n-L_s+1)]^T$; $X(k, n-n2)$ is the subband spectrum of the far-end reference signal at the signal frame time (n−n2); n2=0, 1, …, $L_s$−1, $L_s$ is the number of coefficients of the FIR filter in each subband, T is the transpose operator; $\vec{X}_k^H(n)$ is a conjugate transpose matrix of $\vec{X}_k(n)$; $E^*(k, n)$ is the complex conjugate of E(k, n); E(k, n) is the subband spectrum of the error signal outputted by AEC at the signal frame time "n", and $E(k, n)=Y(k, n)-\vec{X}_k^H(n)\vec{W}_k(n)$; Y(k, n) is the subband spectrum of the signal received by the microphone at the signal frame time "n"; $\vec{W}_k(n)=[W_0(k, n), W_1(k, n), \ldots, W_{L_s-1}(k, n)]^T$; $W_{n2}(k, n)$ is the (n2+1)-th coefficient of the FIR filter in the subband k at the signal frame time "n"; $\delta^{opt}(k, n)$ is the subband-domain time-varying regularization factor; k is a subband index variable, k=, 1, 2, …, K−1, and K is the total number of subbands; n is the signal frame time index variable.

Further, when the processor 62 executes the computer program, the processor 62 further implements following steps:
according to an Equation:

$\vec{W}_k(n+1)=\vec{W}_k(n)+\mu \cdot X_{state}(k, n) \cdot [X_{state}^H(k, n)X_{state}(k, n)+\delta^{opt}(k, n) \cdot I_{P \times P}]^{-1} \cdot \vec{E}_k^*(n)$, substainably adaptively updating the subband-domain coefficient vector of the FIR filter using an affine projection (AP) algorithm;

where $\vec{W}_k(n+1)$ is the coefficient vector of the FIR filter in the subband k after the coefficient vector of the FIR filter is updated; $\vec{W}_k(n)$ is the coefficient vector of the FIR filter in the subband k before the coefficient vector of the FIR filter is updated; μ is a predetermined coefficient updating step-size parameter, and 0<μ<2; $\delta^{opt}(k, n)$ is the subband-domain time-varying regularization factor; $X_{state}(k, n)$ is an L×P-dimension state matrix in the subband k, and $X_{state}(k, n)=[\vec{X}_k(n), \vec{X}_k(n-1), \ldots, \vec{X}_k(n-P+1)]$ is the subband spectrum vector of the far-end reference signal at the signal frame time (n–n3), and n3=0, 1, . . . , P–1, P is the order quantity of the AP algorithm; $X_{state}^H(k, n)$ is the conjugate transpose matrix of $X_{state}(k, n)$; $I_{P\times P}$ is a P×P-dimension unit matrix; $\vec{E}_m^*(n)$ is the complex conjugate of $\vec{E}_k(n)$, and $\vec{E}_k(n)=\vec{Y}_k(n)-X_{state}^H(k, n)\vec{W}_k(n)$; $\vec{E}_k^*(n)$ is the subband spectrum vector of a P-dimensional error signal; $\vec{Y}_k(n)$ is the P-dimension subband spectrum vector of the signal received by the microphone, and $\vec{Y}_k(n)=[Y(k, n), Y(k, n-1), \ldots, Y(k, n-P+1)]^T$; Y(k, n–n3) is the signal received by the microphone at the signal frame time (n–n3); $\vec{W}_k(n)=[W_0(k, n), W_1(k, n), \ldots, W_{L_s-1}(k, n)]^T$; $W_{n2}(k, n)$ is the (n2+1)-th coefficient of the FIR filter in the subband k at the signal frame time "n", n2=0, 1, . . . , $L_s$–1, $L_s$ is the number of coefficients of the FIR filter in each subband; k is a subband index variable, k=0, 1, 2, . . . , K–1, and K is the total number of subbands; n is the signal frame time index variable.

It will be understood by those skilled in the art that all or part of the steps of implementing the above embodiments may be accomplished by hardware, or may be accomplished by a computer program indicating associated hardware; the computer program includes instructions for performing some or all of the steps of the method described above; and the computer program may be stored in a readable storage medium, which may be any form of storage medium.

Figure 7:
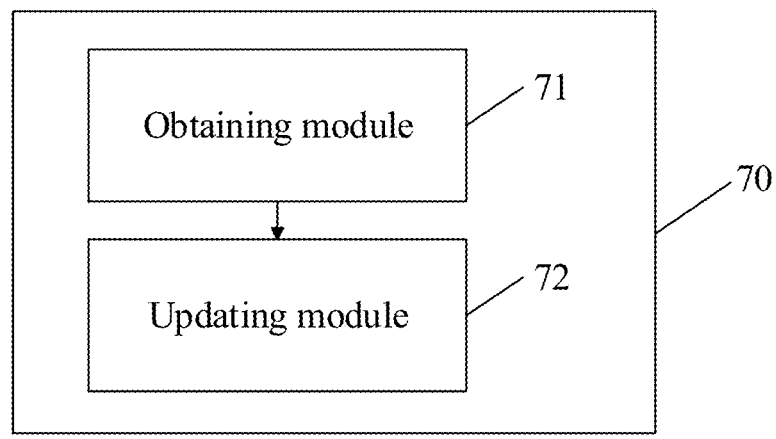
FIG. 7 illustrates a schematic diagram showing blocks in a device of sustainably adaptively updating of a coefficient vector of a FIR filter according to some embodiments of the present disclosure.

As shown in FIG. 7, some embodiments of the present disclosure also provide a device 70 of sustainably adaptively updating a coefficient vector of a Finite Impulse Response (FIR) filter. The device 70 includes an obtaining module, configured to obtain a time-varying regularization factor used for iteratively updating a coefficient vector of a FIR filter in a case that the coefficient vector of the FIR filter is used for processing a preset signal; an updating module, configured to update the coefficient vector of the FIR filter according to the time-varying regularization factor.

Specifically, the preset signal includes a far-end reference speech signal inputted in an AEC and a near-end speech signal received by a microphone; the obtaining module 71 includes: a first obtaining unit, configured to obtain a power of a signal received by a microphone and an effective estimation value of a coupling factor; a second obtaining unit, configured to, according to the power of the signal received by the microphone and the effective estimation value of the coupling factor, obtain a time-varying regularization factor used for iteratively updating the coefficient vector of the FIR filter when the coefficient vector of the FIR filter is used for processing a preset signal.

Further, a manner of obtaining the power of the signal received by the microphone performed by the first obtaining unit is as follows:
according to an Equation:

$$\hat{\sigma}_y^2(t) = \begin{cases} \alpha_a \cdot \hat{\sigma}_y^2(t-1) + (1-\alpha_a) \cdot |y(t)|^2, & \text{if } |y(t)|^2 > \hat{\sigma}_y^2(t-1) \\ \alpha_d \cdot \hat{\sigma}_y^2(t-1) + (1-\alpha_d) \cdot |y(t)|^2, & \text{if } |y(t)|^2 \leq \hat{\sigma}_y^2(t-1) \end{cases}$$

obtaining the power of the signal received by the microphone;
where $\hat{\sigma}_y^2(t)$ is the power of the signal received by the microphone; y(t) is the signal received by the microphone; $\alpha_a$ and $\alpha_d$ are preset recursive constant quantities, and $0 \leq \alpha_a < \alpha_d < 1$; t is a digital-signal time index number.

Further, a manner of obtaining the effective estimation value of the coupling factor performed by the first obtaining unit is as follows:
obtaining a biased estimation value of the coupling factor according to a cross-correlation method; obtaining a correction factor used for compensating for the biased estimation value of the coupling factor; obtaining an effective estimation value of the coupling factor according to the biased estimation value of the coupling factor and the correction factor.

Further, a manner of obtaining the biased estimation value of the coupling factor according to the cross-correlation method is as follows:
according to an Equation:

$$\hat{\beta}(t)|_{Cross-correlation} = \frac{\left|\sum_{t1=0}^{T_s-1} e(t-t1)x^*(t-t1)\right|^2}{\left|\sum_{t1=0}^{T_s-1} |x(t-t1)|^2\right|^2},$$

obtaining the biased estimation value of the coupling factor,
where $\hat{\beta}(t)|_{Cross-correlation}$ is the biased estimation value of the coupling factor based on the cross-correlation technique; $x^*(t-t1)$ is a complex conjugate of x(t–t1); t1=0, 1, 2, . . . , $T_s$–1, $T_s$ is the number of samples used in the estimation of the $\hat{\beta}(t)|_{Cross-correlation}$, and $T_s \ll L$, L is the number of coefficients of the FIR filter; e(t–t1) is an error signal outputted by the AEC at the signal sample time (t–t1), $e(t)=y(t)-\vec{x}^H(t)\vec{w}(t)$, e(t) is an error signal outputted by the AEC at the signal sample time t; y(t) is a signal received by the microphone at the signal sample time t; $\vec{x}^H(t)$ is a conjugate transpose matrix of $\vec{x}(t)$; $\vec{x}(t)$ is the far-end reference signal vector and $\vec{x}(t)=[x(t), x(t-1), \ldots, x(t-L+1)]^T$; x(t–t2) is the far-end reference signal at the signal sample time (t–t2); T is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ is the (t2+1)-th coefficient of the FIR filter at the signal sample time t, t2=0, 1, 2, . . . , L–1; t is a digital-signal time index number.

Further, a manner of obtaining a correction factor used for compelsating the biased estimation value of the coupling factor is as follows:
obtaining a candidate value of a square of a magnitude of a correlation coefficient between the error signal outputted by the AEC and the far-end reference signal; obtaining a square of an effective magnitude of the correlation coefficient between the error signal outputted by the AEC and the far-end reference signal based on the candidate value of the square of the magnitude of the correlation coefficient between the error signal outputted by the AEC and the far-end reference signal, and taking the square of the effective magnitude of the correlation coefficient between the error signal outputted by the AEC and the far-end reference signal as the correction factor used for compensating for the biased estimation value of the coupling factor.

Further, a manner of obtaining the candidate value of the square of the magnitude of the correlation coefficient between the error signal outputted by the AEC and the far-end reference signal is as follows:
according to an Equation:

$$\hat{r}(t) = \frac{\left|\sum_{t1=0}^{T_s-1} e(t-t1)x^*(t-t1)\right|^2}{\left(\sum_{t1=0}^{T_s-1}|e(t-t1)|^2\right)\left(\sum_{t1=0}^{T_s-1}|x(t-t1)|^2\right)},$$

obtaining the candidate value of the square of the magnitude of the correlation coefficient between the error signal outputted by the AEC and the far-end reference signal; where $\hat{r}(t)$ is the candidate value of the square of the magnitude of the correlation coefficient between the error signal outputted by the AEC and the far-end reference signal; $x(t-t1)$ is the far-end reference signal at the signal sample time $(t-t1)$; $x^*(t-t1)$ is the complex conjugate of $x(t-t1)$; $t1=0, 1, 2, \ldots, T_s-1$, $T_s$ is the number of samples used in the estimation of $\hat{r}(t)$, and $T_s \ll L$, $L$ is the number of coefficients of the FIR filter; $e(t-t1)$ is the error signal outputted by the AEC at the signal sample time $(t-t1)$, $e(t)=y(t)-\vec{x}^H(t)\vec{w}(t)$, $e(t)$ is an error signal outputted by the AEC at the signal sample time $t$; $y(t)$ is the signal received by the microphone at the signal sample time $t$; $\vec{x}^H(t)$ is the conjugate transpose matrix of $\vec{x}(t)$; $\vec{x}(t)$ is the far-end reference signal vector and $\vec{x}^H(t)=[x(t), x(t-1), \ldots, x(t-L+1)]^T$; $x(t-t2)$ is the far-end reference signal at the signal sample time $(t-t2)$; $T$ is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ is the $(t2+1)$-th coefficient of the FIR filter at the signal sample time $t$, $t2=0, 1, 2, \ldots, L-1$; $t$ is a digital-signal sample time index number.

Further, a manner of obtaining the square of the effective magnitude of the correlation coefficient between the error signal outputted by the AEC and the far-end reference signal based on the candidate value of the square of the magnitude of the correlation coefficient between the error signal outputted by the AEC and the far-end reference signal is as follows:
according to an Equation:

$$|\hat{r}_{ex}(t)|^2 = \begin{cases} \hat{r}(t), & \text{if } \hat{r}(t) > |\hat{r}_{ex}(t-1)|^2 \\ |\hat{r}_{ex}(t-1)|^2, & \text{if } \hat{r}(t) \leq |\hat{r}_{ex}(t-1)|^2 \end{cases}$$

obtaining the square of the effective magnitude of the correlation coefficient between the signal outputted by the AEC and the far-end reference signal;
where $|\hat{r}_{ex}(t)|^2$ is the square of the effective magnitude of the correlation coefficient between the error signal outputted by the AEC and the far-end reference signal; $\hat{r}(t)$ is the candidate value of the square of the magnitude of the correlation coefficient between the error signal outputted by the AEC and the far-end reference signal; $t$ is a digital-signal sample time index number.

Further, a manner of obtaining the effective estimation value of the coupling factor according to the biased estimation value of the coupling factor and the correction factor is as follows:

obtaining the effective estimation value of the coupling factor according to the Equation:

$$\hat{\beta}(t) = \frac{\hat{\beta}(t)|_{Cross-correlation}}{|\hat{r}_{ex}(t)|^2},$$

where $\hat{\beta}(t)$ is the effective estimation value of the coupling factor; $\hat{\beta}(t)|_{Cross-correlation}$ is the biased estimation value of the coupling factor based on the cross-correlation technique; $|\hat{r}_{ex}(t)|^2$ is the square of the effective magnitude of the correlation coefficient between the error signal outputted by the AEC and the far-end reference signal; $t$ is a digital-signal sample time index number.

Further, the second obtaining unit is configured to:
according to an Equation:

$$\delta^{opt}(t) = \max\left\{\frac{L \cdot \hat{\sigma}_y^2(t)}{\hat{\beta}(t) + \rho_0}, \delta_{min}\right\} = \max\left\{\frac{L \cdot \hat{\sigma}_y^2(t)|\hat{r}_{ex}(t)|^2}{\hat{\beta}(t)|_{Cross-correlation} + \rho}, \delta_{min}\right\},$$

obtain the time-varying regularization factor used for iteratively updating the coefficient vector of the FIR filter; where $\delta^{opt}(t)$ is the time-varying regularization factor; $L$ is the number of coefficients of the FIR filter; $\hat{\sigma}_y^2(t)$ is the power of the signal received by the microphone;

$$\hat{\beta}(t) = \frac{\hat{\beta}(t)|_{Cross-correlation}}{|\hat{r}_{ex}(t)|^2}$$

is the effective estimation value of coupling factor; $\hat{\beta}(t)|_{Cross-correlation}$ is the biased estimation value of the coupling factor based on the cross-correlation technique; $|\hat{r}_{ex}(t)|^2$ is the square of the effective magnitude of the correlation coefficient between the error signal outputted by the AEC and the far-end reference signal; $\delta_{min}$ is a preset small real constant quantity, and $\delta_{min} > 0$; $\rho_0$ and $\rho$ are preset small real constants, and $\rho > 0$, $\rho_0 > 0$, respectively; $t$ is a digital-signal sample time index number.

Further, the updating module is configured to:
according to an Equation: $\vec{w}(t+1) = \vec{w}(t) + \mu \cdot \vec{x}(t)e^*(t)/[\vec{x}^H(t)\vec{x}(t) + \delta^{opt}(t)]$, sustainably adaptively update the coefficient vector of the FIR filter by applying a Normalized Least Mean Square (NLMS) algorithm, wherein, $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; $\mu$ is a predetermined coefficient updating step-size parameter, and $0<\mu<2$; $\vec{x}(t)$ is the far-end reference signal vector and $\vec{x}(t)=[x(t), x(t-1), \ldots, x(t-L+1)]^T$; $x(t-t2)$ is the far-end reference signal at the signal sample time $(t-t2)$; $T$ is a transpose operator; $\vec{x}^H(t)$ is the conjugate transpose matrix of $\vec{x}(t)$; $\delta^{opt}(t)$ is the time-varying regularization factor; $e^*(t)$ is the complex conjugate of $e(t)$; $e(t)=y(t)-\vec{x}^H(t)\vec{w}(t)$, $e(t)$ is the error signal outputted by the AEC at the signal sample time $t$; $y(t)$ is the signal received by the microphone at the signal sample time $t$; $\vec{w}(t)=[w_0(t), w_1(t), \ldots, w_{L-1}(t)]^T$, $w_{t2}(t)$ is the $(t2+1)$-th coefficient of the FIR filter at the signal sample time t, t2=0, 1, 2, ..., L−1; t is the digital-signal sample time index number.

Further, the updating module 72 is configured to:
according to an Equation:
$\vec{w}(t+1)=$
$\vec{w}(t)+\mu \cdot X_{state}(t)[X_{state}^{H}(t)X_{state}(t)+\delta^{opt}(t) \cdot I_{P \times P}]^{-1} \cdot \vec{e}^{*}(t)$,
apply an affine projection (AP) algorithm to sustainably adaptively update the coefficient vector of the FIR filter;

where $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; μ is a predetermined coefficient updating step-size parameter, and 0<μ<2; $\delta^{opt}(t)$ is a time-varying regularization factor; $X_{state}(t)$ is L×P-dimension state matrix, and $X_{state}(t)=[\vec{x}(t), \vec{x}(t-1), ..., \vec{x}(t-P+1)]$; $\vec{x}(t-t3)$ is the far-end reference signal vector at the signal sample time (t−t3), and t3=0, 1, ..., P−1, P is the order quantity of the AP algorithm; $X_{state}^{H}(t)$ is the conjugate transpose matrix of $X_{state}(t)$; $I_{P \times P}$ is a P×P-dimension unit matrix; $\vec{e}^{*}(t)$ is a complex conjugate of $\vec{e}(t)$, and $\vec{e}(t)=\vec{y}(t)-X_{state}^{H}(t)\vec{w}(t)$; $\vec{e}(t)$ is a P-dimension error vector; $\vec{y}(t)$ is a P-dimension vector of the signal received by the microphone, and $\vec{y}(t)=[y(t), y(t-1), ..., y(t-P+1)]^{T}$; y(t−t3) is the signal received by the microphone at the signal sample time (t−t3); $\vec{w}(t)=[w_0(t), w_1(t), ..., w_{L-1}(t)]^{T}$, $w_{t2}(t)$ is the (t2+1)-th coefficient of the FIR filter at the signal sample time t, t2=0, 1, 2, ..., L−1; t is a digital-signal sample time index number.

Specifically, the preset signal includes a subband spectrum of the near-end speech signal received by the microphone and inputted in the AEC and a subband spectrum of a far-end reference speech signal. The coefficient vector of the FIR filter is a subband-domain coefficient vector of the FIR filter and the time-varying regularization factor is a subband-domain time-varying regularization factor. The obtaining module 71 includes a third obtaining unit, configured to obtain a subband power spectrum of the signal received by the microphone and an effective estimation value of a subband-domain coupling factor, respectively; a fourth obtaining unit, configured to, according to the subband power spectrum of the signal received by the microphone and the effective estimation value of the subband-domain coupling factor, obtain a subband-domain time-varying regularization factor used for iteratively updating the subband-domain coefficient vector of the FIR filter when the subband-domain coefficient vector of the FIR filter is used for processing a preset signal.

Further, a manner of obtaining the subband power spectrum of the signal received by the microphone performed by the third obtaining unit is as follows:
according to an Equation:

$$\hat{\sigma}_Y^2(k, n) =$$
$$\begin{cases} \alpha_a \cdot \hat{\sigma}_Y^2(k, n-1) + (1-\alpha_a) \cdot |Y(k,n)|^2, \text{ if } |Y(k,n)|^2 > \hat{\sigma}_Y^2(k, n-1) \\ \alpha_d \cdot \hat{\sigma}_Y^2(k, n-1) + (1-\alpha_d) \cdot |Y(k,n)|^2, \text{ if } |Y(k,n)|^2 \leq \hat{\sigma}_Y^2(k, n-1) \end{cases},$$

obtaining the subband power spectrum of the signal received by the microphone;

where $\hat{\sigma}_Y^2(k, n)$ is the subband power spectrum of the signal received by the microphone; Y(k, n) is a subband spectrum of the signal received by the microphone; $\alpha_a$ and $\alpha_d$ are preset recursive constant quantities, and $0 \leq \alpha_a < \alpha_d < 1$; k is a subband index variable, k=0, 1, 2, ..., K−1, and K is the total number of subbands; n is the signal frame time index variable.

Further, a manner of obtaining the effective estimation value of the subband-domain coupling factor performed by the third obtaining unit is as follows:
obtaining a biased estimation value of the subband-domain coupling factor according to a cross-correlation method; obtaining a correction factor used for compensating for the biased estimation value of the subband-domain coupling factor; obtaining an effective estimation value of the subband-domain coupling factor according to the biased estimation value of the subband-domain coupling factor and the correction factor.

Further, a manner of obtaining the biased estimation value of the subband-domain coupling factor according to the cross-correlation method is as follows:
according to an Equation:

$$\hat{\beta}(k, n)|_{Cross\text{-}correlation} = \frac{\left|\sum_{n1=0}^{N_s-1} E(k, n-n1)X^*(k, n-n1)\right|^2}{\left|\sum_{n1=0}^{N_s-1} |X(k, n-n1)|^2\right|^2},$$

obtaining the biased estimation value of the subband-domain coupling factor;

where $\hat{\beta}(k, n)|_{Cross\text{-}correlation}$ is a biased estimation value of the subband-domain coupling factor; X*(k, n−n1) is a complex conjugate of X(k, n−n1); n1=0, 1, 2, ..., $N_s$−1, $N_s$ is the number of signal frames used for estimation of $\hat{\beta}(k, n)|_{Cross\text{-}correlation}$, and $N_s \ll L_s$, $L_s$ is the number of coefficients of the FIR filter in each subband; E(k, n−n1) is a subband spectrum of an error signal outputted by the AEC at signal frame time (n−n1); $E(k, n)=Y(k, n)-\vec{X}_k^H(n)\vec{W}_k(n)$, E(k, n) is the subband spectrum of the error signal outputted by the AEC at signal frame time n; Y(k, n) is the subband spectrum of the signal received by the microphone at the signal frame time n; $\vec{X}_k^H(n)$ is a conjugate transpose matrix of $\vec{X}_k(n)$; $\vec{X}_k(n)$ is a subband-spectrum vector of the far-end reference signal, and $\vec{X}_k(n)=[X(k, n), X(k, n-1), ..., X(k, n-L_s+1)]^T$; X(k, n−n2) is a subband spectrum of a far-end reference signal at signal frame time (n−n2); T is a transpose operator; $\vec{W}_k(n)$ is the coefficient vector of the FIR filter in a subband k, $\vec{W}_k(n)=[W_0(k, n), W_1(k, n), ..., W_{L_s-1}(k, n)]^T$; $W_{n2}(k, n)$ is the (n2+1)-th coefficient of the FIR filter in the subband k at the signal frame time n, n2=0, 1, 2, ..., $L_s$−1; k is a subband index variable, k=0, 1, 2, ..., K−1, and K is the total number of subbands; n is the signal frame time index variable.

Further, a manner of obtaining the correction factor used for compensating for the biased estimation value of the subband-domain coupling factor is as follows:
obtaining a candidate value of a square of a magnitude of a correlation coefficient between a subband spectrum of the error signal outputted by the AEC and a subband spectrum of a far-end reference signal; obtaining a square of an effective magnitude of a correlation coefficient between a subband spectrum of the error signal outputted by the AEC and a subband spectrum of the far-end reference signal according to the candidate value of the square of the magnitude of the correlation coefficient between the subband spectrum of the error signal outputted by the AEC and the subband spectrum of the far-end reference signal, and taking the square of the effective magnitude of the correlation coefficient between the subband spectrum of the error signal outputted by the AEC and the subband spectrum of the far-end reference signal as the correction factor used for compensating for the biased estimation value of the subband-domain coupling factor.

Further, a manner of obtaining the candidate value of the square of the magnitude of the correlation coefficient between the subband spectrum of the error signal outputted by the AEC and the subband spectrum of the far-end reference signal is as follows:

according to an Equation:

$$\hat{r}(k, n) = \frac{\left|\sum_{n1=0}^{N_s-1} E(k, n-n1) X^*(k, n-n1)\right|^2}{\left(\sum_{n1=0}^{N_s-1} |E(k, n-n1)|^2\right)\left(\sum_{m=0}^{N_s-1} |X(k, n-n1)|^2\right)},$$

obtaining the candidate value of the square of the magnitude of the correlation coefficient between the subband spectrum of the error signal outputted by the AEC and the subband spectrum of the far-end reference signal;

where $\vec{r}(k, n)$ is the candidate value of the square of the magnitude of the correlation coefficient between the subband spectrum of the error signal outputted by the AEC and the subband spectrum of the far-end reference signal; $X^*(k, n-n1)$ is a complex conjugate of $X(k, n-n1)$; $n1=0, 1, 2, \ldots, N_s-1$, $N_s$ is the number of frames used for estimation of $\vec{r}(k, n)$, and $N_s \ll L_s$, $L_s$ is the number of coefficients of the FIR filter in each subband; $E(k, n-n1)$ is the subband spectrum of the error signal outputted by the AEC at signal frame time $(n-n1)$; $E(k, n)=Y(k, n)-\vec{X}_k^H(n)\vec{W}_k(n)$, $E(k, n)$ is the subband spectrum of the error signal outputted by the AEC at signal frame time $n$; $Y(k, n)$ is a subband spectrum of a signal received by the microphone; $\vec{X}_k^H(n)$ is a conjugate transpose matrix of $\vec{X}_k(n)$; $\vec{X}_k(n)$ is the subband spectrum vector of the far-end reference signal, and $\vec{X}_k(n)=[X(k, n), X(k, n-1), \ldots, X(k, n-L_s+1)]^T$; $X(k, n-n2)$ is the subband spectrum of the far-end reference signal at the signal frame time $(n-n2)$; T is a transpose operator; $\vec{W}_k(n)$ is the coefficient vector of the FIR filter in a subband k; $\vec{W}_k(n)=[W_0(k, n), W_1(k, n), \ldots, W_{L_s-1}(k, n)]^T$; $W_{n2}(k, n)$ is a $(n2+1)$-th coefficient of the FIR filter in the signal frame time n in the subband k; $n2=0, 1, 2, \ldots, L_s-1$; k is a subband index variable; $k=, 1, 2, \ldots, K-1$, and K is the total number of subbands; n is the signal frame time index variable.

Further, a manner of obtaining the square of the effective magnitude of the correlation coefficient between the subband spectrum of the error signal outputted by the AEC and the subband spectrum of the far-end reference signal according to the candidate value of the square of the magnitude of the correlation coefficient between the subband spectrum of the error signal outputted by the AEC and the subband spectrum of the far-end reference signal is as follows:

according to an Equation:

$$|\hat{r}_{EX}(k, n)|^2 = \begin{cases} \hat{r}(k, n), & \text{if } \hat{r}(k, n) > |\hat{r}_{EX}(k, n-1)|^2 \\ |\hat{r}_{EX}(k, n-1)|^2, & \text{if } \hat{r}(k, n) \leq |\hat{r}_{EX}(k, n-1)|^2 \end{cases},$$

obtaining the square of the effective magnitude of the correlation coefficient between the subband spectrum of the error signal outputted by the AEC and the subband spectrum of the far-end reference signal;

where $|\hat{r}_{EX}(k, n)|^2$ is the square of the effective magnitude of the correlation coefficient between the subband spectrum of the error signal outputted by the AEC and the subband spectrum of the far-end reference signal; $\hat{r}(k, n)$ is the candidate value of the square of the magnitude of the correlation coefficient between the subband spectrum of the error signal outputted by the AEC and the subband spectrum of the far-end reference signal; n is the signal frame time index variable.

Further, a manner of obtaining the effective estimation value of the subband-domain coupling factor according to the biased estimation value of the subband-domain coupling factor and the correction factor is as follows:

according to an Equation:

$$\hat{\beta}(k, n) = \frac{\hat{\beta}(k, n)|_{Cross\text{-}correlation}}{|\hat{r}_{EX}(k, n)|^2},$$

obtaining the effective estimation value of the subband-domain coupling factor;

where $\hat{\beta}(k, n)$ is the effective estimation value of the subband-domain coupling factor, $\hat{\beta}(k, n)|_{Cross\text{-}correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; n is the signal frame time index variable.

Further, the fourth obtaining unit is configured to:
according to the Equation:

$$\delta^{opt}(k, n) = \max\left\{\frac{L_s \cdot \hat{\sigma}_Y^2(k, n)}{\hat{\beta}(k, n) + \rho_0}, \delta_{min}\right\} = \max\left\{\frac{L_s \cdot \hat{\sigma}_Y^2(k, n)|\hat{r}_{EX}(k, n)|^2}{\hat{\beta}(k, n)|_{Cross\text{-}correlation} + \rho}, \delta_{min}\right\},$$

obtain a subband-domain time-varying regularization factor used for iteratively updating the subband-domain coefficient vector of the FIR filter when the subband-domain coefficient vector of the FIR filter is used for processing a preset signal;

where $\delta^{opt}(k, n)$ is the subband-domain time-varying regularization factor; $\hat{\sigma}_Y^2(k, n)$ is the subband power spectrum of the signal received by the microphone;

$$\hat{\beta}(k, n) = \frac{\hat{\beta}(k, n)|_{Cross\text{-}correlation}}{|\hat{r}_{EX}(k, n)|^2}$$

is the effective estimation value of the subband-domain coupling factor, $\hat{\beta}(k, n)|_{Cross\text{-}correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; $\delta_{min}$ is the preset small real constant quantity, and $\delta_{min}>0$; $\rho_0$ and $\rho$ are preset small real constants, and $\rho>0$, $\rho_0>0$; n is the signal frame time index variable.

Further, the updating module 72 is configured to: according to an Equation:

$\vec{W}_k(n+1)=\vec{W}_k(n)+\mu\cdot\vec{X}_k(n)E^*(k, n)/[\vec{X}_k^H(n)\vec{X}_k(n)+\delta^{opt}(k, n)]$ sustainably adaptively update the subband-domain coefficient vector of the FIR filter using a Normalized Least Mean Square (NLMS) algorithm;

where $\vec{W}_k(n+1)$ is the coefficient vector of the FIR filter in the subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0<\mu<2$; $\vec{X}_k(n)$ is the subband spectrum vector of the far-end reference signal; $\vec{X}_k(n)=[X(k, n), X(k, n-1), \ldots, X(k, n-L_s+1)]^T$; $X(k, n-n2)$ is the subband spectrum of the far-end reference signal at the signal frame time (n−n2); n2=0, 1, . . . , $L_s$−1, $L_s$ is the number of coefficients of the FIR filter in each subband, T is the transpose operator; $\vec{X}_k^H(n)$ is a conjugate transpose matrix of $\vec{X}_k(n)$; $E^*(k, n)$ is the complex conjugate of $E(k, n)$; $E(k, n)$ is the subband spectrum of the error signal outputted by AEC at the signal frame time "n", and $E(k, n)=Y(k, n)-\vec{X}_k(n)\vec{W}_k(n)$; $Y(k, n)$ is the subband spectrum of the signal received by the microphone at the signal frame time "n"; $\vec{W}_k(n)=[W_0(k, n), W_1(k, n), \ldots, W_{L_s-1}(k, n)]^T$; $W_{n2}(k, n)$ is the (n2+1)-th coefficient of the FIR filter in the subband k at the signal frame time "n"; $\delta^{opt}(k, n)$ is the subband-domain time-varying regularization factor; k is a subband index variable, k=0, 1, 2, . . . , K−1, and K is the total number of subbands; n is the signal frame time index variable.

Further, the updating module 72 is configured to: according to an Equation:

$\vec{W}_k(n+1)=\vec{W}_k(n)+\mu\cdot X_{state}(k, n)\cdot[X_{state}^H(k, n)X_{state}(k, n)+\delta^{opt}(k, n)\cdot I_{P\times P}]^{-1}\cdot\vec{E}_k^*(n)$, sustainably adaptively update the subband-domain coefficient vector of the FIR filter using an affine projection (AP) algorithm;

where $\vec{W}_k(n+1)$ is the coefficient vector of the FIR filter in the subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0<\mu<2$; $\delta^{opt}(k, n)$ is the subband-domain time-varying regularization factor; $X_{state}(k, n)$ is an L×P-dimension state matrix in the subband k, and $X_{state}(k, n)=[\vec{X}_k(n), \vec{X}_k(n-1), \ldots, \vec{X}_k(n-P+1)]$ is the subband spectrum vector of the far-end reference signal at the signal frame time (n−n3), and n3=0, 1, . . . , P−1, P is the order quantity of the AP algorithm; $X_{state}^H(k, n)$ is the conjugate transpose matrix of $X_{state}(k, n)$; $I_{P\times P}$ is a P×P-dimension unit matrix; $\vec{E}_k^*(n)$ is the complex conjugate of $\vec{E}_k(n)$, and $\vec{E}_k(n)=\vec{Y}_k(n)-X_{state}^H(k, n)\vec{W}_k(k)$; $\vec{E}_k(n)$ is the subband spectrum vector of a P-dimensional error signal; $\vec{Y}_k(n)$ is the P-dimension subband spectrum vector of the signal received by the microphone, and $\vec{Y}_k(n)=[Y(k, n), Y(k, n-1), \ldots, Y(k, n-P+1)]^T$; $Y(k, n-n3)$ is the signal received by the microphone at the signal frame time (n−n3); $\vec{W}_k(n)=[W_0(k, n), W_1(k, n), \ldots, W_{L_s-1}(k, n)]^T$; $W_{n2}(k, n)$ is the (n2+1)-th coefficient of the FIR filter in the subband k at the signal frame time "n", n2=0, 1, . . . , $L_s$−1, $L_s$ is the number of coefficients of the FIR filter in each subband; k is a subband index variable, k=0, 1, 2, . . . , K−1, and K is the total number of subbands; n is the signal frame time index variable.

It should be noted that this device embodiment describes a device corresponding to the above method embodiment in a one-to-one manner, and all implementations in the above method embodiment are applicable to this device embodiment, and the same technical effect can be achieved.

Some embodiments of the present disclosure also provide a computer readable storage medium. The computer readable storage medium includes a computer program stored thereon. When a processor executes the computer program, the processor implements following steps: obtaining a time-varying regularization factor used for iteratively updating a coefficient vector of a FIR filter in a case that the coefficient vector of the FIR filter is used for processing a preset signal; updating the coefficient vector of the FIR filter according to the time-varying regularization factor.

Specifically, the preset signal includes one of combined pairs of following: a far-end reference speech signal inputted in an acoustic echo canceller (AEC) and a near-end speech signal received by a microphone; a noise reference signal and a system input signal in an adaptive noise cancellation system; an interference reference signal and a system input signal in an adaptive interference cancellation system, and an excitation input signal and an unknown system output signal to be identified in adaptive system identification.

Further, the preset signal includes a far-end reference speech signal inputted in an AEC and a near-end speech signal received by a microphone; when the processor executes the computer program, the processor further implements following steps: obtaining a power of a signal received by a microphone and an effective estimation value of a coupling factor; according to the power of the signal received by the microphone and the effective estimation value of the coupling factor, obtaining a time-varying regularization factor used for iteratively updating the coefficient vector of the FIR filter when the coefficient vector of the FIR filter is used for processing a preset signal.

Further, when the processor executes the computer program, the processor further implements following steps:

according to an Equation:

$$\hat{\sigma}_y^2(t) = \begin{cases} \alpha_a \cdot \hat{\sigma}_y^2(t-1) + (1-\alpha_a)\cdot|y(t)|^2, & \text{if } |y(t)|^2 > \hat{\sigma}_y^2(t-1) \\ \alpha_d \cdot \hat{\sigma}_y^2(t-1) + (1-\alpha_d)\cdot|y(t)|^2, & \text{if } |y(t)|^2 \leq \hat{\sigma}_y^2(t-1) \end{cases}$$

obtaining the power of the signal received by the microphone;

where $\sigma_y^2(t)$ is the power of the signal received by the microphone; y(t) is the signal received by the microphone; $\alpha_a$ and $\alpha_d$ are preset recursive constant quantities, and $0\leq\alpha_a<\alpha_d<1$; t is a digital-signal time index number.

Further, when the processor executes the computer program, the processor further implements following steps: obtaining a biased estimation value of the coupling factor according to a cross-correlation method; obtaining a correction factor used for compensating for the biased estimation value of the coupling factor; obtaining an effective estimation value of the coupling factor according to the biased estimation value of the coupling factor and the correction factor.

Further, when the processor executes the computer program, the processor further implements following steps:
according to an Equation:

$$\hat{\beta}(t)|_{Cross\text{-}correlation} = \frac{\left|\sum_{t1=0}^{T_s-1} e(t-t1)x^*(t-t1)\right|^2}{\left|\sum_{t1=0}^{T_s-1} |x(t-t1)|^2\right|^2},$$

obtaining the biased estimation value of the coupling factor,
where $\hat{\beta}(t)|_{Cross\text{-}correlation}$ is the biased estimation value of the coupling factor based on the cross-correlation technique; $x^*(t-t1)$ is a complex conjugate of $x(t-t1)$; $t1=0, 1, 2, \ldots, T_s-1$, $T_s$ is the number of samples used in the estimation of the $\hat{\beta}(t)|_{Cross\text{-}correlation}$, and $T_s \ll L$, L is the number of coefficients of the FIR filter; $e(t-t1)$ is an error signal outputted by the AEC at the signal sample time $(t-t1)$, $e(t)=y(t)-\vec{x}^H(t)\vec{w}(t)$, $e(t)$ is an error signal outputted by the AEC at the signal sample time t; y(t) is a signal received by the microphone at the signal sample time t; $\vec{x}^H(t)$ is a conjugate transpose matrix of $\vec{x}(t)$; $\vec{x}(t)$ is the far-end reference signal vector and $\vec{x}(t)=[x(t), x(t-1), \ldots, x(t-L+1)]^T$; $x(t-t2)$ is the far-end reference signal at the signal sample time $(t-t2)$; T is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ is the $(t2+1)$-th coefficient of the FIR filter at the signal sample time t, $t2=0, 1, 2, \ldots, L-1$; t is a digital-signal time index number.

Further, when the processor executes the computer program, the processor further implements following steps:
obtaining a candidate value of a square of a magnitude of a correlation coefficient between the error signal outputted by the AEC and the far-end reference signal; obtaining a square of an effective magnitude of the correlation coefficient between the error signal outputted by the AEC and the far-end reference signal based on the candidate value of the square of the magnitude of the correlation coefficient between the error signal outputted by the AEC and the far-end reference signal, and taking the square of the effective magnitude of the correlation coefficient between the error signal outputted by the AEC and the far-end reference signal as the correction factor used for compensating for the biased estimation value of the coupling factor.

Further, when the processor executes the computer program, the processor further implements following steps:
according to an Equation:

$$\hat{r}(t) = \frac{\left|\sum_{t1=0}^{T_s-1} e(t-t1)x^*(t-t1)\right|^2}{\left(\sum_{t1=0}^{T_s-1} |e(t-t1)|^2\right)\left(\sum_{t1=0}^{T_s-1} |x(t-t1)|^2\right)},$$

obtaining the candidate value of the square of the magnitude of the correlation coefficient between the error signal outputted by the AEC and the far-end reference signal; where $\vec{r}(t)$ is the candidate value of the square of the magnitude of the correlation coefficient between the error signal outputted by the AEC and the far-end reference signal; $x(t-t1)$ is the far-end reference signal at the signal sample time $(t-t1)$; $x^*(t-t1)$ is the complex conjugate of $x(t-t1)$; $t1=0, 1, 2, \ldots, T_s-1$, $T_s$ is the number of samples used in the estimation of $\hat{r}(t)$, and $T_s \ll L$, L is the number of coefficients of the FIR filter; $e(t-t1)$ is the error signal outputted by the AEC at the signal sample time $(t-t1)$, $e(t)=y(t)-\vec{x}^H(t)\vec{w}(t)$, $e(t)$ is an error signal outputted by the AEC at the signal sample time t; y(t) is the signal received by the microphone at the signal sample time t; $\vec{x}^H(t)$ is the conjugate transpose matrix of $\vec{x}(t)$; $\vec{x}(t)$ is the far-end reference signal vector and $\vec{x}(t)=[x(t), x(t-1), \ldots, x(t-L+1)]^T$; $x(t-t2)$ is the far-end reference signal at the signal sample time $(t-t2)$; T is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ (t) is the $(t2+1)$-th coefficient of the FIR filter at the signal sample time t, $t2=0, 1, 2, \ldots, L-1$; t is a digital-signal sample time index number.

Further, when the processor executes the computer program, the processor further implements following steps:
according to an Equation:

$$|\hat{r}_{ex}(t)|^2 = \begin{cases} \hat{r}(t), & \text{if } \hat{r}(t) > |\hat{r}_{ex}(t-1)|^2 \\ |\hat{r}_{ex}(t-1)|^2, & \text{if } \hat{r}(t) \le |\hat{r}_{ex}(t-1)|^2 \end{cases}$$

obtaining the square of the effective magnitude of the correlation coefficient between the signal outputted by the AEC and the far-end reference signal;
where $|\hat{r}_{ex}(t)|^2$ is the square of the effective magnitude of the correlation coefficient between the error signal outputted by the AEC and the far-end reference signal; $\hat{r}(t)$ is the candidate value of the square of the magnitude of the correlation coefficient between the error signal outputted by the AEC and the far-end reference signal; t is a digital-signal sample time index number.

Further, when the processor executes the computer program, the processor further implements following steps:
obtaining the effective estimation value of the coupling factor according to the Equation:

$$\hat{\beta}(t) = \frac{\hat{\beta}(t)|_{Cross\text{-}correlation}}{|\hat{r}_{ex}(t)|^2},$$

where $\hat{\beta}(t)$ is the effective estimation value of the coupling factor; $\hat{\beta}(t)|_{Cross\text{-}correlation}$ is the biased estimation value of the coupling factor based on the cross-correlation technique; $|\hat{r}_{ex}(t)|^2$ is the square of the effective magnitude of the correlation coefficient between the error signal outputted by the AEC and the far-end reference signal; t is a digital-signal sample time index number.

Further, when the processor executes the computer program, the processor further implements following steps:
according to an Equation:

$$\delta^{opt}(t) = \max\left\{\frac{L \cdot \hat{\sigma}_y^2(t)}{\hat{\beta}(t) + \rho_0}, \delta_{min}\right\} = \max\left\{\frac{L \cdot \hat{\sigma}_y^2(t)|\hat{r}_{ex}(t)|^2}{\hat{\beta}(t)|_{Cross\text{-}correlation} + \rho}, \delta_{min}\right\},$$

obtaining the time-varying regularization factor used for iteratively updating the coefficient vector of the FIR filter; where $\delta^{opt}(t)$ is the time-varying regularization factor; L is the number of coefficients of the FIR filter; $\hat{\sigma}_y^2(t)$ is the power of the signal received by the microphone;

$$\hat{\beta}(t) = \frac{\hat{\beta}(t)|_{Cross\text{-}correlation}}{|\hat{r}_{ex}(t)|^2}$$

is the effective estimation value of coupling factor; $\hat{\beta}(t)|_{Cross\text{-}correlation}$ is the biased estimation value of the coupling factor based on the cross-correlation technique; $|\hat{r}_{ex}(t)|^2$ is the square of the effective magnitude of the correlation coefficient between the error signal outputted by the AEC and the far-end reference signal; $\delta_{min}$ is a preset small real constant quantity, and $\delta_{min}>0$; $\rho_0$ and $\rho$ are preset small real constants, and $\rho>0$, $\rho_0>0$, respectively; t is a digital-signal sample time index number.

Further, when the processor executes the computer program, the processor further implements following steps:

according to an Equation: $\vec{w}(t+1)=\vec{w}(t)+\mu \cdot \vec{x}(t)e^*(t)/[\vec{x}^H(t)\vec{x}(t)+\delta^{opt}(t)]$, sustainably adaptively updating the coefficient vector of the FIR filter by applying a Normalized Least Mean Square (NLMS) algorithm, wherein, $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; $\mu$ is a predetermined coefficient updating step-size parameter, and $0<\mu<2$; $\vec{x}(t)$ is the far-end reference signal vector and $\vec{x}(t)=[x(t), x(t-1), \ldots, x(t-L+1)]^T$; $x(t-t2)$ is the far-end reference signal at the signal sample time $(t-t2)$; T is a transpose operator; $\vec{x}^H(t)$ is the conjugate transpose matrix of $\vec{x}(t)$; $\delta^{opt}(t)$ is the time-varying regularization factor; $e^*(t)$ is the complex conjugate of $e(t)$; $e(t)=y(t)-\vec{x}^H(t)\vec{w}(t)$, $e(t)$ is the error signal outputted by the AEC at the signal sample time t; y(t) is the signal received by the microphone at the signal sample time t; $\vec{w}(t)=[w_0(t), w_1(t), \ldots, w_{L-1}(t)]^T$, $w_{t2}(t)$ is the (t2+1)-th coefficient of the FIR filter at the signal sample time t, t2=0, 1, 2, . . . , L−1; t is the digital-signal sample time index number.

Further, when the processor executes the computer program, the processor further implements following steps:

according to an Equation:
$\vec{w}(t+1)=$
$\vec{w}(t)+\mu \cdot X_{state}(t)[X_{state}^H(t)X_{state}(t)+\delta^{opt}(t) \cdot I_{P\times P}]^{-1} \cdot \vec{e}^*(t)$,
applying an affine projection (AP) algorithm to sustainably adaptively update the coefficient vector of the FIR filter;

where $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; $\mu$ is a predetermined coefficient updating step-size parameter, and $0<\mu<2$; $\delta^{opt}(t)$ is a time-varying regularization factor; $X_{state}(t)$ is L×P-dimension state matrix, and $X_{state}(t)=[\vec{x}(t), \vec{x}(t-1), \ldots, \vec{x}(t-P+1)]$; $\vec{x}(t-t3)$ is the far-end reference signal vector at the signal sample time (t−t3), and t3=0, 1, . . . , P−1, P is the order quantity of the AP algorithm; $X_{state}^H(t)$ is the conjugate transpose matrix of $X_{state}(t)$; $I_{P\times P}$ is a P×P-dimension unit matrix; $\vec{e}^*(t)$ is a complex conjugate of $\vec{e}(t)$, and $\vec{e}(t)=\vec{y}(t)-X_{state}^H(t)\vec{w}(t)$; $\vec{e}(t)$ is a P-dimension error vector; $\vec{y}(t)$ is a P-dimension vector of the signal received by the microphone, and $\vec{y}(t)=[y(t), y(t-1), \ldots, y(t-P+1)]^T$; y(t−t3) is the signal received by the microphone at the signal sample time (t−t3); $\vec{w}(t)=[w_0(t), w_1(t), \ldots, w_{L-1}(t)]^T$, $w_{t2}(t)$ is the (t2+1)-th coefficient of the FIR filter at the signal sample time t, t2=0, 1, 2, . . . , L−1; t is a digital-signal sample time index number.

Specifically, the preset signal includes a subband spectrum of the near-end speech signal received by the microphone and inputted in the AEC and a subband spectrum of a far-end reference speech signal. The coefficient vector of the FIR filter is a subband-domain coefficient vector of the FIR filter and the time-varying regularization factor is a subband-domain time-varying regularization factor. When the processor executes the computer program, the processor further implements following steps: obtaining a subband power spectrum of the signal received by the microphone and an effective estimation value of a subband-domain coupling factor, respectively; according to the subband power spectrum of the signal received by the microphone and the effective estimation value of the subband-domain coupling factor, obtaining a subband-domain time-varying regularization factor used for iteratively updating the subband-domain coefficient vector of the FIR filter when the subband-domain coefficient vector of the FIR filter is used for processing a preset signal.

Further, when the processor executes the computer program, the processor further implements following steps:

according to an Equation:

$$\hat{\sigma}_Y^2(k, n) = \begin{cases} \alpha_a \cdot \hat{\sigma}_Y^2(k, n-1) + (1-\alpha_a) \cdot |Y(k, n)|^2, & \text{if } |Y(k, n)|^2 > \hat{\sigma}_Y^2(k, n-1) \\ \alpha_d \cdot \hat{\sigma}_Y^2(k, n-1) + (1-\alpha_d) \cdot |Y(k, n)|^2, & \text{if } |Y(k, n)|^2 \leq \hat{\sigma}_Y^2(k, n-1) \end{cases}$$

obtaining the subband power spectrum of the signal received by the microphone;

where $\hat{\sigma}_Y^2(k, n)$ is the subband power spectrum of the signal received by the microphone; Y(k, n) is a subband spectrum of the signal received by the microphone; $\alpha_a$ and $\alpha_d$ are preset recursive constant quantities, and $0 \leq \alpha_a < \alpha_d < 1$; k is a subband index variable, k=0, 1, 2, . . . , K−1, and K is the total number of subbands; n is the signal frame time index variable.

Further, when the processor executes the computer program, the processor further implements following steps:

obtaining a biased estimation value of the subband-domain coupling factor according to a cross-correlation method; obtaining a correction factor used for compensating for the biased estimation value of the subband-domain coupling factor; obtaining an effective estimation value of the subband-domain coupling factor according to the biased estimation value of the subband-domain coupling factor and the correction factor.

Further, when the processor executes the computer program, the processor further implements following steps:
according to an Equation:

$$\hat{\beta}(k,n)\big|_{Cross\text{-}correlation} = \frac{\left|\sum_{n1=0}^{N_s-1} E(k,n-n1)X^*(k,n-n1)\right|^2}{\left|\sum_{n1=0}^{N_s-1} |X(k,n-n1)|^2\right|^2},$$

obtaining the biased estimation value of the subband-domain coupling factor;
where $\hat{\beta}(k,n)|_{Cross\text{-}correlation}$ is a biased estimation value of the subband-domain coupling factor; $X^*(k, n-n1)$ is a complex conjugate of $X(k, n-n1)$; $n1=0, 1, 2, \ldots, N_s-1$, $N_s$ is the number of signal frames used for estimation of $\hat{\beta}(k, n)|_{Cross\text{-}correlation}$, and $N_s \ll L_s$, $L_s$ is the number of coefficients of the FIR filter in each subband; $E(k, n-n)$ is a subband spectrum of an error signal outputted by the AEC at signal frame time $(n-n1)$; $E(k, n)=Y(k, n)-\vec{X}_k^H(n)\vec{W}_k(n)$, $E(k, n)$ is the subband spectrum of the error signal outputted by the AEC at signal frame time n; $Y(k, n)$ is the subband spectrum of the signal received by the microphone at the signal frame time n; $\vec{X}_k^H(n)$ is a conjugate transpose matrix of $\vec{X}_k(n)$; $\vec{X}_k(n)$ is a subband-spectrum vector of the far-end reference signal, and $\vec{X}_k(n)=[X(k, n), X(k, n-1), \ldots, X(k, n-L_s+1)]^T$; $X(k, n-n2)$ is a subband spectrum of a far-end reference signal at signal frame time $(n-n2)$; T is a transpose operator; $\vec{W}_k(n)$ is the coefficient vector of the FIR filter in a subband k, $\vec{W}_k(n)=[W_0(k, n), W_1(k, n), \ldots, W_{L_s-1}(k, n)]^T$; $W_{n2}(k, n)$ is the (n2+1)-th coefficient of the FIR filter in the subband k at the signal frame time n, $n2=0, 1, 2, \ldots, L_s-1$; k is a subband index variable, $k=0, 1, 2, \ldots, K-1$, and K is the total number of subbands; n is the signal frame time index variable.

Further, when the processor executes the computer program, the processor further implements following steps:
obtaining a candidate value of a square of a magnitude of a correlation coefficient between a subband spectrum of the error signal outputted by the AEC and a subband spectrum of a far-end reference signal; obtaining a square of an effective magnitude of a correlation coefficient between a subband spectrum of the error signal outputted by the AEC and a subband spectrum of the far-end reference signal according to the candidate value of the square of the magnitude of the correlation coefficient between the subband spectrum of the error signal outputted by the AEC and the subband spectrum of the far-end reference signal, and taking the square of the effective magnitude of the correlation coefficient between the subband spectrum of the error signal outputted by the AEC and the subband spectrum of the far-end reference signal as the correction factor used for compensating for the biased estimation value of the subband-domain coupling factor.

Further, when the processor executes the computer program, the processor further implements following steps:
according to an Equation:

$$\hat{r}(k,n) = \frac{\left|\sum_{n1=0}^{N_s-1} E(k,n-n1)X^*(k,n-n1)\right|^2}{\left(\sum_{n1=0}^{N_s-1} |E(k,n-n1)|^2\right)\left(\sum_{m=0}^{N_s-1} |X(k,n-n1)|^2\right)},$$

obtaining the candidate value of the square of the magnitude of the correlation coefficient between the subband spectrum of the error signal outputted by the AEC and the subband spectrum of the far-end reference signal;
where $\hat{r}(k, n)$ is the candidate value of the square of the magnitude of the correlation coefficient between the subband spectrum of the error signal outputted by the AEC and the subband spectrum of the far-end reference signal; $X^*(k, n-n1)$ is a complex conjugate of $X(k, n-n1)$; $n1=0, 1, 2, \ldots, N_s-1$, $N_s$ is the number of frames used for estimation of $\hat{r}(k, n)$, and $N_s \ll L_s$, $L_s$ is the number of coefficients of the FIR filter in each subband; $E(k, n-n1)$ is the subband spectrum of the error signal outputted by the AEC at signal frame time $(n-n1)$; $E(k, n)=Y(k, n)-\vec{X}_k^H(n)\vec{W}_k(n)$, $E(k, n)$ is the subband spectrum of the error signal outputted by the AEC at signal frame time n; $Y(k, n)$ is a subband spectrum of a signal received by the microphone; $\vec{X}_k^H(n)$ is a conjugate transpose matrix of $\vec{X}_k(n)$; $\vec{X}_k(n)$ is the subband spectrum vector of the far-end reference signal, and $\vec{X}_k(n)=[X(k, n), X(k, n-1), \ldots, X(k, n-L_s+1)]^T$; $X(k, n-n2)$ is the subband spectrum of the far-end reference signal at the signal frame time $(n-n2)$; T is a transpose operator; $\vec{W}_k(n)$ is the coefficient vector of the FIR filter in a subband k; $\vec{W}_k(n)=[W_0(k, n), W_1(k, n), \ldots, W_{L_s-1}(k, n)]^T$; $W_{n2}(k, n)$ is a (n2+1)-th coefficient of the FIR filter in the signal frame time n in the subband k; $n2=0, 1, 2, \ldots, L_s-1$; k is a subband index variable; $k=, 1, 2, \ldots, K-1$, and K is the total number of subbands; n is the signal frame time index variable.

Further, when the processor executes the computer program, the processor further implements following steps:
according to an Equation $$|\hat{r}_{EX}(k,n)|^2 = \begin{cases} \hat{r}(k,n), & \text{if } \hat{r}(k,n) > |\hat{r}_{EX}(k,n-1)|^2 \\ |\hat{r}_{EX}(k,n-1)|^2, & \text{if } \hat{r}(k,n) \leq |\hat{r}_{EX}(k,n-1)|^2 \end{cases},$$

obtaining the square of the effective magnitude of the correlation coefficient between the subband spectrum of the error signal outputted by the AEC and the subband spectrum of the far-end reference signal;
where $|\hat{r}_{EX}(k, n)|^2$ is the square of the effective magnitude of the correlation coefficient between the subband spectrum of the error signal outputted by the AEC and the subband spectrum of the far-end reference signal; $\hat{r}(k, n)$ is the candidate value of the square of the magnitude of the correlation coefficient between the subband spectrum of the error signal outputted by the AEC and the subband spectrum of the far-end reference signal; n is the signal frame time index variable.

Further, when the processor executes the computer program, the processor further implements following steps:
according to an Equation:

$$\hat{\beta}(k,n) = \frac{\hat{\beta}(k,n)\big|_{Cross\text{-}correlation}}{|\hat{r}_{EX}(k,n)|^2},$$

obtaining the effective estimation value of the subband-domain coupling factor;
where $\hat{\beta}(k, n)$ is the effective estimation value of the subband-domain coupling factor, $\hat{\beta}(k, n)|_{Cross\text{-}correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; n is the signal frame time index variable.

Further, when the processor executes the computer program, the processor further implements following steps:
according to the Equation:

$$\delta^{opt}(k, n) = \max\left\{\frac{L_s \cdot \hat{\sigma}_Y^2(k, n)}{\hat{\beta}(k, n) + \rho_0}, \delta_{min}\right\} = \max\left\{\frac{L_s \cdot \hat{\sigma}_Y^2(k, n)|\hat{r}_{EX}(k, n)|^2}{\hat{\beta}(k, n)|_{Cross-correlation} + \rho}, \delta_{min}\right\},$$

obtaining a subband-domain time-varying regularization factor used for iteratively updating the subband-domain coefficient vector of the FIR filter when the subband-domain coefficient vector of the FIR filter is used for processing a preset signal;

where $\delta^{opt}(k, n)$ is the subband-domain time-varying regularization factor; $\hat{\sigma}_Y^2(k, n)$ is the subband power spectrum of the signal received by the microphone;

$$\hat{\beta}(k, n) = \frac{\hat{\beta}(k, n)|_{Cross-correlation}}{|\hat{r}_{EX}(k, n)|^2}$$

is the effective estimation value of the subband-domain coupling factor, $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; $\delta_{min}$ is the preset small real constant quantity, and $\delta_{min} > 0$; $\rho_0$ and $\rho$ are preset small real constants, and $\rho > 0$, $\rho_0 > 0$; n is the signal frame time index variable.

Further, when the processor executes the computer program, the processor further implements following steps:
according to an Equation:

$\vec{W}_k(n+1) = \vec{W}_k(n) + \mu \cdot \vec{X}_k(n) E^*(k, n) / [\vec{X}_k^H(n) \vec{X}_k(n) + \delta^{opt}(k, n)]$, sustainably adaptively updating the subband-domain coefficient vector of the FIR filter using a Normalized Least Mean Square (NLMS) algorithm;

where $\vec{W}_k(n+1)$ is the coefficient vector of the FIR filter in the subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0<\mu<2$; $\vec{X}_k(n)$ is the subband spectrum vector of the far-end reference signal; $\vec{X}_k(n) = [X(k, n), X(k, n-1), \ldots, X(k, n-L_s+1)]^T$; $X(k, n-n2)$ is the subband spectrum of the far-end reference signal at the signal frame time (n-n2); $n2 = 0, 1, \ldots, L_s-1$, $L_s$ is the number of coefficients of the FIR filter in each subband, T is the transpose operator; $\vec{X}_k^H(n)$ is a conjugate transpose matrix of $\vec{X}_k(n)$; $E^*(k, n)$ is the complex conjugate of $E(k, n)$; $E(k, n)$ is the subband spectrum of the error signal outputted by AEC at the signal frame time "n", and $E(k, n) = Y(k, n) - \vec{X}_k^H(n)\vec{W}_k(n)$; $Y(k, n)$ is the subband spectrum of the signal received by the microphone at the signal frame time "n";

$\vec{W}_k(n) = [W_0(k, n), W_1(k, n), \ldots, W_{L_s-1}(k, n)]^T$; $W_{n2}(k, n)$ is the (n2+1)-th coefficient of the FIR filter in the subband k at the signal frame time "n"; $\delta^{opt}(k, n)$ is the subband-domain time-varying regularization factor; k is a subband index variable, $k = 1, 2, \ldots, K-1$, and K is the total number of subbands; n is the signal frame time index variable.

Further, when the processor executes the computer program, the processor further implements following steps:
according to an Equation:

$\vec{W}_k(n+1) = \vec{W}_k(n)) + \mu \cdot X_{state}(k, n) \cdot [X_{state}^H(k, n) X_{state}(k, n) + \delta^{opt}(k, n) \cdot I_{P \times P}]^{-1} \cdot \vec{E}_k^*(n)$, sustainably adaptively updating the subband-domain coefficient vector of the FIR filter using an affine projection (AP) algorithm;

where $\vec{W}_k(n+1)$ is the coefficient vector of the FIR filter in the subband k after the coefficient vector of the FIR filter is updated; $\vec{W}_k(n)$ is the coefficient vector of the FIR filter in the subband k before the coefficient vector of the FIR filter is updated; $\mu$ is a predetermined coefficient updating step-size parameter, and $0<\mu<2$; $\delta^{opt}(k, n)$ is the subband-domain time-varying regularization factor; $X_{state}(k, n)$ is an $L \times P$-dimension state matrix in the subband k, and $X_{state}(k, n) = [\vec{X}_k(n), \vec{X}_k(n-1), \ldots, \vec{X}_k(n-P+1)]$ is the subband spectrum vector of the far-end reference signal at the signal frame time (n-n3), and $n3 = 0, 1, \ldots, P-1$, P is the order quantity of the AP algorithm; $X_{state}^H(k, n)$ is the conjugate transpose matrix of $X_{state}(k, n)$; $I_{P \times P}$ is a $P \times P$-dimension unit matrix; $\vec{E}_k^*(n)$ is the complex conjugate of $\vec{E}_k(n)$, and $\vec{E}_k(n) = \vec{Y}_k(n) - X_{state}^H(k, n)\vec{W}_k(n)$; $\vec{E}_k(n)$ is the subband spectrum vector of a P-dimensional error signal; $\vec{Y}_k(n)$ is the P-dimension subband spectrum vector of the signal received by the microphone, and $\vec{Y}_k(n) = [Y(k, n), Y(k, n-1), \ldots, Y(k, n-P+1)]^T$; $Y(k, n-n3)$ is the signal received by the microphone at the signal frame time (n-n3); $\vec{W}_k(n) = [W_0(k, n), W_1(k, n), \ldots, W_{L_s-1}(k, n)]^T$; $W_{n2}(k, n)$ is the (n2+1)-th coefficient of the FIR filter in the subband k at the signal frame time "n", $n2 = 0, 1, \ldots, L_s-1$, $L_s$ is the number of coefficients of the FIR filter in each subband; k is a subband index variable, $k = 0, 1, 2, \ldots, K-1$, and K is the total number of subbands; n is the signal frame time index variable.

The computer-readable storage medium mentioned in the present disclosure may be a volatile medium or a non-volatile medium, a transient medium or a non-transient medium.

What has been described above are optional embodiments of the present disclosure. It should be noted that improvements and refinements may be made by those of ordinary skills in the art without departing from the principle described herein. Such improvements and refinements are also within the scope of the present disclosure.

What is claimed is:

1. A sustainable adaptive updating method of a coefficient vector of a Finite Impulse Response (FIR) filter, comprising:
    obtaining a time-varying regularization factor used for iteratively updating the coefficient vector of the FIR filter in a case that the coefficient vector of the FIR filter is used for processing a preset signal;
    updating the coefficient vector of the FIR filter according to the time-varying regularization factor;
    wherein the preset signal comprises following combined pair: a far-end reference speech signal inputted in an Acoustic Echo Canceller (AEC) and a near-end speech signal received by a microphone, obtaining the time-varying regularization factor used for iteratively updating the coefficient vector of the FIR filter in a case that the coefficient vector of the FIR filter is used for processing the preset signal, comprises:

obtaining a power of a near-end signal received by the microphone and an effective estimation value of a coupling factor;

according to the power of the near-end signal received by the microphone and the effective estimation value of the coupling factor, obtaining the time-varying regularization factor used for iteratively updating the coefficient vector of the FIR filter in a case that the coefficient vector of the FIR filter is used for processing the preset signal;

according to the power of the near-end signal received by the microphone and the effective estimation value of the coupling factor, obtaining the time-varying regularization factor used for iteratively updating the coefficient vector of the FIR filter in a case that the coefficient vector of the FIR filter is used for processing the preset signal, comprises:

according to an Equation:

$$\delta^{opt}(t) = \max\left\{\frac{L \cdot \hat{\sigma}_y^2(t)}{\hat{\beta}(t) + \rho_0}, \delta_{min}\right\} = \max\left\{\frac{L \cdot \hat{\sigma}_y^2(t)|\hat{r}_{ex}(t)|^2}{\hat{\beta}(t)|_{Cross-correlation} + \rho}, \delta_{min}\right\},$$

obtaining the time-varying regularization factor used for iteratively updating the coefficient vector of the FIR filter;

wherein $\delta^{opt}(t)$ is the time-varying regularization factor; L is a quantity of coefficients of the FIR filter; $\hat{\sigma}_y^2(t)$ is the power of the signal received by the microphone;

$$\hat{\beta}(t) = \frac{\hat{\beta}(t)|_{Cross\ correlation}}{|\hat{r}_{ex}(t)|^2}$$

is the effective estimation value of coupling factor; $\hat{\beta}(t)|_{Cross-correlation}$ is a biased estimation value of the coupling factor based on a cross-correlation technique; $|\hat{r}_{ex}(t)|^2$ is a square of an effective magnitude of a correlation coefficient between an error signal outputted by the AEC and the far-end reference signal; $\delta_{min}$ is a preset small real constant quantity, and $\delta_{min}>0$; $\rho_0$ and $\rho$ are preset small real constants, and $\rho>0$, $\rho_0>0$, respectively; t is a digital-signal sample time index number;

or, wherein the preset signal comprises a subband spectrum of a near-end speech signal received by a microphone and a subband spectrum of a far-end reference speech signal inputted in an AEC; the coefficient vector of the FIR filter is a subband-domain coefficient vector of the FIR filter and the time-varying regularization factor is a subband-domain time-varying regularization factor;

obtaining the time-varying regularization factor used for iteratively updating the coefficient vector of the FIR filter in a case that the coefficient vector of the FIR filter is used for processing the preset signal, comprises:

obtaining a subband power spectrum of the near-end signal received by the microphone and an effective estimation value of a subband-domain coupling factor, respectively;

according to the subband power spectrum of the near-end signal received by the microphone and the effective estimation value of the subband-domain coupling factor, obtaining a subband-domain time-varying regularization factor used for iteratively updating the subband-domain coefficient vector of the FIR filter in a case that the subband-domain coefficient vector of the FIR filter is used for processing a preset signal;

wherein according to the subband power spectrum of the near-end signal received by the microphone and the effective estimation value of the subband-domain coupling factor, obtaining the subband-domain time-varying regularization factor used for iteratively updating the subband-domain coefficient vector of the FIR filter in a case that the subband-domain coefficient vector of the FIR filter is used for processing the preset signal, comprises:

according to an Equation:

$$\delta^{opt}(k, n) = \max\left\{\frac{L_s \cdot \hat{\sigma}_Y^2(k, n)}{\hat{\beta}(k, n) + \rho_0}, \delta_{min}\right\} = \max\left\{\frac{L_s \cdot \hat{\sigma}_Y^2(k, n)|\hat{r}_{EX}(k, n)|^2}{\hat{\beta}(k, n)|_{Cross-correlation} + \rho}, \delta_{min}\right\},$$

obtaining the subband-domain time-varying regularization factor used for iteratively updating the subband-domain coefficient vector of the FIR filter in a case that the subband-domain coefficient vector of the FIR filter is used for processing the preset signal;

wherein $\delta^{opt}(k, n)$ is the subband-domain time-varying regularization factor; $\hat{\sigma}_y^2(k, n)$ is a subband power spectrum of a near-end signal received by the microphone;

$$\hat{\beta}(k, n) = \frac{\hat{\beta}(k, n)|_{Cross-correlation}}{|\hat{r}_{EX}(k, n)|^2}$$

is the effective estimation value of the subband-domain coupling factor; $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference speech signal; $\delta_{min}$ is a preset small real constant quantity, and $\delta_{min}>0$; $\rho_0$ and $\rho$ are preset small real constants, and $\rho>0$, $\rho_0>0$, n is a signal frame time index variable.

2. The sustainable adaptive updating method according to claim 1, wherein a manner of obtaining the power of the near-end signal received by the microphone is:

according to an Equation:

$$\hat{\sigma}_y^2(t) = \begin{cases} \alpha_a \cdot \hat{\sigma}_y^2(t-1) + (1-\alpha_a) \cdot |y(t)|^2, & \text{if } |y(t)|^2 > \hat{\sigma}_y^2(t-1) \\ \alpha_d \cdot \hat{\sigma}_y^2(t-1) + (1-\alpha_d) \cdot |y(t)|^2, & \text{if } |y(t)|^2 \leq \hat{\sigma}_y^2(t-1) \end{cases}$$

obtaining the power of the near-end signal received by the microphone;

wherein $\hat{\sigma}_y^2(t)$ is the power of the near-end signal received by the microphone; y(t) is the near-end signal received by the microphone; $\alpha_a$ and $\alpha_d$ are preset recursive constant quantities, and $0 \leq \alpha_a < \alpha_d < 1$; t is a digital-signal time index number.

3. The sustainable adaptive updating method according to claim 1, wherein a manner of obtaining the effective estimation value of the coupling factor is:
  obtaining a biased estimation value of the coupling factor according to a cross-correlation method;
  obtaining a correction factor used for compensating for the biased estimation value of the coupling factor;
  obtaining the effective estimation value of the coupling factor according to the biased estimation value of the coupling factor and the correction factor.

4. The sustainable adaptive updating method according to claim 3, wherein,
  obtaining the biased estimation value of the coupling factor according to the cross-correlation method, comprises:
    according to an Equation:

$$\hat{\beta}(t)\big|_{Cross\text{-}correlation} = \frac{\left|\sum_{t1=0}^{T_s-1} e(t-t1)x^*(t-t1)\right|^2}{\left|\sum_{t1=0}^{T_s-1} |x(t-t1)|^2\right|^2},$$

obtaining
  the biased estimation value of the coupling factor,
  wherein $\hat{\beta}(t)|_{Cross\text{-}correlation}$ is the biased estimation value of the coupling factor based on a cross-correlation technique; $x^*(t-t1)$ is a complex conjugate of $x(t-t1)$; $t1=0, 1, 2, \ldots, T_s-1$, $T_s$ is a quantity of samples used in estimation of the $\hat{\beta}(t)|_{Cross\text{-}correlation}$, and $T_s \ll L$, L is a quantity of coefficients of the FIR filter; $e(t-t1)$ is an error signal outputted by the AEC at a signal sample time $(t-t1)$, $e(t)=y(t)-\vec{x}^H(t)\vec{w}(t)$, $e(t)$ is an error signal outputted by the AEC at a signal sample time t; y(t) is a near-end signal received by the microphone at a signal sample time t; $\vec{x}^H(t)$ is a conjugate transpose matrix of $\vec{x}(t)$; $\vec{x}(t)$ is a far-end reference speech signal vector and $\vec{x}(t)=[x(t), x(t-1), \ldots, x(t-L+1)]^T$; $x(t-t2)$ is a far-end reference speech signal at a signal sample time $(t-t2)$; T is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ is a $(t2+1)$-th coefficient of the FIR filter at the signal sample time t, $t2=0, 1, 2, \ldots, L-1$; t is a digital-signal time index number;
and/or,
  obtaining the effective estimation value of the coupling factor according to the biased estimation value of the coupling factor and the correction factor, comprises:
    obtaining the effective estimation value of the coupling factor according to the Equation:

$$\hat{\beta}(t) = \frac{\hat{\beta}(t)\big|_{Cross\text{-}correlation}}{|\hat{r}_{ex}(t)|^2},$$

wherein $\hat{\beta}(t)$ is the effective estimation value of the coupling factor; $\hat{\beta}(t)|_{Cross\text{-}correlation}$ is the biased estimation value of the coupling factor based on a cross-correlation technique; $|\hat{r}_{ex}(t)|^2$ is the square of the effective magnitude of the correlation coefficient between the error signal outputted by the AEC and the far-end reference speech signal as the correction factor; t is a digital-signal sample time index number.

5. The sustainable adaptive updating method according to claim 3, wherein obtaining the correction factor used for compensating for the biased estimation value of the coupling factor, comprises:
  obtaining a candidate value of a square of a magnitude of a correlation coefficient between an error signal outputted by the AEC and a far-end reference speech signal;
  obtaining, according to the candidate value of the square of the magnitude of the correlation coefficient between the error signal outputted by the AEC and the far-end reference speech signal, a square of an effective magnitude of the correlation coefficient between the error signal outputted by the AEC and the far-end reference speech signal, and taking the square of the effective magnitude of the correlation coefficient between the error signal outputted by the AEC and the far-end reference speech signal as the correction factor used for compensating for the biased estimation value of the coupling factor.

6. The sustainable adaptive updating method according to claim 5, wherein,
  obtaining the candidate value of the square of the magnitude of the correlation coefficient between the error signal outputted by the AEC and the far-end reference speech signal, comprises:
    according to an Equation:

$$\hat{r}(t) = \frac{\left|\sum_{t1=0}^{T_s-1} e(t-t1)x^*(t-t1)\right|^2}{\left(\sum_{t1=0}^{T_s-1} |e(t-t1)|^2\right)\left(\sum_{t1=0}^{T_s-1} |x(t-t1)|^2\right)},$$

obtaining the candidate value of the square of the magnitude of the correlation coefficient between the error signal outputted by the AEC and the far-end reference speech signal;
    wherein $\hat{r}(t)$ is the candidate value of the square of the magnitude of the correlation coefficient between the error signal outputted by the AEC and the far-end reference speech signal; $x(t-t1)$ is the far-end reference speech signal at a signal sample time $(t-t1)$; $x^*(t-t1)$ is a complex conjugate of $x(t-t1)$; $t1=0, 1, 2, \ldots, T_s-1$, $T_s$ is a quantity of samples used in estimation of $\hat{r}(t)$, and $T_s \ll L$, L is a quantity of coefficients of the FIR filter; $e(t-t1)$ is the error signal outputted by the AEC at a signal sample time $(t-t1)$, $e(t)=y(t)-\vec{x}^H(t)\vec{w}(t)$, $e(t)$ is an error signal outputted by the AEC at a signal sample time t; y(t) is the near-end signal received by the microphone at the signal sample time t; $\vec{x}^H(t)$ is a conjugate transpose vector of $\vec{x}(t)$; $\vec{x}(t)$ is a far-end reference signal vector and $\vec{x}(t)=[x(t), x(t-1), \ldots, x(t-L+1)]^T$; $x(t-t2)$ is the far-end reference speech signal at a signal sample time $(t-t2)$; T is a transpose operator; $\vec{w}(t)$ is the coefficient vector of the FIR filter, $\vec{w}(t)=[w_0(t), w_1(t), \ldots, w_{L-1}(t)]^T$, $w_{t2}(t)$ (t) is a $(t2+1)$-th coefficient of the FIR filter at the signal sample time t, $t2=0, 1, 2, \ldots, L-1$; t is a digital-signal sample time index number;

and/or, obtaining, according to the candidate value of the square of the magnitude of the correlation coefficient between the error signal outputted by the AEC and the far-end reference speech signal, the square of the effective magnitude of the correlation coefficient between the error signal outputted by the AEC and the far-end reference speech signal, comprises:

according to an Equation:

$$|\hat{r}_{ex}(t)|^2 = \begin{cases} \hat{r}(t), & \text{if } \hat{r}(t) > |\hat{r}_{ex}(t-1)|^2 \\ |\hat{r}_{ex}(t-1)|^2, & \text{if } \hat{r}(t) \le |\hat{r}_{ex}(t-1)|^2 \end{cases}$$

obtaining the square of the effective magnitude of the correlation coefficient between the signal outputted by the AEC and the far-end reference speech signal;

wherein $|\hat{r}_{ex}(t)|^2$ is the square of the effective magnitude of the correlation coefficient between the error signal outputted by the AEC and the far-end reference signal; $\hat{r}(t)$ is the candidate value of the square of the magnitude of the correlation coefficient between the error signal outputted by the AEC and the far-end reference speech signal; t is a digital-signal sample time index number.

7. The sustainable adaptive updating method according to claim 1, wherein, updating the coefficient vector of the FIR filter according to the time-varying regularization factor, comprises:

according to an Equation: $\vec{w}(t+1)=\vec{w}(t)+\mu\cdot\vec{x}(t)e^*(t)/[\vec{x}^H(t)\vec{x}(t)+\delta^{opt}(t)]$, sustainably adaptively updating the coefficient vector of the FIR filter by applying a Normalized Least Mean Square (NLMS) algorithm, wherein, $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; μ is a predetermined coefficient updating step-size parameter, and 0<μ<2; $\vec{x}(t)$ is a far-end reference speech signal vector and $\vec{x}(t)=[x(t), x(t-1), \ldots, x(t-L+1)]^T$; x(t-t2) is the far-end reference speech signal at a signal sample time (t-t2); T is a transpose operator; $\vec{x}^H(t)$ is a conjugate transpose vector of $\vec{x}(t)$; $\delta^{opt}(t)$ is the time-varying regularization factor; e*(t) is a complex conjugate of e(t); $e(t)=y(t)-\vec{x}^H(t)\vec{w}(t)$, e(t) is the error signal outputted by the AEC at a signal sample time t; y(t) is the near-end signal received by the microphone at the signal sample time t; $\vec{w}(t)=[w_0(t), w_1(t), \ldots, w_{L-1}(t)]^T$, $w_{t2}(t)$ is a (t2+1)-th coefficient of the FIR filter at the signal sample time t, t2=0, 1, 2, . . . , L−1; t is a digital-signal sample time index number;

or, updating the coefficient vector of the FIR filter according to the time-varying regularization factor, comprises:
according to an Equation:
$\vec{w}(t+1)=$
$\vec{w}(t)+\mu\cdot X_{state}(t)[X_{state}^H(t)X_{state}(t)+\delta^{opt}(t)\cdot I_{P\times P}]^{-1}\cdot\vec{e}^*(t)$
applying an affine projection (AP) algorithm to sustainably adaptively update the coefficient vector of the FIR filter;

wherein $\vec{w}(t+1)$ is the coefficient vector of the FIR filter after the coefficient vector of the FIR filter is updated; $\vec{w}(t)$ is the coefficient vector of the FIR filter before the coefficient vector of the FIR filter is updated; μ is a predetermined coefficient updating step-size parameter, and 0<μ<2; $\delta^{opt}(t)$ is the time-varying regularization factor; $X_{state}(t)$ is L×P-dimension state matrix, and $X_{state}(t)=[\vec{x}(t), \vec{x}(t-1), \ldots, \vec{x}(t-P+1)]$; $\vec{x}(t-t3)$ is a far-end reference signal vector at a signal sample time (t-t3), and t3=0, 1, . . . , P−1, P is an order quantity of the AP algorithm; $X_{state}^H(t)$ is a conjugate transpose matrix of $X_{state}(t)$; $I_{P\times P}$ is a P×P-dimension unit matrix; $\vec{e}^*(t)$ is a complex conjugate of $\vec{e}(t)$, and $\vec{e}(t)=\vec{y}(t)-X_{state}^H(t)\vec{w}(t)$; $\vec{e}(t)$ is a P-dimension error vector; $\vec{y}(t)$ is a P-dimension vector of the near-end signal received by the microphone, and $\vec{y}(t)=[y(t), y(t-1), \ldots, y(t-P+1)]^T$; y(t-t3) is the near-end signal received by the microphone at a signal sample time (t-t3); $\vec{w}(t)=[w_0(t), w_1(t), \ldots, w_{L-1}(t)]^T$, $w_{t2}(t)$ is a (t2+1)-th coefficient of the FIR filter at a signal sample time t, t2=0, 1, 2, . . . , L−1; t is a digital-signal sample time index number.

8. The sustainable adaptive updating method according to claim 1, wherein a manner of obtaining the subband power spectrum of the near-end signal received by the microphone is:

according to an Equation:

$$\hat{\sigma}_Y^2(k, n) = \begin{cases} \alpha_a\cdot\hat{\sigma}_Y^2(k, n-1) + (1-\alpha_a)\cdot|Y(k, n)|^2, & \text{if } |Y(k, n)|^2 > \hat{\sigma}_Y^2(k, n-1) \\ \alpha_d\cdot\hat{\sigma}_Y^2(k, n-1) + (1-\alpha_d)\cdot|Y(k, n)|^2, & \text{if } |Y(k, n)|^2 \le \hat{\sigma}_Y^2(k, n-1) \end{cases},$$

obtaining the subband power spectrum of the near-end signal received by the microphone;

wherein $\hat{\sigma}_Y^2(k, n)$ is the subband power spectrum of the near-end signal received by the microphone; Y(k, n) is a subband spectrum of the near-end signal received by the microphone; $\alpha_a$ and $\alpha_d$ are preset recursive constant quantities, and $0\le\alpha_a<\alpha_d<1$; k is a subband index variable, k=0, 1, 2, . . . , K−1, and K is a total quantity of subbands; n is a signal frame time index variable.

9. The sustainable adaptive updating method according to claim 1, wherein a manner of obtaining the effective estimation value of the subband-domain coupling factor, comprises:

obtaining a biased estimation value of the subband-domain coupling factor according to a cross-correlation method;

obtaining a correction factor used for compensating for the biased estimation value of the subband-domain coupling factor;

obtaining the effective estimation value of the subband-domain coupling factor according to the biased estimation value of the subband-domain coupling factor and the correction factor.

10. The sustainable adaptive updating method according to claim 9, wherein, obtaining the biased estimation value of the subband-domain coupling factor according to the cross-correlation method, comprises:

according to an Equation:

$$\hat{\beta}(k, n)\Big|_{Cross-correlation} = \frac{\left|\sum_{n1=0}^{N_s-1} E(k, n-n1)X^*(k, n-n1)\right|^2}{\left|\sum_{n1=0}^{N_s-1} |X(k, n-n1)|^2\right|^2},$$

obtaining the biased estimation value of the subband-domain coupling factor;
wherein $\hat{\beta}(k, n)|_{Cross-correlation}$ is the biased estimation value of the subband-domain coupling factor; $X^*(k, n-n1)$ is a complex conjugate of $X(k, n-n1)$; $n1=0, 1, 2, \ldots, N_s-1$, $N_s$ is a quantity of signal frames used in estimation of $\hat{\beta}(k, n)|_{Cross-correlation}$, and $N_s \ll L_s$, $L_s$ is a quantity of coefficients of the FIR filter in each subband; $E(k, n-n1)$ is a subband spectrum of an error signal outputted by the AEC at a signal frame time $(n-n1)$; $E(k, n)=Y(k, n)-\vec{X}_k^H(n)\vec{W}_k(n)$, $E(k, n)$ is the subband spectrum of the error signal outputted by the AEC at a signal frame time n; $Y(k, n)$ is the subband spectrum of the near-end signal received by the microphone at the signal frame time n; $\vec{X}_k^H(n)$ is a conjugate transpose vector of $\vec{X}_k(n)$; $\vec{X}_k(n)$ is a subband-spectrum vector of the far-end reference signal, and $\vec{X}_k(n)=[X(k, n), X(k, n-1), \ldots, X(k, n-L_s+1)]^T$; $X(k, n-n2)$ is a subband spectrum of a far-end reference speech signal at a signal frame time $(n-n2)$; T is a transpose operator; $\vec{W}_k(n)$ is the coefficient vector of the FIR filter in a subband k, $\vec{W}_k(n)=[W_0(k, n), W_1(k, n), \ldots, W_{L_s-1}(k, n)]^T$; $W_{n2}(k, n)$ is a $(n2+1)$-th coefficient of the FIR filter in the subband k at the signal frame time n, $n2=0, 1, 2, \ldots, L_s-1$; k is a subband index variable, $k=0, 1, 2, \ldots, K-1$, and K is a total quantity of subbands; n is a signal frame time index variable;
and/or,
obtaining the effective estimation value of the subband-domain coupling factor according to the biased estimation value of the subband-domain coupling factor and the correction factor, comprises:
according to an Equation:

$$\hat{\beta}(k, n) = \frac{\hat{\beta}(k, n)|_{Cross-correlation}}{|\hat{r}_{EX}(k, n)|^2},$$

obtaining the effective estimation value of the subband-domain coupling factor;
wherein $\hat{\beta}(k, n)$ is the effective estimation value of the subband-domain coupling factor, $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference speech signal as the correction factor; n is a signal frame time index variable.

11. The sustainable adaptive update method according to claim 9, wherein obtaining the correction factor used for compensating for the biased estimation value of the subband-domain coupling factor, comprises:

obtaining a candidate value of a square of a magnitude of a correlation coefficient between a subband spectrum of an error signal outputted by an AEC and a subband spectrum of a far-end reference speech signal;
obtaining, according to the candidate value of the square of the magnitude of the correlation coefficient between the subband spectrum of the error signal outputted by the AEC and the subband spectrum of the far-end reference speech signal, a square of an effective magnitude of the correlation coefficient between the subband spectrum of the error signal outputted by the AEC and the subband spectrum of the far-end reference speech signal, and taking the square of the effective magnitude of the correlation coefficient between the subband spectrum of the error signal outputted by the AEC and the subband spectrum of the far-end reference speech signal as the correction factor used for compensating for the biased estimation value of the subband-domain coupling factor.

12. The sustainable adaptive updating method according to claim 11, wherein obtaining the candidate value of the square of the magnitude of the correlation coefficient between the subband spectrum of the error signal outputted by the AEC and the subband spectrum of the far-end reference speech signal, comprises:
according to an Equation:

$$\hat{r}(k, n) = \frac{\left|\sum_{n1=0}^{N_s-1} E(k, n-n1)X^*(k, n-n1)\right|^2}{\left(\sum_{n1=0}^{N_s-1} |E(k, n-n1)|^2\right)\left(\sum_{m=0}^{N_s-1} |X(k, n-n1)|^2\right)},$$

obtaining the candidate value of the square of the magnitude of the correlation coefficient between the subband spectrum of the error signal outputted by the AEC and the subband spectrum of the far-end reference speech signal;
wherein $\hat{r}(k, n)$ is the candidate value of the square of the magnitude of the correlation coefficient between the subband spectrum of the error signal outputted by the AEC and the subband spectrum of the far-end reference signal; $X^*(k, n-n1)$ is a complex conjugate of $X(k, n-n1)$; $n1=0, 1, 2, \ldots, N_s-1$, $N_s$ is a quantity of frames used in estimation of $\hat{r}(k, n)$, and $N_s \ll L_s$, $L_s$ is a quantity of coefficients of the FIR filter in each subband; $E(k, n-n1)$ is the subband spectrum of the error signal outputted by the AEC at a signal frame time $(n-n1)$; $E(k, n)=Y(k, n)-\vec{X}_k^H(n)\vec{W}_k(n)$, $E(k, n)$ is the subband spectrum of the error signal outputted by the AEC at a signal frame time n; $Y(k, n)$ is a subband spectrum of a near-end signal received by the microphone; $\vec{X}_k^H(n)$ is a conjugate transpose vector of $\vec{X}_k(n)$; $\vec{X}_k(n)$ is a subband spectrum vector of the far-end reference signal, and $\vec{X}_k(n)=[X(k, n), X(k, n-1), \ldots, X(k, n-L_s+1)]^T$; $X(k, n-n2)$ is the subband spectrum of the far-end reference speech signal at the signal frame time $(n-n2)$; T is a transpose operator; $\vec{W}_k(n)$ is the coefficient vector of the FIR filter in a subband k; $\vec{W}_k(n)=[W_0(k, n), W_1(k, n), \ldots, W_{L_s-1}(k, n)]^T$; $W_{n2}(k, n)$ is a $(n2+1)$-th coefficient of the FIR filter in the signal frame time n in the subband k; $n2=0, 1, 2, \ldots, L_s-1$;

k is a subband index variable; k=0, 1, 2, ..., K−1, and K is a total quantity of subbands; n is a signal frame time index variable.

13. The sustainable adaptive updating method according to claim 11, wherein obtaining, according to the candidate value of the square of the magnitude of the correlation coefficient between the subband spectrum of the error signal outputted by the AEC and the subband spectrum of the far-end reference speech signal, the square of the effective magnitude of the correlation coefficient between the subband spectrum of the error signal outputted by the AEC and the subband spectrum of the far-end reference speech signal, comprises:

according to an Equation:

$$|\hat{r}_{EX}(k, n)|^2 = \begin{cases} \hat{r}(k, n), & \text{if } \hat{r}(k, n) > |\hat{r}_{EX}(k, n-1)|^2 \\ |\hat{r}_{EX}(k, n-1)|^2, & \text{if } \hat{r}(k, n) \leq |\hat{r}_{EX}(k, n-1)|^2 \end{cases},$$

obtaining the square of the effective magnitude of the correlation coefficient between the subband spectrum of the error signal outputted by the AEC and the subband spectrum of the far-end reference speech signal;

wherein $|\hat{r}_{EX}(k, n)|^2$ is the square of the effective magnitude of the correlation coefficient between the subband spectrum of the error signal outputted by the AEC and the subband spectrum of the far-end reference signal; $\hat{r}(k, n)$ is the candidate value of the square of the magnitude of the correlation coefficient between the subband spectrum of the error signal outputted by the AEC and the subband spectrum of the far-end reference speech signal; n is a signal frame time index variable.

14. The sustainable adaptive updating method according to claim 1, wherein, updating the coefficient vector of the FIR filter according to the time-varying regularization factor, comprises: according to an Equation:

$\vec{W}_k(n+1) = \vec{W}_k(n) + \mu \cdot \vec{X}_k(n) E^*(k, n)/[\vec{X}_k^H(n)\vec{X}_k(n) + \delta^{opt}(k, n)]$, sustainably adaptively updating the subband-domain coefficient vector of the FIR filter using a Normalized Least Mean Square (NLMS) algorithm;

wherein $\vec{W}_k(n+1)$ is a coefficient vector of the FIR filter in a subband k after the coefficient vector of the FIR filter is updated; $\vec{W}_k(n)$ is the coefficient vector of the FIR filter in the subband k before the coefficient vector of the FIR filter is updated; μ is a predetermined coefficient updating step-size parameter, and 0<μ<2; $\vec{X}_k(n)$ is a subband spectrum vector of the far-end reference signal; $\vec{X}_k(n) = [X(k, n), X(k, n-1), ..., X(k, n-L_s+1)]^T$; X(k, n−n2) is a subband spectrum of the far-end reference signal at a signal frame time (n−n2); n2=0, 1, ..., $L_s$−1, $L_s$ is a quantity of coefficients of the FIR filter in each subband, T is a transpose operator; $\vec{X}_k^H(n)$ is a conjugate transpose vector of $\vec{X}_k(n)$; E*(k, n) is a complex conjugate of E(k, n); E(k, n) is the subband spectrum of the error signal outputted by AEC at a signal frame time n, and E(k, n)=Y(k, n)−$\vec{X}_k^H(n)\vec{W}_k(n)$; Y(k, n) is the subband spectrum of the near-end signal received by the microphone at the signal frame time n; $\vec{W}_k(n) = [W_0(k, n), W_1(k, n), ..., W_{L_s-1}(k, n)]^T$; $W_{n2}(k, n)$ is a (n2+1)-th coefficient of the FIR filter in the subband k at the signal frame time n; $\delta^{opt}(k, n)$ is the subband-domain time-varying regularization factor; k is a subband index variable, k=0, 1, 2, ..., K−1, and K is a total quantity of subbands; n is a signal frame time index variable;

or, updating the coefficient vector of the FIR filter according to the time-varying regularization factor, comprises: according to an Equation:

$\vec{W}_k(n+1) = \vec{W}_k(n) + \mu \cdot X_{state}(k, n) \cdot [X_{state}^H(k, n) X_{state}(k, n) + \delta^{opt}(k, n) \cdot I_{P \times P}]^{-1} \cdot \vec{E}_k^*(n)$, substainably adaptively updating the subband-domain coefficient vector of the FIR filter using an affine projection (AP) algorithm;

wherein $\vec{W}_k(n+1)$ is the coefficient vector of the FIR filter in a subband k after the coefficient vector of the FIR filter is updated; $\vec{W}_k(n)$ is the coefficient vector of the FIR filter in the subband k before the coefficient vector of the FIR filter is updated; μ is a predetermined coefficient updating step-size parameter, and 0<μ<2; $\delta^{opt}(k, n)$ is the subband-domain time-varying regularization factor; $X_{state}(k, n)$ is an L×P-dimension state matrix in the subband k, and $X_{state}(k, n) = [\vec{X}_k(n), \vec{X}_k(n-1), ..., \vec{X}_k(n-P+1)]$; $\vec{X}_k(n-n3)$ is a subband spectrum vector of the far-end reference signal at a signal frame time (n−n3), and n3=0, 1, ..., P−1, P is an order quantity of the AP algorithm; $X_{state}^H(k, n)$ is a conjugate transpose matrix of $X_{state}(k, n)$; $I_{P \times P}$ is a P×P-dimension unit matrix; $\vec{E}_k^*(n)$ is a complex conjugate of $\vec{E}_k(n)$, and $\vec{E}_k(n) = \vec{Y}_k(n) - X_{state}^H(k, n)\vec{W}_k(n)$; $\vec{E}_k(n)$ is a P-dimension subband spectrum vector of an error signal; $\vec{Y}_k(n)$ is a P-dimension subband spectrum vector of a near-end signal received by the microphone, and $\vec{Y}_k(n) = [Y(k, n), Y(k, n-1), ..., Y(k, n-P+1)]^T$; Y(k, n−n3) is the near-end signal received by the microphone at a signal frame time (n−n3); $\vec{W}_k(n) = [W_0(k, n), W_1(k, n), ..., W_{L_s-1}(k, n)]^T$; $W_{n2}(k, n)$ is a (n2+1)-th coefficient of the FIR filter in the subband k at a signal frame time n, n2=0, 1, ..., $L_s$−1, $L_s$ is a quantity of coefficients of the FIR filter in each subband; k is a subband index variable, k=0, 1, 2, ..., K−1, and K is a total quantity of subbands; n is a signal frame time index variable.

15. A sustainable adaptive updating device of a coefficient vector of a Finite Impulse Response (FIR) filter, comprising a storage, a processor, and a computer program stored on the storage and executable by the processor; wherein when the processor executes the computer program, the processor implements following steps:

obtaining a time-varying regularization factor used for iteratively updating the coefficient vector of the FIR filter in a case that the coefficient vector of the FIR filter is used for processing a preset signal;

updating the coefficient vector of the FIR filter according to the time-varying regularization factor;

wherein the preset signal comprises following combined pair: a far-end reference speech signal inputted in an Acoustic Echo Canceller (AEC) and a near-end speech signal received by a microphone, obtaining the time-varying regularization factor used for iteratively updating the coefficient vector of the FIR filter in a case that the coefficient vector of the FIR filter is used for processing the preset signal, comprises:

obtaining a power of a near-end signal received by a microphone and an effective estimation value of a coupling factor;

according to the power of the near-end signal received by the microphone and the effective estimation value of the coupling factor, obtaining the time-varying regularization factor used for iteratively updating the coefficient vector of the FIR filter in a case that the coefficient vector of the FIR filter is used for processing the preset signal;

according to the power of the near-end signal received by the microphone and the effective estimation value of the coupling factor, obtaining the time-varying regularization factor used for iteratively updating the coefficient vector of the FIR filter in a case that the coefficient vector of the FIR filter is used for processing the preset signal, comprises:

according to an Equation:

$$\delta^{opt}(t) = \max\left\{\frac{L \cdot \hat{\sigma}_Y^2(t)}{\hat{\beta}(t) + \rho_0}, \delta_{min}\right\} = \max\left\{\frac{L \cdot \hat{\sigma}_Y^2(t)|\hat{r}_{EX}(t)|^2}{\hat{\beta}(t)|_{Cross-correlation} + \rho}, \delta_{min}\right\},$$

obtaining the time-varying regularization factor used for iteratively updating the coefficient vector of the FIR filter;
wherein $\delta^{opt}(t)$ is the time-varying regularization factor; L is a quantity of coefficients of the FIR filter; $\hat{\sigma}_y^2(t)$ is the power of the signal received by the microphone;

$$\hat{\beta}(t) = \frac{\hat{\beta}(t)|_{Cross\ correlation}}{|\hat{r}_{ex}(t)|^2}$$

is the effective estimation value of coupling factor; $\hat{\beta}(t)|_{Cross-correlation}$ is a biased estimation value of the coupling factor based on a cross-correlation technique; $|\hat{r}_{ex}(t)|^2$ is a square of an effective magnitude of a correlation coefficient between an error signal outputted by the AEC and the far-end reference signal; $\delta_{min}$ is a preset small real constant quantity, and $\delta_{min} > 0$; $\rho_0$ and $\rho$ are preset small real constants, and $\rho > 0$, $\rho_0 > 0$, respectively; t is a digital-signal sample time index number;

or, wherein the preset signal comprises a subband spectrum of a near-end speech signal received by a microphone and a subband spectrum of a far-end reference speech signal inputted in an AEC; the coefficient vector of the FIR filter is a subband-domain coefficient vector of the FIR filter and the time-varying regularization factor is a subband-domain time-varying regularization factor;

obtaining the time-varying regularization factor used for iteratively updating the coefficient vector of the FIR filter in a case that the coefficient vector of the FIR filter is used for processing the preset signal, comprises:

obtaining a subband power spectrum of the near-end signal received by the microphone and an effective estimation value of a subband-domain coupling factor, respectively;

according to the subband power spectrum of the near-end signal received by the microphone and the effective estimation value of the subband-domain coupling factor, obtaining a subband-domain time-varying regularization factor used for iteratively updating the subband-domain coefficient vector of the FIR filter in a case that the subband-domain coefficient vector of the FIR filter is used for processing a preset signal;

wherein according to the subband power spectrum of the near-end signal received by the microphone and the effective estimation value of the subband-domain coupling factor, obtaining the subband-domain time-varying regularization factor used for iteratively updating the subband-domain coefficient vector of the FIR filter in a case that the subband-domain coefficient vector of the FIR filter is used for processing the preset signal, comprises:

according to an Equation:

$$\delta^{opt}(k, n) = \max\left\{\frac{L_s \cdot \hat{\sigma}_Y^2(k, n)}{\hat{\beta}(k, n) + \rho_0}, \delta_{min}\right\} = \max\left\{\frac{L_s \cdot \hat{\sigma}_Y^2(k, n)|\hat{r}_{EX}(k, n)|^2}{\hat{\beta}(k, n)|_{Cross-correlation} + \rho}, \delta_{min}\right\},$$

obtaining the subband-domain time-varying regularization factor used for iteratively updating the subband-domain coefficient vector of the FIR filter in a case that the subband-domain coefficient vector of the FIR filter is used for processing the preset signal;

$\delta^{opt}(k, n)$ is the subband-domain time-varying regularization factor; $\hat{\sigma}_y^2(k, n)$ is a subband power spectrum of a signal received by the microphone;

$$\hat{\beta}(k, n) = \frac{\hat{\beta}(k, n)|_{Cross-correlation}}{|\hat{r}_{EX}(k, n)|^2}$$

is the effective estimation value of the subband-domain coupling factor, $\hat{\beta}(k, n)|_{Cross-correlation}$ is the biased estimation value of the subband-domain coupling factor; $|\hat{r}_{EX}(k, n)|^2$ is the square of the effective magnitude of the correlation coefficient between the subband spectrum of the error signal outputted by the AEC and the subband spectrum of the far-end reference signal; $\delta_{min}$ is a preset small real constant quantity, and $\delta_{min} > 0$; $\rho_0$ and $\rho$ are preset small real constants, and $\rho > 0$, $\rho_0 > 0$; n is a signal frame time index variable.

* * * * *